United States Patent
Itani et al.

(10) Patent No.: US 9,900,612 B2
(45) Date of Patent: *Feb. 20, 2018

(54) MOVING IMAGE ENCODING DEVICE, MOVING IMAGE DECODING DEVICE, MOVING IMAGE CODING METHOD, AND MOVING IMAGE DECODING METHOD

(71) Applicant: Mitsubishi Electric Corporation, Tokyo (JP)

(72) Inventors: Yusuke Itani, Tokyo (JP); Shunichi Sekiguchi, Tokyo (JP); Kazuo Sugimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 305 days.

This patent is subject to a terminal disclaimer.

(21) Appl. No.: 14/614,161

(22) Filed: Feb. 4, 2015

(65) Prior Publication Data

US 2015/0245035 A1    Aug. 27, 2015

Related U.S. Application Data

(62) Division of application No. 13/824,279, filed as application No. PCT/JP2011/004121 on Jul. 21, 2011, now Pat. No. 9,369,730.

(30) Foreign Application Priority Data

Sep. 30, 2010  (JP) ................................. 2010-221460
Mar. 8, 2011   (JP) ................................. 2011-050214

(51) Int. Cl.
*H04N 19/159*  (2014.01)
*H04N 19/139*  (2014.01)
(Continued)

(52) U.S. Cl.
CPC ......... *H04N 19/513* (2014.11); *H04N 19/105* (2014.11); *H04N 19/109* (2014.11);
(Continued)

(58) Field of Classification Search
CPC .. H04N 19/105; H04N 19/109; H04N 19/124; H04N 19/139; H04N 19/159;
(Continued)

(56) References Cited

U.S. PATENT DOCUMENTS

2009/0196517 A1   8/2009  Divorra Escoda et al.
2009/0207914 A1   8/2009  Choi et al.
(Continued)

FOREIGN PATENT DOCUMENTS

JP   2007-221202 A   8/2007
JP   2008-283490 A   11/2008
(Continued)

OTHER PUBLICATIONS

Office Action dated Oct. 3, 2016 in Canadian Application No. 2,813,232.
(Continued)

*Primary Examiner* — Md Haque
*Assistant Examiner* — Nazmul Haque
(74) *Attorney, Agent, or Firm* — Birch, Stewart, Kolasch & Birch, LLP

(57) ABSTRACT

When an encoding mode corresponding to one of blocks to be encoded into which an image is divided by a block dividing part 2 is an inter encoding mode which is a direct mode, a motion-compensated prediction part 5 selects a motion vector suitable for generation of a prediction image from one or more selectable motion vectors and also carries out a motion-compensated prediction process on the block to be encoded to generate a prediction image by using the motion vector, and outputs index information showing the
(Continued)

motion vector to a variable length encoding part 13, and the variable length encoding unit 13 variable-length-encodes the index information.

7 Claims, 45 Drawing Sheets

(51) Int. Cl.
| | |
|---|---|
| *H04N 19/513* | (2014.01) |
| *H04N 19/52* | (2014.01) |
| *H04N 19/61* | (2014.01) |
| *H04N 19/109* | (2014.01) |
| *H04N 19/105* | (2014.01) |
| *H04N 19/176* | (2014.01) |
| *H04N 19/82* | (2014.01) |
| *H04N 19/91* | (2014.01) |
| *H04N 19/124* | (2014.01) |
| *H04N 19/44* | (2014.01) |
| *H04N 19/51* | (2014.01) |

(52) U.S. Cl.
CPC ......... *H04N 19/124* (2014.11); *H04N 19/139* (2014.11); *H04N 19/159* (2014.11); *H04N 19/176* (2014.11); *H04N 19/44* (2014.11); *H04N 19/51* (2014.11); *H04N 19/52* (2014.11); *H04N 19/521* (2014.11); *H04N 19/61* (2014.11); *H04N 19/82* (2014.11); *H04N 19/91* (2014.11)

(58) Field of Classification Search
CPC ...... H04N 19/176; H04N 19/44; H04N 19/51; H04N 19/513; H04N 19/52; H04N 19/521; H04N 19/61; H04N 19/82; H04N 19/91
See application file for complete search history.

(56) References Cited

U.S. PATENT DOCUMENTS

| | | | |
|---|---|---|---|
| 2009/0304084 A1 | 12/2009 | Hallapuro et al. | |
| 2010/0135387 A1 | 6/2010 | Divorra Escoda et al. | |
| 2010/0166073 A1* | 7/2010 | Schmit ................. | H04N 19/176 375/240.16 |
| 2010/0220790 A1* | 9/2010 | Jeon ....................... | H04N 19/55 375/240.16 |

FOREIGN PATENT DOCUMENTS

| | | | |
|---|---|---|---|
| JP | 2008311781 A | | 12/2008 |
| JP | 2009-201112 A | | 9/2009 |
| JP | 2010-502102 A | | 1/2010 |
| JP | 2010-524397 A | | 7/2010 |
| WO | WO 2008/127597 A2 | | 10/2008 |
| WO | WO 2009/051719 | * | 4/2009 |
| WO | WO 2009/051719 A2 | | 4/2009 |
| WO | WO 2011/099242 A1 | | 8/2011 |

OTHER PUBLICATIONS

Bi Houjie and Wang Jian New Generation Video Compression Coding Standard H.264/AVC (2nd Edition), pp. 199-216, Posts & Telecom Press, Nov. 30, 2009.
Chinese Office Action dated Jun. 2, 2016 in corresponding Chinese Patent Application No. 201180047148.5 with English Translation.
Chujoh, et al., "Description of video coding technology proposal by Toshiba", Joint Collaborative Team on Video Coding (JCT-VC) of ITU-T SG16 WP3 and ISO/IEC JTC1/SC29/WG11 1st Meeting: Dresden, DE Apr. 15-23, 2010, USA JCTVC, Apr. 23, 2010, JCTVC-A117, pp. 1-5.
ITU-T Telecommunication Standardization Sector of ITU, "Series H: Audiovisual AMD Multimedia Systems Infrastructure of audiovisual services—Coding of moving video", MPEG-4 AVC (ISO/IEC 14496-10)/ITU-T Recommendation H.264, Nov. 2007 (564 pages).
McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11, 1st Meeting Dresden, DE, Apr. 15-23, 2010, pp. 1-42.
France Telecom: "competition based motion vector prediction—new results", No. T05-SG16-C-0079, Nov. 6, 2006, XP030003833.
Summons to Attend Oral Proceedings Pursuant to Rule 115(1) EPC issued on Mar. 31, 2017 in corresponding European Patent Application No. 11828288.8.
Office Action dated Oct. 23, 2017 in corresponding Russian Patent Application No. 2016132603 with an English Translation.
Japanese Office Action dated Dec. 5, 2017, in the counterpart Japanese Patent Application No. 2016-252746, with a Machine Translation thereof.
Office Action dated Dec. 12, 2017 in corresponding European Patent Application No. 11828288.8.

* cited by examiner $$SAD_{spatial} = \left| f_{spatial} - g_{spatial} \right|$$

$$SAD_{temporal} = \left| f_{temporal} - g_{temporal} \right|$$

Evaluation Equation Using Variance $$\sigma(spatial) = \frac{1}{N} \sum_{i \in R} (MV_{spatial,i} - \overline{MV}_{spatial})^2, \quad N = 4$$

Evaluation Equation Using Variance $$\sigma(temporal) = \frac{1}{N} \sum_{i \in R} (MV_{temporal,i} - \overline{MV}_{temporal})^2, \quad N = 4$$

0th Hierarchical Layer

First Hierarchical Layer

FIG.41

| Block Size | MV_A | MV_B | MV_C | median | temporal |
|---|---|---|---|---|---|
| 64 | 1 | 1 | 1 | 0 | 1 |
| 32 | 1 | 1 | 1 | 0 | 1 |
| 16 | 1 | 1 | 0 | 0 | 1 |
| 8 | 0 | 0 | 0 | 1 | 1 |

FIG.42

| Block Size | MV_A | MV_B | MV_C | median | temporal |
|---|---|---|---|---|---|
| 128 | 1 | 1 | 1 | 0 | 1 |
| 64 | 1 | 1 | 1 | 0 | 1 |
| 32 | 1 | 1 | 0 | 0 | 1 |
| 16 | 1 | 1 | 0 | 1 | 1 |
| 8 | 0 | 0 | 0 | 1 | 1 |

Maximum Block Size=128

| Block Size | MV_A | MV_B | MV_C | median | temporal |
|---|---|---|---|---|---|
| 64 | 1 | 1 | 1 | 0 | 1 |
| 32 | 1 | 1 | 1 | 0 | 1 |
| 16 | 1 | 1 | 0 | 1 | 1 |
| 8 | 0 | 0 | 0 | 1 | 1 |

Maximum Block Size=32
→Use List Items Whose Block Sizes Are Equal To Or Smaller Than 32

| Block Size | MV_A | MV_B | MV_C | median | temporal |
|---|---|---|---|---|---|
| maxsize | 1 | 1 | 1 | 0 | 1 |
| maxsize/2 | 1 | 1 | 1 | 0 | 1 |
| maxsize/4 | 1 | 1 | 1 | 0 | 1 |
| maxsize/8 | 1 | 1 | 0 | 1 | 1 |
| maxsize/16 | 0 | 0 | 0 | 1 | 1 |

Maximum Block Size=maxsize
Switch According To maxsize

FIG.43

| partition | MV_A | MV_B | MV_C | median | temporal |
|---|---|---|---|---|---|
| 1part | 1 | 1 | 1 | 1 | 1 |
| 2partH1 | 1 | 1 | 1 | 0 | 1 |
| 2partH2 | 0 | 1 | 1 | 0 | 1 |
| 2partV1 | 1 | 1 | 0 | 0 | 1 |
| 2partV2 | 1 | 0 | 0 | 0 | 1 |
| 4part | 1 | 1 | 1 | 1 | 1 |

1part

2partV1

2partV2

2partH1  2partH2

4part

MOVING IMAGE ENCODING DEVICE, MOVING IMAGE DECODING DEVICE, MOVING IMAGE CODING METHOD, AND MOVING IMAGE DECODING METHOD

This application is a Divisional of copending application Ser. No. 13/824,279, filed on Mar. 15, 2013, which claims priority under 35 U.S.C. § 119(a) to Application No. PCT/JP2011/004121, filed on Jul. 21, 2011, which claims priority under 35 U.S.C. § 119(a) to Application No. JP2011-050214, filed in Japan on Mar. 8, 2011, and Application No. JP2010-221460, filed in Japan on Sep. 30, 2010, all of which are hereby expressly incorporated by reference into the present application.

FIELD OF THE INVENTION

The present invention relates to a moving image encoding device, a moving image decoding device, a moving image encoding method, and a moving image decoding method which are used for an image compression encoding technology, a compressed image data transmission technology, etc.

BACKGROUND OF THE INVENTION

For example, in an international standard video encoding system, such as MPEG (Moving Picture Experts Group) or "ITU-T H.26x", a method of defining block data (referred to as a "macroblock" from here on) which is a combination of 16×16 pixels for a luminance signal and 8×8 pixels for each of color difference signals which correspond to the 16×16 pixels of the luminance signal as one unit, and compressing image data on the basis of a motion compensation technology and an orthogonal transformation/transform coefficient quantization technology is used. In motion compensation processes carried out by a moving image encoding device and a moving image decoding device, a forward picture or a backward picture is referred to, and detection of a motion vector and generation of a prediction image are carried out for each macroblock. At this time, a picture for which only one picture is referred to and on which inter-frame prediction encoding is carried out is referred to as a P picture, and a picture for which two pictures is simultaneously referred to and on which inter-frame prediction encoding is carried out is referred to as a B picture.

In AVC/H.264 which is an international standard system (ISO/IEC 14496-10 | ITU-T H.264), an encoding mode called a direct mode can be selected when encoding a B picture (for example, refer to nonpatent reference 1). More specifically, a macroblock to be encoded does not have encoded data of a motion vector, and an encoding mode in which to generate a motion vector of the macroblock to be encoded can be selected in a predetermined arithmetic process using a motion vector of a macroblock of another already-encoded picture and a motion vector of an adjacent macroblock.

This direct mode includes the following two types of modes: a temporal direct mode and a spatial direct mode. In the temporal direct mode, by referring to the motion vector of another already-encoded picture and then carrying out a scaling process of scaling the motion vector according to the time difference between the other already-encoded picture and the picture which is the target to be encoded, a motion vector of the macroblock to be encoded is generated. In the spatial direct mode, by referring to the motion vector of at least one already-encoded macroblock located in the vicinity of the macroblock to be encoded, a motion vector of the macroblock to be encoded is generated from the motion vector. In this direct mode, either of the temporal direct mode and the spatial direct mode can be selected for each slice by using "direct_spatial_mv_pred_flag" which is a flag disposed in each slice header. A mode in which transform coefficients are not encoded, among direct modes, is referred to as a skip mode. Hereafter, a skip mode is also included in a direct mode which will be described below.

FIG. 11 is a schematic diagram showing a method of generating a motion vector in the temporal direct mode. In FIG. 11, "P" denotes a P picture and "B" denotes a B picture. Further, numerical numbers 0 to 3 denote an order in which pictures respectively designated by the numerical numbers are displayed, and show images which are displayed at times T0, T1, T2, and T3, respectively. It is assumed that an encoding process on the pictures is carried out in order of P0, P3, B1, and B2.

For example, a case in which a macroblock MB1 in the picture B2 is encoded in the temporal direct mode will be considered hereafter. In this case, the motion vector MV of a macroblock MB2 which is a motion vector of the picture P3 closest to the picture B2 among the already-encoded pictures located backward with respect to the picture B2 on the time axis, and which is spatially located at the same position as the macroblock MB1. This motion vector MV refers to the picture P0, and motion vectors MVL0 and MVL1 which are used when encoding the macroblock MB1 are calculated according to the following equation (1).

$$MVL0 = \frac{T2-T0}{T3-T0} \times MV \qquad (1)$$

$$MVL1 = \frac{T2-T3}{T3-T0} \times MV$$

FIG. 12 is a schematic diagram showing a method of generating a motion vector in the spatial direct mode. In FIG. 12, currentMB denotes the macroblock to be encoded. At this time, when the motion vector of an already-encoded macroblock A on a left side of the macroblock to be encoded is expressed as MVa, the motion vector of an already-encoded macroblock B on an upper side of the macroblock to be encoded is expressed as MVb, and the motion vector of an already-encoded macroblock C on an upper right side of the macroblock to be encoded is expressed as MVc, the motion vector MV of the macroblock to be encoded can be calculated by determining the median of these motion vectors MVa, MVb, and MVc, as shown in the following equation (2).

$$MV = \text{median}(MVa, MVb, MVc) \qquad (2)$$

The motion vector is determined for each of forward and backward pictures in the spatial direct mode, and the motion vectors for both of them can be determined by using the above-mentioned method.

A reference image which is used for the generation of a prediction image is managed as a reference image list for each vector which is used for reference. When two vectors are used, reference image lists are referred to as a list 0 and a list 1, respectively. Reference images are stored in the reference image lists in reverse chronological order, respectively, and, in a general case, the list 0 shows a forward reference image and the list 1 shows a backward reference image. As an alternative, the list 1 can show a forward reference image and the list 0 can show a backward reference image, or each of the lists 0 and 1 can show a forward reference image and a backward reference image. Further, the reference image lists do not have to be aligned in reverse chronological order. For example, the following nonpatent reference 1 describes that the reference image lists can be ordered for each slice.

RELATED ART DOCUMENT

Nonpatent Reference

Nonpatent reference 1: MPEG-4 AVC (ISO/IEC 14496-10)/ H.ITU-T 264 standards

SUMMARY OF THE INVENTION

Problems to be Solved by the Invention

Because the conventional image encoding device is constructed as above, the conventional image encoding device can switch between the temporal direct mode and the spatial direct mode on a per slice basis by simply referring to "direct_spatial_mv_pred_flag" which is a flag disposed in each slice header. However, because the conventional image encoding device cannot switch between the temporal direct mode and the spatial direct mode on a per macroblock basis, even though an optimal direct mode for a macroblock belonging to a slice is the spatial direct mode, for example, the conventional image encoding device has to use the temporal direct mode for the macroblock when the direct mode corresponding to the slice is determined to be the temporal direct mode, and therefore cannot select the optimal direct mode. In such a case, because the conventional image encoding device cannot select the optimal direct mode, the conventional image encoding device has to encode an unnecessary motion vector and there arises a problem of increase in the code amount.

The present invention is made in order to solve the above-mentioned problem, and it is therefore an object of the present invention to provide a moving image encoding device, a moving image decoding device, a moving image encoding method, and a moving image decoding method capable of selecting an optimal direct mode for each predetermined block unit, thereby being able to reduce the code amount.

Means for Solving the Problem

In accordance with the present invention, there is provided a moving image encoding device including: an encoding controlling unit for determining a maximum size of a block to be encoded which is a unit to be processed when a prediction process is carried out, and also determining a maximum hierarchy depth when a block to be encoded having the maximum size is divided hierarchically, and for selecting an encoding mode which determines an encoding method of encoding each block to be encoded from one or more available encoding modes; and a block dividing unit for dividing an inputted image into blocks to be encoded having a predetermined size, and also dividing each of the above-mentioned blocks to be encoded hierarchically, in which when an inter encoding mode which is a direct mode is selected by the encoding controlling unit as an encoding mode corresponding to one of the blocks to be encoded into which the inputted image is divided by the block dividing unit, a motion-compensated prediction unit selects a motion vector suitable for generation of a prediction image from one or more selectable motion vectors and also carries out a motion-compensated prediction process on the above-mentioned block to be encoded to generate a prediction image by using the motion vector, and outputs index information showing the motion vector to a variable length encoding unit, and the variable length encoding unit variable-length-encoding the index information.

Advantages of the Invention

Because the moving image encoding device in accordance with the present invention is constructed in such a way as that the moving image encoding device includes: the encoding controlling unit for determining a maximum size of a block to be encoded which is a unit to be processed when a prediction process is carried out, and also determining a maximum hierarchy depth when a block to be encoded having the maximum size is divided hierarchically, and for selecting an encoding mode which determines an encoding method of encoding each block to be encoded from one or more available encoding modes; and the block dividing unit for dividing an inputted image into blocks to be encoded having a predetermined size, and also dividing each of the above-mentioned blocks to be encoded hierarchically and, when an inter encoding mode which is a direct mode is selected by the encoding controlling unit as an encoding mode corresponding to one of the blocks to be encoded into which the inputted image is divided by the block dividing unit, the motion-compensated prediction unit selects a motion vector suitable for generation of a prediction image from one or more selectable motion vectors and also carries out a motion-compensated prediction process on the above-mentioned block to be encoded to generate a prediction image by using the motion vector, and outputs index information showing the motion vector to the variable length encoding unit, and the variable length encoding unit variable-length-encoding the index information, there is provided an advantage of being able to select an optimal direct mode for each predetermined block unit, and reduce the code amount.

BRIEF DESCRIPTION OF THE FIGURES

FIG. 10(b) is an explanatory drawing showing a state in which an encoding mode m(B$^n$) is assigned to each of the partitions after a hierarchical layer division is performed by using a quadtree graph;

FIG. 41 is an explanatory drawing of a list showing one or more selectable motion vectors for each of block sizes provided for blocks to be encoded;

FIG. 42 is an explanatory drawing showing an example of a list whose maximum block size is "128";

FIG. 43 is an explanatory drawing of a list showing one or more selectable motion vectors for each of division patterns provided for blocks to be encoded;

EMBODIMENTS OF THE INVENTION

Figure 1:
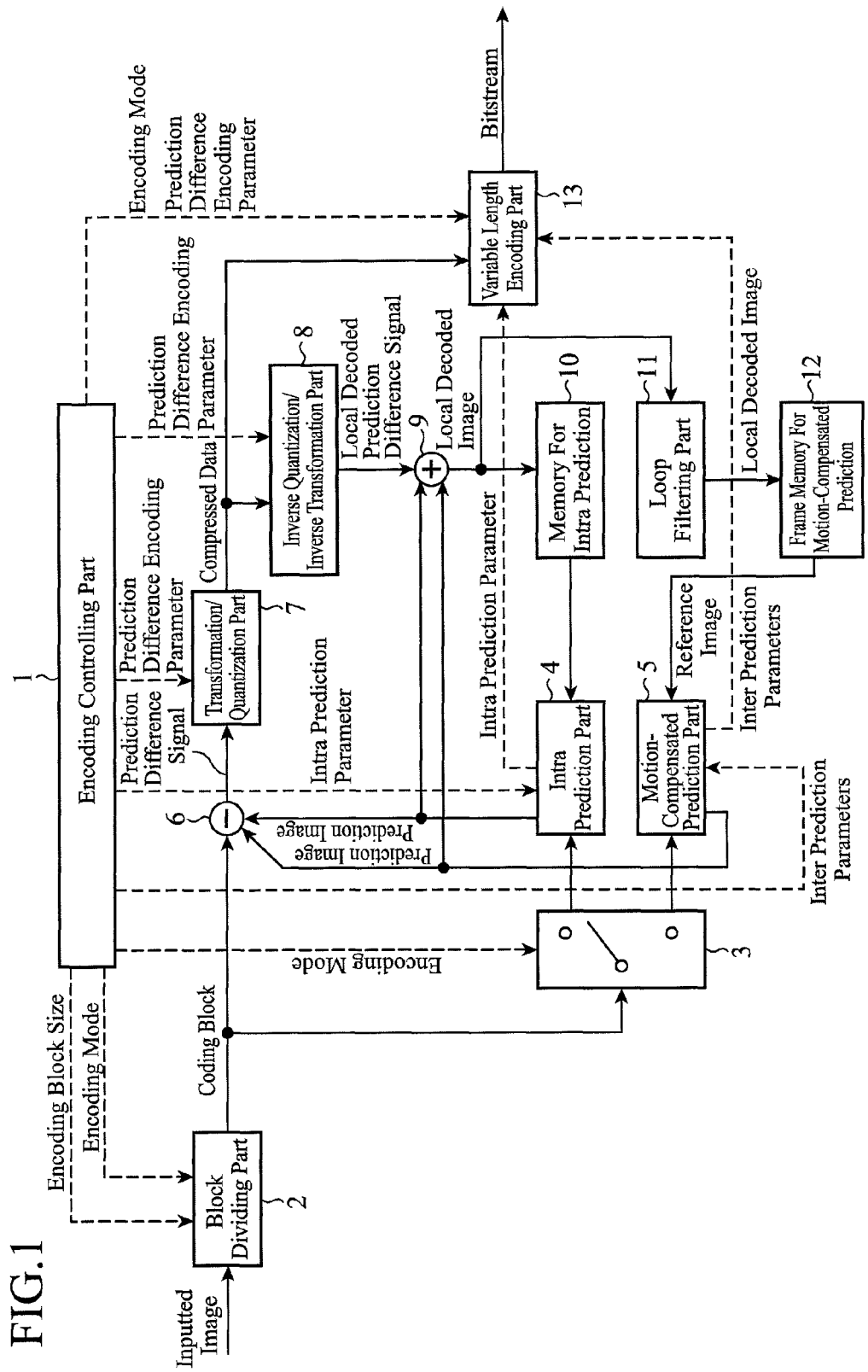
FIG. 1 is a block diagram showing a moving image encoding device in accordance with Embodiment 1 of the present invention.

Hereafter, the preferred embodiments of the present invention will be explained in detail with reference to the drawings.

Embodiment 1

In this Embodiment 1, a moving image encoding device that inputs each frame image of a video, carries out variable length encoding on the frame image after carrying out a compression process with an orthogonal transformation and quantization on a prediction difference signal which the moving image encoding device acquires by carrying out a motion-compensated prediction between adjacent frames to generate a bitstream, and a moving image decoding device that decodes the bitstream outputted from the moving image encoding device will be explained.

The moving image encoding device in accordance with this Embodiment 1 is characterized in that the moving image encoding device adapts itself to a local change of a video signal in spatial and temporal directions to divide the video signal into regions of various sizes, and carries out intra-frame and inter-frame adaptive encoding. In general, a video signal has a characteristic of its complexity varying locally in space and time. There can be a case in which a pattern having a uniform signal characteristic in a relatively large image area, such as a sky image or a wall image, or a pattern having a complicated texture pattern in a small image area, such as a person image or a picture including a fine texture, also coexists on a certain video frame from the viewpoint of space. Also from the viewpoint of time, a relatively large image area, such as a sky image or a wall image, has a small local change in a temporal direction in its pattern, while an image of a moving person or object has a larger temporal change because its outline has a movement of a rigid body and a movement of a non-rigid body with respect to time.

Although in the encoding process a process of generating a prediction difference signal having small signal power and small entropy by using temporal and spatial prediction, thereby reducing the whole code amount, is carried out, the code amount of a parameter used for the prediction can be reduced as long as the parameter can be applied uniformly to as large an image signal region as possible. On the other hand, because the amount of errors occurring in the prediction increases when the same prediction parameter is applied to an image signal pattern having a large change in time and space, the code amount of the prediction difference signal cannot be reduced. Therefore, it is desirable to reduce the size of a region which is subjected to the prediction process when performing the prediction process on an image signal pattern having a large change in time and space, thereby reducing the electric power and entropy of the prediction difference signal even though the data volume of the parameter which is used for the prediction is increased. In order to carry out encoding which is adapted for such the typical characteristics of a video signal, the moving image encoding device in accordance with this Embodiment 1 hierarchically divides each region having a predetermined maximum block size of the video signal into blocks, and carries out the prediction process and the encoding process of encoding the prediction difference on each of the blocks into which each region is divided.

A video signal which is to be processed by the moving image encoding device in accordance with this Embodiment 1 can be an arbitrary video signal in which each video frame consists of a series of digital samples (pixels) in two dimensions, horizontal and vertical, such as a YUV signal which consists of a luminance signal and two color difference signals, a color video image signal in arbitrary color space, such as an RGB signal, outputted from a digital image sensor, a monochrome image signal, or an infrared image signal. The gradation of each pixel can be an 8-bit, 10-bit, or 12-bit one. In the following explanation, the inputted video signal is a YUV signal unless otherwise specified. It is further assumed that the two color difference components U and V are signals having a 4:2:0 format which are sub-sampled with respect to the luminance component Y. A data unit to be processed which corresponds to each frame of the video signal is referred to as a "picture." In this Embodiment 1, a "picture" is explained as a video frame signal on which progressive scanning is carried out. When the video signal is an interlaced signal, a "picture" can be alternatively a field image signal which is a unit which constructs a video frame.

FIG. 1 is a block diagram showing the moving image encoding device in accordance with Embodiment 1 of the present invention. Referring to FIG. 1, an encoding controlling part 1 carries out a process of determining a maximum size of each of blocks to be encoded which is a unit to be processed at a time when a motion-compensated prediction process (inter-frame prediction process) or an intra prediction process (intra-frame prediction process) is carried out, and also determining an upper limit on the number of hierarchical layers, i.e., a maximum hierarchy depth in a hierarchy in which each of the blocks to be encoded having the maximum size is hierarchically divided into blocks. The encoding controlling part 1 also carries out a process of selecting an encoding mode suitable for each of the blocks to be encoded into which each block to be encoded having a maximum size is divided hierarchically from among one or more available encoding modes (one or more intra encoding modes and one or more inter encoding modes (including an inter encoding mode which is a direct mode)). The encoding controlling part 1 constructs an encoding controlling unit.

A block dividing part 2 carries out a process of, when receiving a video signal showing an inputted image, dividing the inputted image shown by the video signal into blocks to be encoded each having the maximum size determined by the encoding controlling part 1, and also dividing each of the blocks to be encoded into blocks hierarchically until the number of hierarchical layers reaches the upper limit on the number of hierarchical layers which is determined by the encoding controlling part 1. The block dividing part 2 constructs a block dividing unit.

A selection switch 3 carries out a process of, when the encoding mode selected by the encoding controlling part 1 for the block to be encoded, which is generated through the division by the block dividing part 2, is an intra encoding mode, outputting the block to be encoded to an intra prediction part 4, and, when the encoding mode selected by the encoding controlling part 1 for the block to be encoded, which is generated through the division by the block dividing part 2, is an inter encoding mode, outputting the block to be encoded to a motion-compensated prediction part 5. The intra prediction part 4 carries out a process of, when receiving the block to be encoded, which is generated through the division by the block dividing part 2, from the selection switch 3, performing an intra prediction process on the block to be encoded by using intra prediction parameters outputted from the encoding controlling part 1 to generate a prediction image. An intra prediction unit is comprised of the selection switch 3 and the intra prediction part 4.

The motion-compensated prediction part 5 carries out a process of, when an inter encoding mode which is a direct mode is selected by the encoding controlling part 1 as the encoding mode suitable for the block to be encoded, which is generated through the division by the block dividing part 2, generating a spatial direct vector in a spatial direct mode from the motion vector of an already-encoded block located in the vicinity of the block to be encoded and also generating a temporal direct vector in a temporal direct mode from the motion vector of an already-encoded picture which can be referred to by the block to be encoded, selecting a direct vector which provides a higher correlation between reference images from the spatial direct vector and the temporal direct vector, and performing a motion-compensated prediction process on the block to be encoded by using the direct vector selected thereby to generate a prediction image. In contrast, when an inter encoding mode other than a direct mode is selected by the encoding controlling part 1 as the encoding mode suitable for the block to be encoded, which is generated through the division by the block dividing part 2, the motion-compensated prediction part 5 carries out a process of searching through the block to be encoded and a reference image stored in a motion-compensated prediction frame memory 12 for a motion vector, and performing a motion-compensated prediction process on the block to be encoded by using the motion vector to generate a prediction image. A motion-compensated prediction unit is comprised of the selection switch 3 and the motion-compensated prediction part 5.

A subtracting part 6 carries out a process of subtracting the prediction image generated by the intra prediction part 4 or the motion-compensated prediction part 5 from the block to be encoded, which is generated through the division by the block dividing part 2, to generate a difference image (=the block to be encoded—the prediction image). The subtracting part 6 constructs a difference image generating unit. A transformation/quantization part 7 carries out a process of performing an orthogonal transformation process (e.g., a DCT (discrete cosine transform) or an orthogonal transformation process, such as a KL transform, in which bases are designed for a specific learning sequence in advance) on the difference signal generated by the subtracting part 6 in units of a block having a transformation block size included in prediction difference encoding parameters outputted from the encoding controlling part 1, and also quantizing the transform coefficients of the difference image by using a quantization parameter included in the prediction difference encoding parameters to output the transform coefficients quantized thereby as compressed data of the difference image. The transformation/quantization part 7 constructs an image compression unit.

An inverse quantization/inverse transformation part 8 carries out a process of inverse-quantizing the compressed data outputted from the transformation/quantization part 7 by using the quantization parameter included in the prediction difference encoding parameter outputted from the encoding controlling part 1, and performing an inverse transformation process (e.g., an inverse DCT (inverse discrete cosine transform) or an inverse transformation process such as an inverse KL transform) on the compressed data inverse-quantized thereby to output the compressed data on which the inverse quantization/inverse transformation part carries out the inverse transformation process as a local decoded prediction difference signal.

An adding part 9 carries out a process of adding the local decoded prediction difference signal outputted from the inverse quantization/inverse transformation part 8 and the prediction signal showing the prediction image generated by the intra prediction part 4 or the motion-compensated prediction part 5 to generate a local decoded image signal showing a local decoded image. A memory 10 for intra prediction is a recording medium, such as a RAM, for storing the local decoded image shown by the local decoded image signal generated by the adding part 9 as an image which the intra prediction part 4 will use when performing the intra prediction process the next time.

A loop filter part 11 carries out a process of compensating for an encoding distortion included in the local decoded image signal generated by the adding part 9, and outputting the local decoded image shown by the local decoded image signal on which the loop filter part performs the encoding distortion compensation to a motion-compensated prediction frame memory 12 as a reference image. The motion-compensated prediction frame memory 12 is a recording medium, such as a RAM, for storing the local decoded image on which the loop filter part 11 performs the filtering process as a reference image which the motion-compensated prediction part 5 will use when performing the motion-compensated prediction process the next time.

A variable length encoding part 13 carries out a process of variable-length-encoding the compressed data outputted from the transformation/quantization part 7, the encoding mode and the prediction difference encoding parameters which are outputted from the encoding controlling part 1, and the intra prediction parameters outputted from the intra prediction part 4 or inter prediction parameters outputted from the motion-compensated prediction part 5 to generate a bitstream into which encoded data of the compressed data, encoded data of the encoding mode, encoded data of the prediction difference encoding parameters, and encoded data of the intra prediction parameters or the inter prediction parameters are multiplexed. The variable length encoding part 13 constructs a variable length encoding unit.

Figure 2:
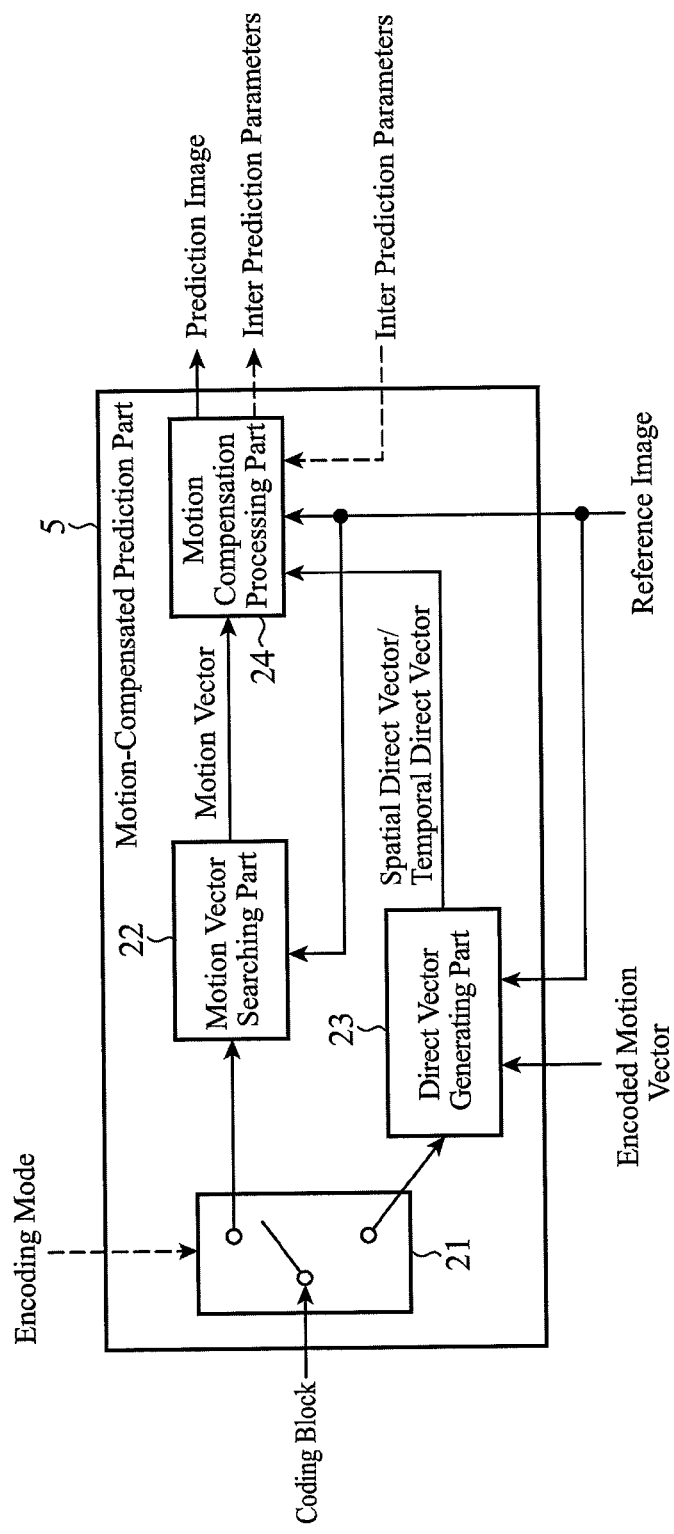
FIG. 2 is a block diagram showing a motion-compensated prediction part 5 of the moving image encoding device in accordance with Embodiment 1 of the present invention.

FIG. 2 is a block diagram showing the motion-compensated prediction part 5 of the moving image encoding device in accordance with Embodiment 1 of the present invention. Referring to FIG. 2, a selection switch 21 carries out a process of outputting the block to be encoded, which is generated through the division by the block dividing part 2, to a motion vector searching part 22 when the encoding mode selected by the encoding controlling part 1 is an inter mode other than direct modes, and outputting the block to be encoded, which is generated through the division by the block dividing part 2, to a direct vector generating part 23 when the encoding mode is an inter mode which is a direct mode. Because the direct vector generating part 23 does not use the block to be encoded, which is generated through the division by the block dividing part 2, when generating a direct vector, the selection switch does not have to output the block to be encoded to the direct vector generating part 23.

The motion vector searching part 22 carries out a process of searching for an optimal motion vector in the inter mode while referring to both the block to be encoded outputted from the selection switch 21 and a reference image stored in the motion-compensated prediction frame memory 12, and outputting the motion vector to a motion compensation processing part 24. The direct vector generating part 23 carries out a process of generating a spatial direct vector in the spatial direct mode from the motion vector of an already-encoded block located in the vicinity of the block to be encoded, and also generating a temporal direct vector in the temporal direct mode from the motion vector of an already-encoded picture which can be referred to by the block to be encoded, and selecting a direct vector which provides a higher correlation between reference images from the spatial direct vector and the temporal direct vector.

The motion compensation processing part 24 carries out a process of performing a motion-compensated prediction process on the basis of the inter prediction parameters outputted from the encoding controlling part 1 by using both the motion vector which is searched for by the motion vector searching part 22 or the direct vector which is selected by the direct vector generating part 23, and one or more frames of reference images stored in the motion-compensated prediction frame memory 12 to generate a prediction image. The motion compensation processing part 24 outputs the inter prediction parameters when the motion compensation processing part uses when carrying out the motion-compensated prediction process to the variable length encoding part 13. When the encoding mode selected by the encoding controlling part 1 is an inter mode other than direct modes, the motion compensation processing part includes the motion vector which is searched for by the motion vector searching part 22 in the inter prediction parameters, and outputs these inter prediction parameters to the variable length encoding part 13.

Figure 3:
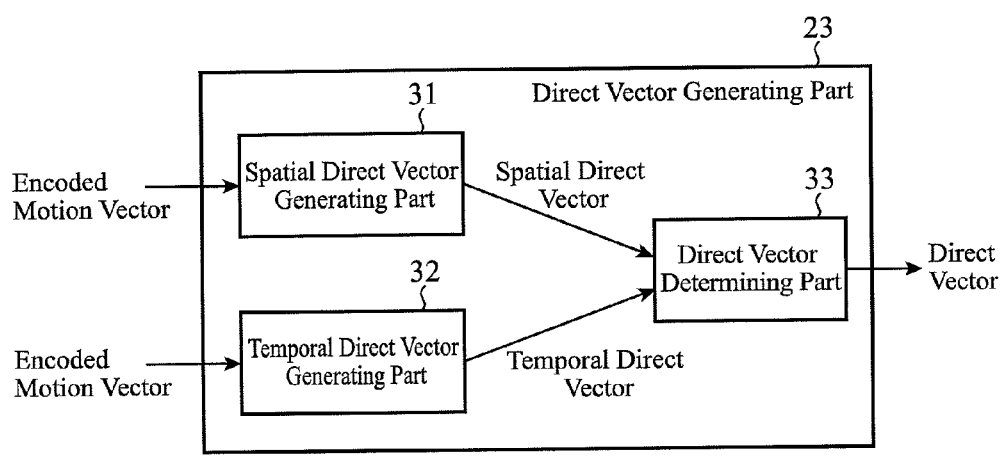
FIG. 3 is a block diagram showing a direct vector generating part 23 which constructs the motion-compensated prediction part 5.

FIG. 3 is a block diagram showing the direct vector generating part 23 which constructs the motion-compensated prediction part 5. Referring to FIG. 3, a spatial direct vector generating part 31 carries out a process of reading the motion vector of an already-encoded block located in the vicinity of the block to be encoded from among the motion vectors of already-encoded blocks (the motion vectors of already-encoded blocks are stored in a not-shown motion vector memory or an internal memory of the motion-compensated prediction part 5) to generate a spatial direct vector in a spatial direct mode from the motion vector. A temporal direct vector generating part 32 carries out a process of reading the motion vector of a block located spatially at the same position as the block to be encoded, which is the motion vector of an already-encoded picture which can be referred to by the block to be encoded, from among the motion vectors of already-encoded blocks to generate a temporal direct vector in the temporal direct mode from the motion vector.

A direct vector determining part 33 carries out a process of calculating an evaluated value in the spatial direct mode by using the spatial direct vector generated by the spatial direct vector generating part 31 and also calculating an evaluated value in the temporal direct mode by using the temporal direct vector generated by the temporal direct vector generating part 32, and comparing the evaluated value in the spatial direct mode with the evaluated value in the temporal direct mode to select either of the spatial direct vector and the temporal direct vector.

Figure 4:
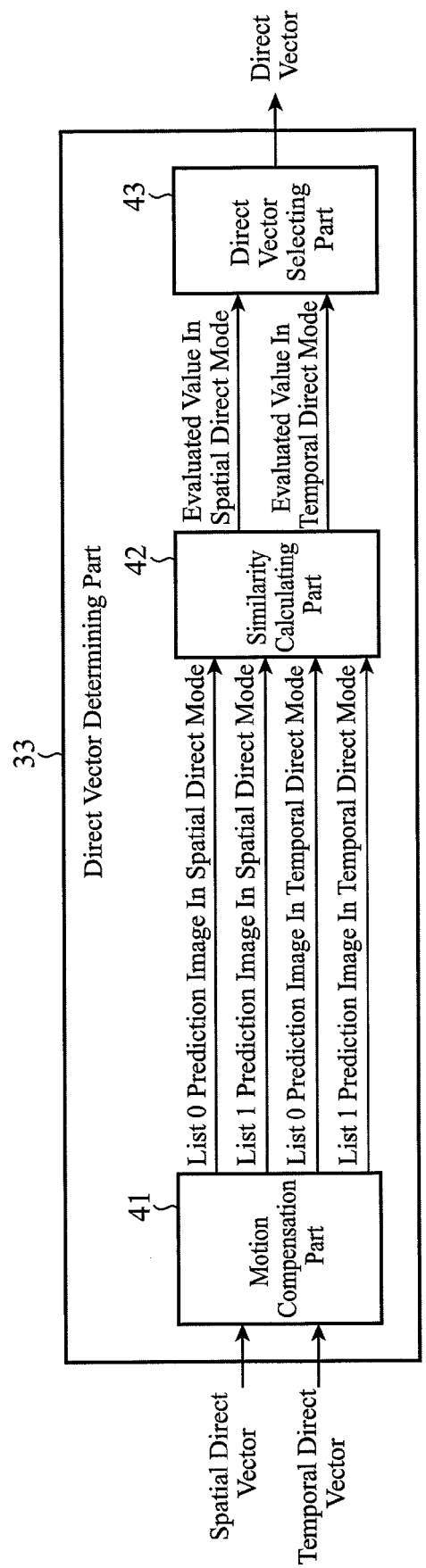
FIG. 4 is a block diagram showing a direct vector determining part 33 which constructs the direct vector generating part 23.

FIG. 4 is a block diagram showing the direct vector determining part 33 which constructs the direct vector generating part 23. Referring to FIG. 4, a motion compensation part 41 carries out a process of generating a list 0 prediction image in the spatial direct mode (e.g., a forward prediction image in the spatial direct mode) and a list 1 prediction image in the spatial direct mode (e.g., a backward prediction image in the spatial direct mode) by using the spatial direct vector generated by the spatial direct vector generating part 31, and also generating a list 0 prediction image in the temporal direct mode (e.g., a forward prediction image in the temporal direct mode) and a list 1 prediction image in the temporal direct mode (e.g., a backward prediction image in the temporal direct mode) by using the temporal direct vector generated by the temporal direct vector generating part 32.

A similarity calculating part 42 carries out a process of calculating the degree of similarity between the list 0 prediction image in the spatial direct mode (forward prediction image) and the list 1 prediction image in the spatial direct mode (backward prediction image) as the evaluated value in the spatial direct mode, and also calculating the degree of similarity between the list 0 prediction image in the temporal direct mode (forward prediction image) and the list 1 prediction image in the temporal direct mode (backward prediction image) as the evaluated value in the temporal direct mode. A direct vector selecting part 43 carries out a process of comparing the degree of similarity between the list 0 prediction image in the spatial direct mode (forward prediction image) and the list 1 prediction image in the spatial direct mode (backward prediction image), which is calculated by the similarity calculating part 42, with the degree of similarity between the list 0 prediction image in the temporal direct mode (forward prediction image) and the list 1 prediction image in the temporal direct mode (backward prediction image), which is calculated by the similarity calculating part 42, to select the direct vector in one direct mode which provides a higher degree of similarity between the list 0 prediction image (forward prediction image) and the list 1 prediction image (backward prediction image) from the spatial direct vector and the temporal direct vector.

Figure 5:
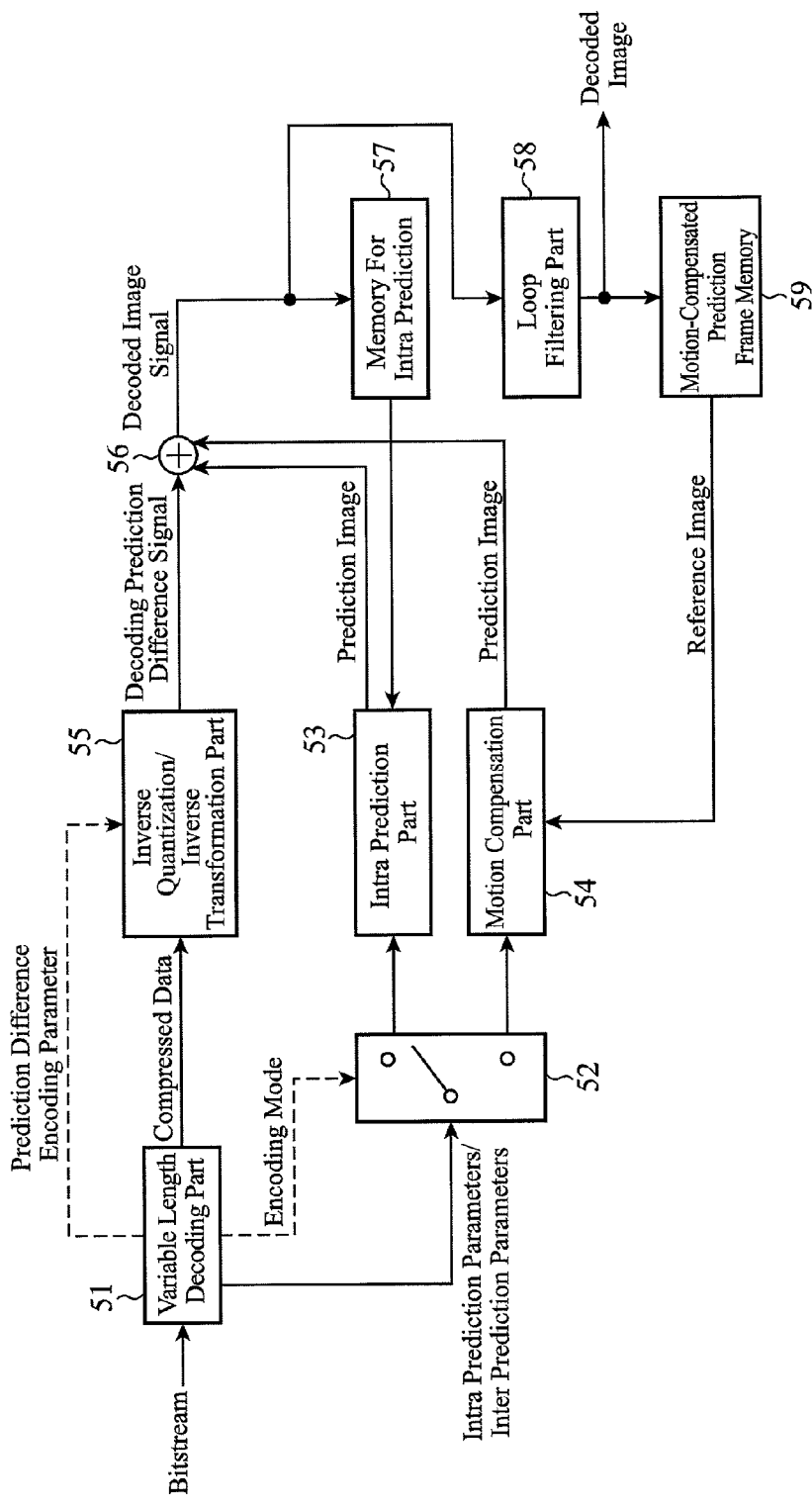
FIG. 5 is a block diagram showing a moving image decoding device in accordance with Embodiment 1 of the present invention.

FIG. 5 is a block diagram showing a moving image decoding device in accordance with Embodiment 1 of the present invention. Referring to FIG. 5, a variable length decoding part 51 carries out a process of variable-length-decoding the encoded data multiplexed into the bitstream to acquire the compressed data, the encoding mode, the prediction difference encoding parameters, and the intra prediction parameters or the inter prediction parameters, which are associated with each coding block into which each frame of the video is hierarchically divided, and outputting the compressed data and the prediction difference encoding parameters to an inverse quantization/inverse transformation part 55, and also outputting the encoding mode, and the intra prediction parameters or the inter prediction parameters to a selection switch 52. The variable length decoding part 51 constructs a variable length decoding unit.

The selection switch 52 carries out a process of, when the encoding mode associated with the coding block, which is outputted from the variable length decoding part 51, is an intra encoding mode, outputting the intra prediction parameters outputted thereto from the variable length decoding part 51 to an intra prediction part 53, and, when the encoding mode is an inter encoding mode, outputting the inter prediction parameters outputted thereto from the variable length decoding part 51 to a motion-compensated prediction part 54. The intra prediction part 53 carries out a process of performing an intra prediction process on the coding block by using the intra prediction parameters outputted thereto from the selection switch 52 to generate a prediction image. An intra prediction unit is comprised of the selection switch 52 and the intra prediction part 53.

The motion-compensated prediction part 54 carries out a process of, when the encoding mode associated with the coding block, which is outputted thereto from the variable length decoding part 51, is an inter encoding mode which is a direct mode, generating a spatial direct vector in the spatial direct mode from the motion vector of an already-decoded block located in the vicinity of the coding block and also generating a temporal direct vector in the temporal direct mode from the motion vector of an already-decoded picture which can be referred to by the coding block, selecting one direct vector which provides a higher correlation between reference images from the spatial direct vector and the temporal direct vector, and performing a motion-compensated prediction process on the coding block by using the direct vector selected thereby to generate a prediction image. The motion-compensated prediction part 54 also carries out a process of performing a motion-compensated prediction process on the coding block by using the motion vector included in the inter prediction parameters outputted thereto from the variable length decoding part 51 to generate a prediction image when the encoding mode associated with the coding block, which is outputted thereto from the variable length decoding part 51, is an inter encoding mode other than direct modes. A motion-compensated prediction unit is comprised of the selection switch 52 and the motion-compensated prediction part 54.

An inverse quantization/inverse transformation part 55 carries out a process of inverse-quantizing the compressed data associated with the coding block, which is outputted thereto from the variable length decoding part 51, by using the quantization parameter included in the prediction difference encoding parameters outputted thereto from the variable length decoding part 51, and performing an inverse transformation process (e.g., an inverse DCT (inverse discrete cosine transform) or an inverse transformation process such as an inverse KL transform) on the compressed data inverse-quantized thereby in units of a block having the transformation block size included in the prediction difference encoding parameters, and outputting the compressed data on which the inverse quantization/inverse transformation part performs the inverse transformation process as a decoded prediction difference signal (signal showing a pre-compressed difference image). The inverse quantization/inverse transformation part 55 constructs a difference image generating unit.

A n adding part 56 carries out a process of adding the decoded prediction difference signal outputted thereto from the inverse quantization/inverse transformation part 55 and the prediction signal showing the prediction image generated by the intra prediction part 53 or the motion-compensated prediction part 54 to generate a decoded image signal showing a decoded image. The adding part 56 constructs a decoded image generating unit. A memory 57 for intra prediction is a recording medium, such as a RAM, for storing the decoded image shown by the decoded image signal generated by the adding part 56 as an image which the intra prediction part 53 will use when performing the intra prediction process the next time.

A loop filter part 58 carries out a process of compensating for an encoding distortion included in the decoded image signal generated by the adding part 56, and outputting the decoded image shown by the decoded image signal on which the loop filter part performs the encoding distortion compensation to a motion-compensated prediction frame memory 59 as a reference image. The motion-compensated prediction frame memory 59 is a recording medium, such as a RAM, for storing the decoded image on which the loop filter part 58 performs the filtering process as a reference image which the motion-compensated prediction part 54 will use when performing the motion-compensated prediction process the next time.

Figure 6:
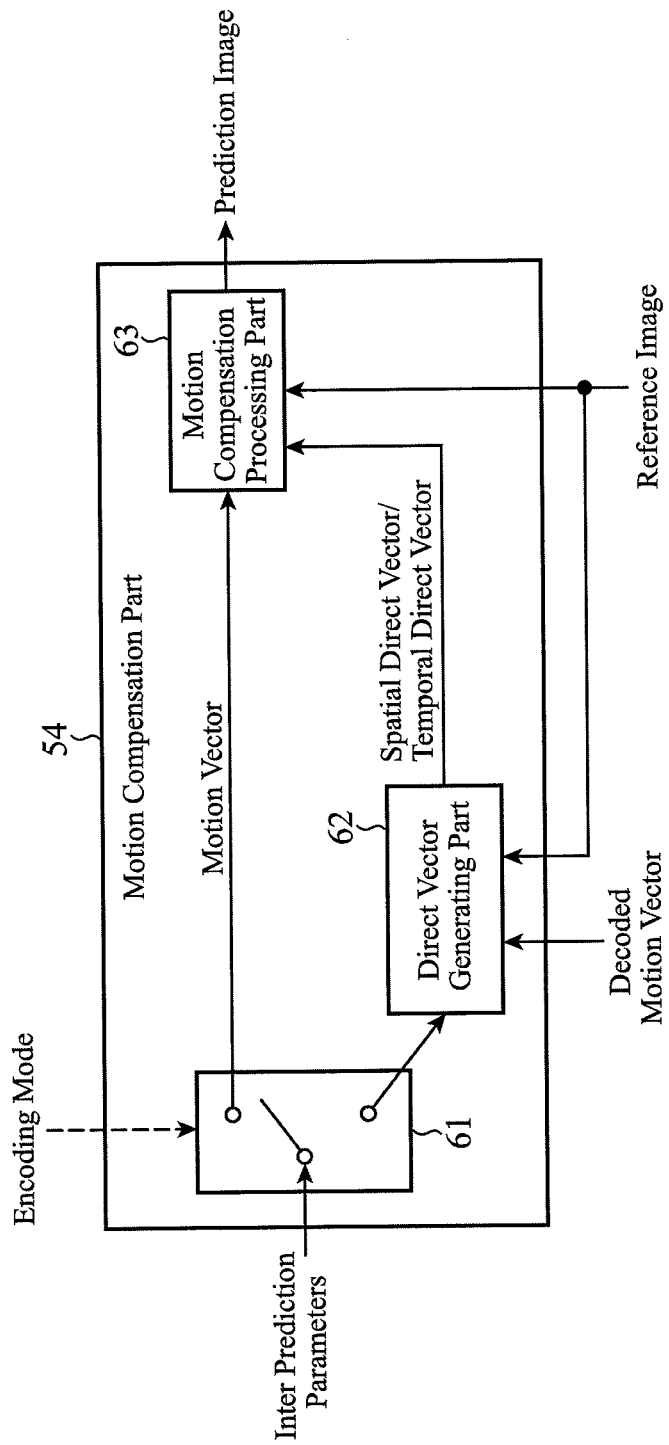
FIG. 6 is a block diagram showing a motion-compensated prediction part 54 of the moving image decoding device in accordance with Embodiment 1 of the present invention.

FIG. 6 is a block diagram showing the motion-compensated prediction part 54 of the moving image decoding device in accordance with Embodiment 1 of the present invention. Referring to FIG. 6, a selection switch 61 carries out a process of, when the encoding mode associated with the coding block, which is outputted thereto from the variable length decoding part 51, is an inter mode other than direct modes, outputting the inter prediction parameters (including the motion vector) outputted thereto from the variable length decoding part 51 to a motion compensation processing part 63, and, when the encoding mode is an inter mode which is an direct mode, outputting the inter prediction parameters outputted thereto from the variable length decoding part 51 to a direct vector generating part 62.

The direct vector generating part 62 carries out a process of generating a spatial direct vector in the spatial direct mode from the motion vector of an already-decoded block located in the vicinity of the coding block and also generates a temporal direct vector in the temporal direct mode from the motion vector of an already-decoded picture which can be referred to by the coding block, and selecting one direct vector which provides a higher correlation between reference images from the spatial direct vector and the temporal direct vector. The direct vector generating part 62 also carries out a process of outputting the inter prediction parameters outputted thereto from the selection switch 61 to the motion compensation processing part 63. The internal structure of the direct vector generating part 62 is the same as the direct vector generating part 23 shown in FIG. 2.

The motion compensation processing part 63 carries out a process of performing a motion-compensated prediction process on the basis of the inter prediction parameters outputted thereto from the direct vector generating part 62 by using both the motion vector included in the inter prediction parameters outputted thereto from the selection switch 61 or the direct vector selected by the direct vector generating part 62, and a reference image of one frame stored in the motion-compensated prediction frame memory 59 to generate a prediction image.

Figure 7:
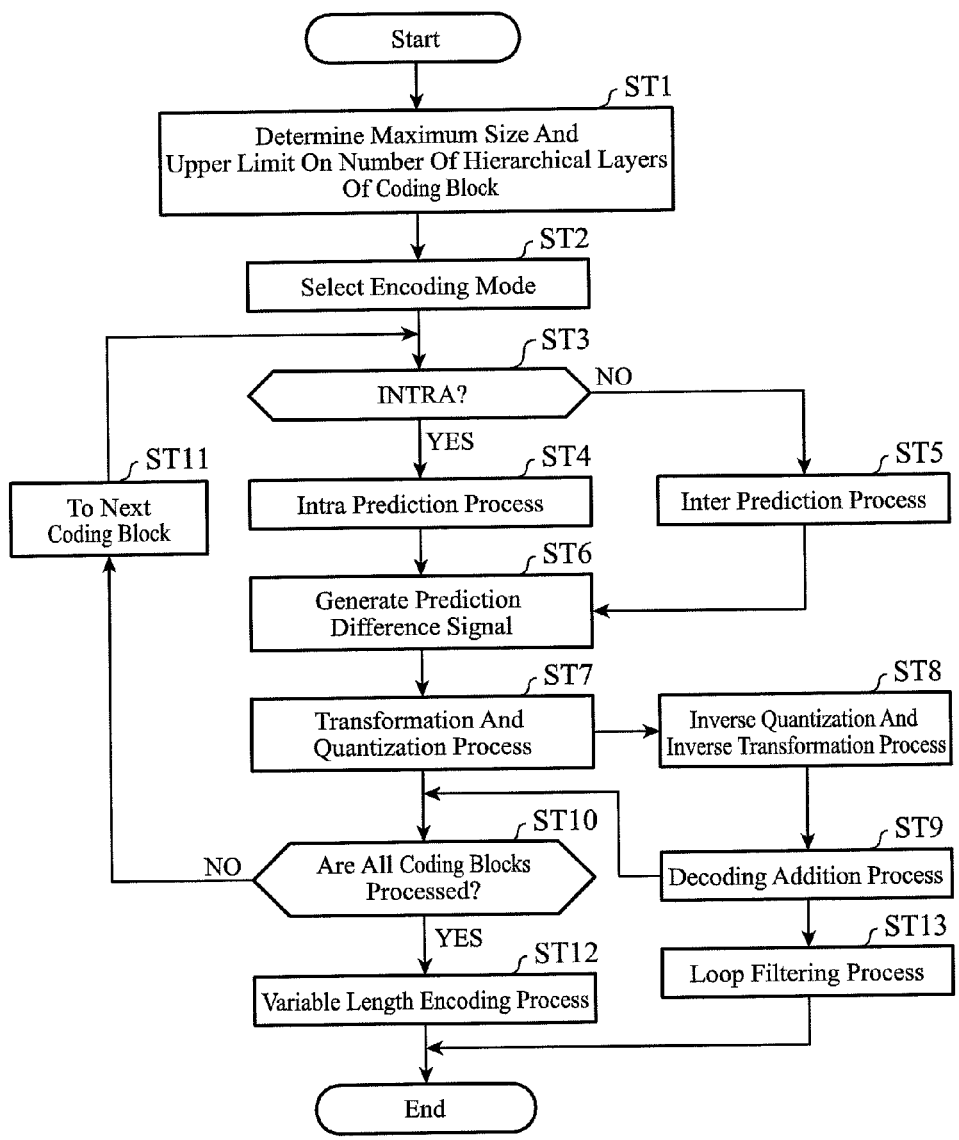
FIG. 7 is a flow chart showing processing carried out by the moving image encoding device in accordance with Embodiment 1 of the present invention.

In the example of FIG. 1, the encoding controlling part 1, the block dividing part 2, the selection switch 3, the intra prediction part 4, the motion-compensated prediction part 5, the subtracting part 6, the transformation/quantization part 7, the inverse quantization/inverse transformation part 8, the adding part 9, the loop filter part 11, and the variable length encoding part 13, which are the components of the moving image encoding device, can consist of pieces of hardware for exclusive use (e.g., integrated circuits in each of which a CPU is mounted, one chip microcomputers, or the like), respectively. As an alternative, the moving image encoding device can consist of a computer, and a program in which the processes carried out by the encoding controlling part 1, the block dividing part 2, the selection switch 3, the intra prediction part 4, the motion-compensated prediction part 5, the subtracting part 6, the transformation/quantization part 7, the inverse quantization/inverse transformation part 8, the adding part 9, the loop filter part 11, and the variable length encoding part 13 are described can be stored in a memory of the computer and the CPU of the computer can be made to execute the program stored in the memory. FIG. 7 is a flow chart showing the processing carried out by the moving image encoding device in accordance with Embodiment 1 of the present invention.

Figure 8:
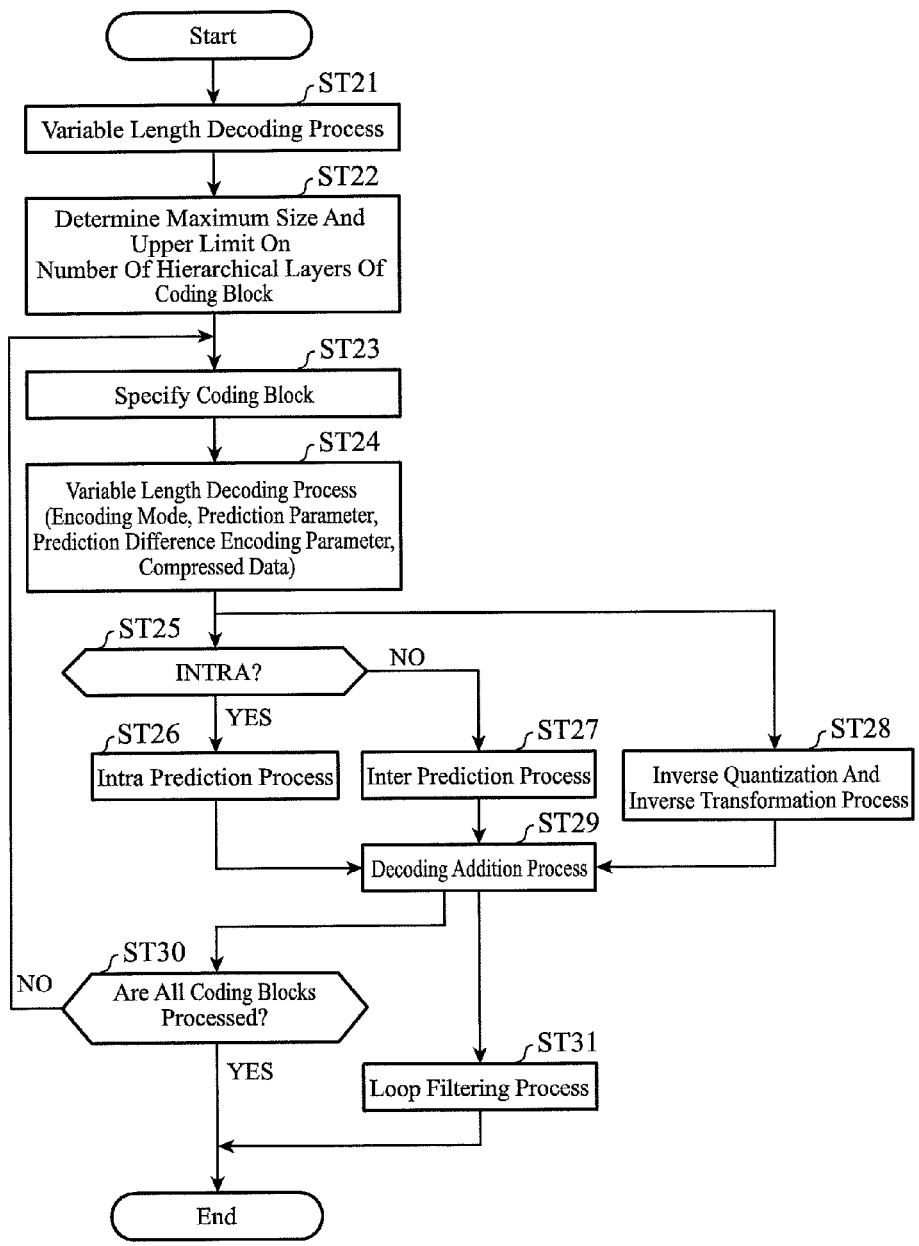
FIG. 8 is a flow chart showing processing carried out by the moving image decoding device in accordance with Embodiment 1 of the present invention.

In the example of FIG. 5, the variable length decoding part 51, the selection switch 52, the intra prediction part 53, the motion-compensated prediction part 54, the inverse quantization/inverse transformation part 55, the adding part 56, and the loop filter part 58, which are the components of the moving image decoding device, can consist of pieces of hardware for exclusive use (e.g., integrated circuits in each of which a CPU is mounted, one chip microcomputers, or the like), respectively. As an alternative, the moving image decoding device can consist of a computer, and a program in which the processes carried out by the variable length decoding part 51, the selection switch 52, the intra prediction part 53, the motion-compensated prediction part 54, the inverse quantization/inverse transformation part 55, the adding part 56, and the loop filter part 58 are described can be stored in a memory of the computer and the CPU of the computer can be made to execute the program stored in the memory. FIG. 8 is a flow chart showing the processing carried out by the moving image decoding device in accordance with Embodiment 1 of the present invention.

Next, the operation of the moving image encoding device and the operation of the moving image decoding device will be explained. First, the processing carried out by the moving image encoding device shown in FIG. 1 will be explained. First, the encoding controlling part 1 determines a maximum size of each of blocks to be encoded which is a unit to be processed at a time when a motion-compensated prediction process (inter-frame prediction process) or an intra prediction process (intra-frame prediction process) is carried out, and also determines an upper limit on the number of hierarchical layers in a hierarchy in which each of the blocks to be encoded having the maximum size is hierarchically divided into blocks (step ST1 of FIG. 7).

As a method of determining the maximum size of each of blocks to be encoded, for example, there is considered a method of determining a maximum size for all the pictures according to the resolution of the inputted image. Further, there can be considered a method of quantifying a variation in the complexity of a local movement of the inputted image as a parameter and then determining a small size for a picture having a large and vigorous movement while determining a large size for a picture having a small movement. As a method of determining the upper limit on the number of hierarchical layers, for example, there can be considered a method of increasing the depth of the hierarchy, i.e., the number of hierarchical layers to make it possible to detect a finer movement as the inputted image has a larger and more vigorous movement, or decreasing the depth of the hierarchy, i.e., the number of hierarchical layers as the inputted image has a smaller movement.

The encoding controlling part 1 also selects an encoding mode suitable for each of the blocks to be encoded into which each block to be encoded having the maximum size is divided hierarchically from among one or more available encoding modes (M intra encoding modes and N inter encoding modes (including an inter encoding mode which is a direct mode)) (step ST2). Although a detailed explanation of the selection method of selecting an encoding mode for use in the encoding controlling part 1 will be omitted because the selection method is a known technique, there is a method of carrying out an encoding process on the block to be encoded by using an arbitrary available encoding mode to examine the encoding efficiency and select an encoding mode having the highest level of encoding efficiency from among a plurality of available encoding modes, for example.

Figure 9:
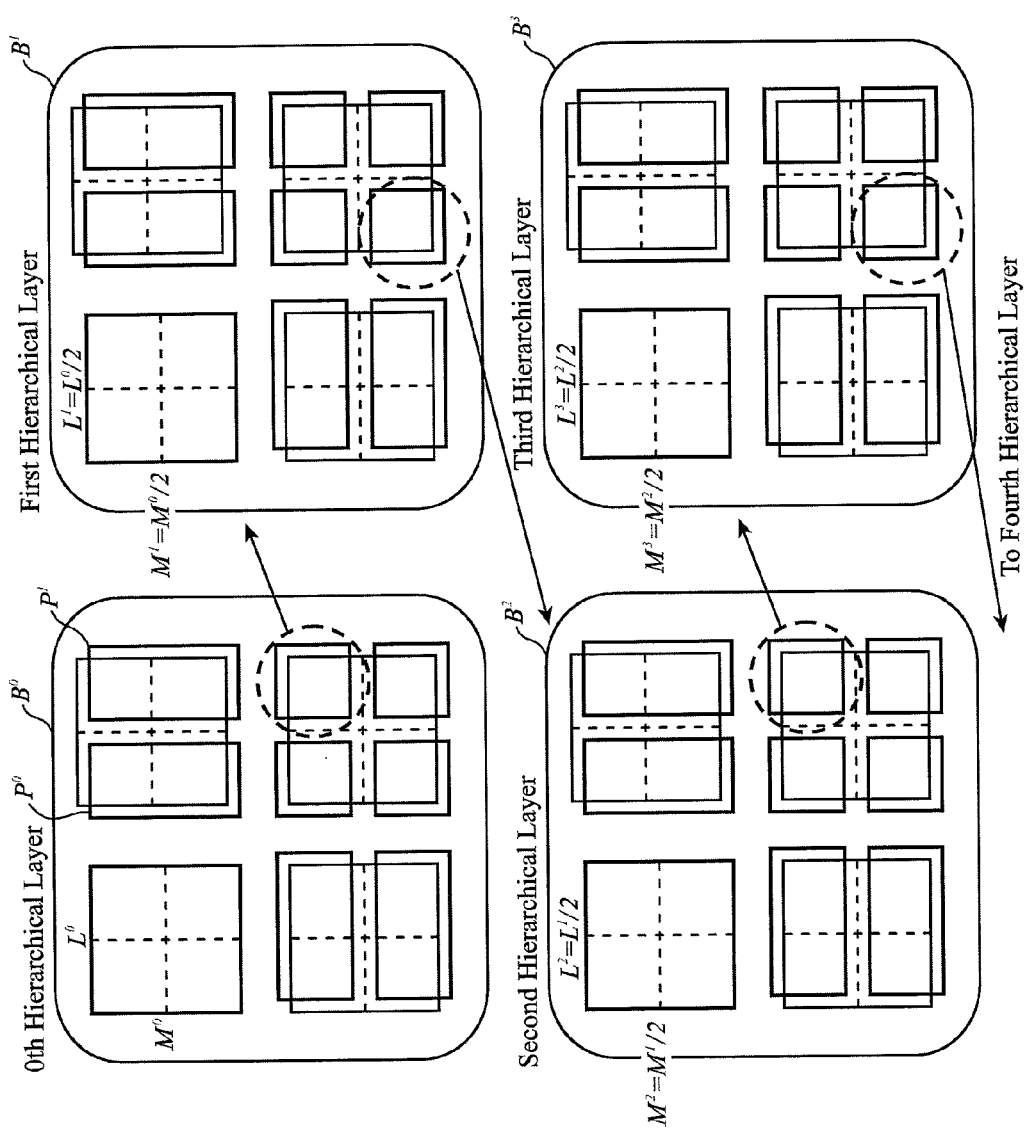
FIG. 9 is an explanatory drawing showing a state in which each block to be encoded having a maximum size is hierarchically divided into a plurality of blocks to be encoded.

When receiving the video signal showing the inputted image, the block dividing part 2 divides the inputted image shown by the video signal into blocks to be encoded each having the maximum size determined by the encoding controlling part 1, and also divides each of the blocks to be encoded into blocks hierarchically until the number of hierarchical layers reaches the upper limit on the number of hierarchical layers which is determined by the encoding controlling part 1. FIG. 9 is an explanatory drawing showing a state in which each block to be encoded having the maximum size is hierarchically divided into a plurality of blocks to be encoded. In the example of FIG. 9, each block to be encoded having the maximum size is a block to be encoded $B^0$ in the 0th hierarchical layer, and its luminance component has a size of ($L^0$, $M^0$). Further, in the example of FIG. 9, by carrying out the hierarchical division with this block to be encoded $B^0$ having the maximum size being set as a starting point until the depth of the hierarchy reaches a predetermined depth which is set separately according to a quadtree structure, blocks to be encoded $B^n$ can be acquired.

At the depth of n, each block to be encoded $B^n$ is an image area having a size of ($L^n$, $M^n$). In this example, although $M^n$ can be the same as or differ from $L^n$, the case of $L^n=M^n$ is shown in FIG. 4. Hereafter, the size of each block to be encoded $B^n$ is defined as the size of ($L^n$, $M^n$) in the luminance component of the block to be encoded $B^n$.

Because the block dividing part 2 carries out a quadtree division, ($L^{n+1}$, $M^{n+1}$)=($L^n/2$, $M^n/2$) is always established. In the case of a color video image signal (4:4:4 format) in which all the color components have the same sample number, such as an RGB signal, all the color components have a size of ($L^n$, $M^n$), while in the case of handling a 4:2:0 format, a corresponding color difference component has an encoding block size of ($L^n/2$, $M^n/2$). Hereafter, an encoding mode selectable for each block to be encoded $B^n$ in the nth hierarchical layer is expressed as m($B^n$).

In the case of a color video signal which consists of a plurality of color components, the encoding mode m($B^n$) can be formed in such a way that an individual mode is used for each color component. Hereafter, an explanation will be made by assuming that the encoding mode m($B^n$) indicates the one for the luminance component of each block to be encoded having a 4:2:0 format in a YUV signal unless otherwise specified. The encoding mode m($B^n$) can be one of one or more intra encoding modes (generically referred to as "INTRA") or one or more inter encoding modes (generically referred to as "INTER"), and the encoding controlling part 1 selects, as the encoding mode m($B^n$), an encoding mode with the highest degree of encoding efficiency for each block to be encoded $B^n$ from among all the encoding modes available in the picture currently being processed or a subset of these encoding modes, as mentioned above.

Each block to be encoded $B^n$ is further divided into one or more prediction units (partitions) by the block dividing part, as shown in FIG. 9. Hereafter, each partition belonging to each block to be encoded $B^n$ is expressed as $P_i^n$ (i shows a partition number in the nth hierarchical layer). How the division of each block to be encoded $B^n$ into partitions $P_i^n$ belonging to the block to be encoded $B^n$ is carried out is included as information in the encoding mode m($B^n$). While the prediction process is carried out on each of all the partitions $P_i^n$ according to the encoding mode m($B^n$), an individual prediction parameter can be selected for each partition $P_i^n$.

Figure 10B:
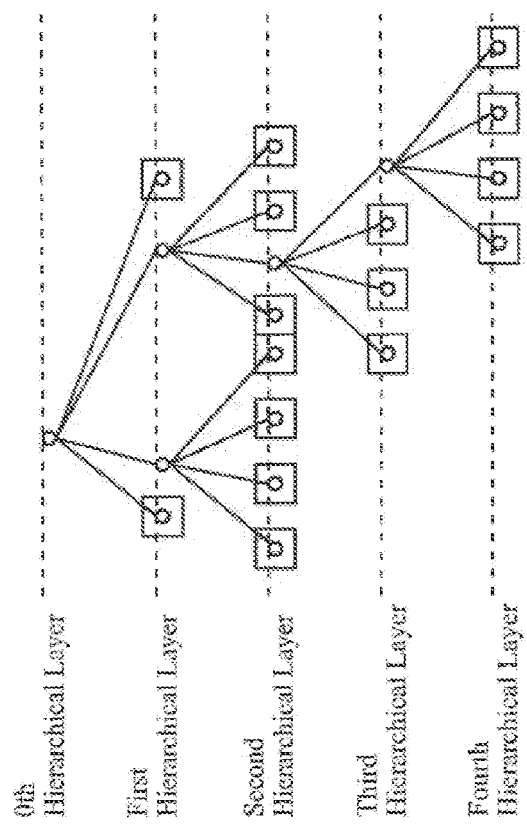
FIGS. 10a & 10b FIG. 10(a) is an explanatory drawing showing a distribution of partitions into which a block to encoded is divided.
Figure 10A:
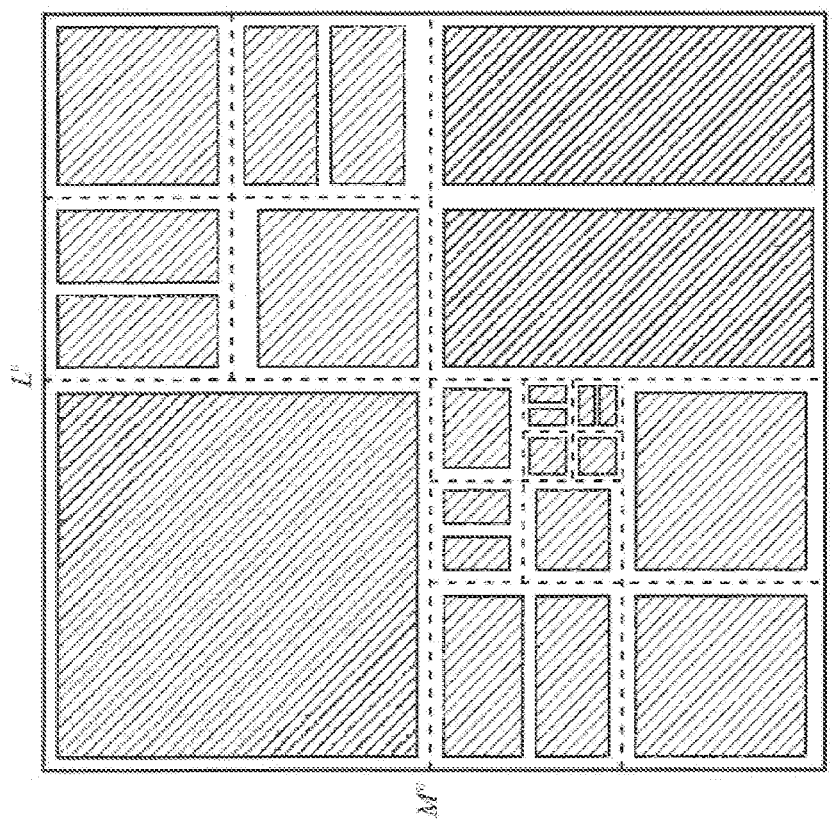

The encoding controlling part 1 produces such a block division state as shown in, for example, FIGS. 10a & 10b for a block to be encoded having the maximum size, and then determines blocks to be encoded $B^n$. Hatched portions shown in FIG. 10(a) show a distribution of partitions into which the block to be encoded having the maximum size is divided, and FIG. 10(b) shows a situation in which encoding modes m($B^n$) are respectively assigned to the partitions generated through the hierarchical layer division by using a quadtree graph. Each node enclosed by shown in FIG. 10(b) is a node (block to be encoded $B^n$) to which an encoding mode m($B^n$) is assigned.

When the encoding controlling part 1 selects an optimal encoding mode m($B^n$) for each partition $P_i^n$ of each block to be encoded $B^n$, and the encoding mode m($B^n$) is an intra encoding mode (step ST3), the selection switch 3 outputs the partition $P_i^n$ of the block to be encoded $B^n$, which is generated through the division by the block dividing part 2, to the intra prediction part 4. In contrast, when the encoding mode m($B^n$) is an inter encoding mode (step ST3), the selection switch outputs the partition $P_i^n$ of the block to be encoded $B^n$, which is generated through the division by the block dividing part 2, to the motion-compensated prediction part 5.

When receiving the partition $P_i^n$ of the block to be encoded $B^n$ from the selection switch 3, the intra prediction part 4 carries out an intra prediction process on the partition $P_i^n$ of the block to be encoded $B^n$ by using the intra prediction parameters corresponding to the encoding mode m($B^n$) selected by the encoding controlling part 1 to generate an intra prediction image $P_i^n$ (step ST4). The intra prediction part 4 outputs the intra prediction image $P_i^n$ to the subtracting part 6 and the adding part 9 after generating the intra prediction image $P_i^n$, while outputting the intra prediction parameters to the variable length encoding part 13 to enable the moving image decoding device shown in FIG. 5 to generate the same intra prediction image $P_i^n$. Although the intra prediction process shown in this Embodiment 1 is not limited to the one according to an algorithm determined in the AVC/H.264 standards (ISO/IEC 14496-10), the intra prediction parameters need to include information required for the moving image encoding device and the moving image decoding device to generate the completely same intra prediction image.

When receiving the partition $P_i^n$ of the block to be encoded $B^n$ from the selection switch 3, and the encoding mode $m(B^n)$ selected by the encoding controlling part 1 is an inter encoding mode which is a direct mode, the motion-compensated prediction part 5 generates a spatial direct vector in the spatial direct mode from the motion vector of an already-encoded block located in the vicinity of the partition $P_i^n$ of the block to be encoded $B^n$, and also generates a temporal direct vector in the temporal direct mode from the motion vector of an already-encoded picture which can be referred to by the block to be encoded $B^n$. The motion-compensated prediction part 5 then selects one direct vector which provides a higher correlation between reference images from the spatial direct vector and the temporal direct vector, and performs a motion-compensated prediction process on the partition $P_i^n$ of the block to be encoded $B^n$ by using the direct vector selected thereby and the inter prediction parameters corresponding to the encoding mode $m(B^n)$ to generate a prediction image (step ST5).

In contrast, when the encoding mode $m(B^n)$ selected by the encoding controlling part 1 is an inter encoding mode other than direct modes, the motion-compensated prediction part 5 searches through the partition $P_i^n$ of the block to be encoded $B^n$ and a reference image stored in the motion-compensated prediction frame memory 12 for a motion vector, and carries out a motion-compensated prediction process on the partition $P_i^n$ of the block to be encoded $B^n$ by using the motion vector and the inter prediction parameters corresponding to the encoding mode $m(B^n)$ to generate a prediction image (step ST5). The motion-compensated prediction part 5 outputs the inter prediction image $P_i^n$ to the subtracting part 6 and the adding part 9 after generating the inter prediction image $P_i^n$, while outputting the inter prediction parameters to the variable length encoding part 13 to enable the moving image decoding device shown in FIG. 5 to generate the same inter prediction image $P_i^n$. The inter prediction parameters used for the generation of the inter prediction image include:

Mode information in which the division of the block to be encoded $B^n$ into partitions is described;

The motion vector of each partition;

Reference image indication index information showing which reference image is used for performing a prediction when the motion-compensated prediction frame memory 12 stores a plurality of reference images;

Index information showing which motion vector predicted value is selected and used when there are a plurality of motion vector predicted value candidates;

Index information showing which filter is selected and used when there are a plurality of motion compensation interpolation filters; and Selection information showing which pixel accuracy is used when the motion vector of the partition currently being processed can show a plurality of degrees of pixel accuracy (half pixel, ¼ pixel, ⅛ pixel, etc.).

The inter prediction parameters are multiplexed into the bitstream by the variable length encoding part 13 in order to enable the moving image decoding device to generate the completely same inter prediction image. The outline of the process carried out by the motion-compensated prediction part 5 is as mentioned above, and the details of the process will be mentioned below.

After the intra prediction part 4 or the motion-compensated prediction part 5 generates a prediction image (an intra prediction image $P_i^n$ or an inter prediction image $P_i^n$), the subtracting part 6 subtracts the prediction image (the intra prediction image $P_i^n$ or the inter prediction image $P_i^n$) generated by the intra prediction part 4 or the motion-compensated prediction part 5 from the partition $P_i^n$ of the block to be encoded $B^n$, which is generated through the division by the block dividing part 2, to generate a difference image, and outputs a prediction difference signal $e_i^n$ showing the difference image to the transformation/quantization part 7 (step ST6).

When receiving the prediction difference signal $e_i^n$ showing the difference image from the subtracting part 6, the transformation/quantization part 7 carries out a transforming process (e.g., a DCT (discrete cosine transform) or an orthogonal transformation process, such as a KL transform, in which bases are designed for a specific learning sequence in advance) on the difference image in units of a block having the transformation block size included in the prediction difference encoding parameters outputted thereto from the encoding controlling part 1, and quantizes the transform coefficients of the difference image by using the quantization parameter included in the prediction difference encoding parameters and outputs the transform coefficients quantized thereby to the inverse quantization/inverse transformation part 8 and the variable length encoding part 13 as compressed data of the difference image (step ST7).

When receiving the compressed data of the difference image from the transformation/quantization part 7, the inverse quantization/inverse transformation part 8 inverse-quantizes the compressed data of the difference image by using the quantization parameter included in the prediction difference encoding parameters outputted thereto from the encoding controlling part 1, performs an inverse transformation process (e.g., an inverse DCT (inverse discrete cosine transform) or an inverse transformation process such as an inverse KL transform) on the compressed data inverse-quantized thereby in units of a block having the transformation block size included in the prediction difference encoding parameters, and outputs the compressed data on which the inverse quantization/inverse transformation part performs the inverse transformation process as a local decoded prediction difference signal $e_i^n$ hat ("^" attached to an alphabetical letter is expressed by hat for reasons of the restrictions on electronic applications) (step ST8).

When receiving the local decoded prediction difference signal $e_i^n$ hat from the inverse quantization/inverse transformation part 8, the adding part 9 adds the local decoded prediction difference signal $e_i^n$ hat and the prediction signal showing the prediction image (the intra prediction image $P_i^n$ or the inter prediction image $P_i^n$) generated by the intra prediction part 4 or the motion-compensated prediction part 5 to generate a local decoded image which is a local decoded partition image $P_i^n$ hat or a local decoded block to be encoded image which is a group of local decoded partition images (step ST9). After generating the local decoded image, the adding part 9 stores a local decoded image signal showing the local decoded image in the memory 10 for intra prediction and also outputs the local decoded image signal to the loop filter part 11.

The moving image encoding device repeatedly carries out the processes of steps ST3 to ST9 until the moving image encoding device completes the processing on all the blocks to be encoded B″ into which the inputted image is divided hierarchically, and, when completing the processing on all the blocks to be encoded B″, shifts to a process of step ST12 (steps ST10 and ST11).

The variable length encoding part 13 entropy-encodes the compressed data outputted thereto from the transformation/quantization part 7, the encoding mode (including the information showing the state of the division into the blocks to be encoded) and the prediction difference encoding parameters, which are outputted thereto from the encoding controlling part 1, and the intra prediction parameters outputted thereto from the intra prediction part 4 or the inter prediction parameters outputted thereto from the motion-compensated prediction part 5. The variable length encoding part 13 multiplexes encoded data which are the encoded results of the entropy encoding of the compressed data, the encoding mode, the prediction difference encoding parameters, and the intra prediction parameters or the inter prediction parameters to generate a bitstream (step ST12).

When receiving the local decoded image signal from the adding part 9, the loop filter part 11 compensates for an encoding distortion included in the local decoded image signal, and stores the local decoded image shown by the local decoded image signal on which the loop filter part performs the encoding distortion compensation in the motion-compensated prediction frame memory 12 as a reference image (step ST13). The loop filter part 11 can carry out the filtering process for each block to be encoded having the maximum size of the local decoded image signal outputted thereto from the adding part 9 or for each block to be encoded. As an alternative, after the local decoded image signal corresponding to all the macroblocks of one screen is outputted, the loop filter part can carry out the filtering process on all the macroblocks of the one screen at a time.

Next, the processing carried out by the motion-compensated prediction part 5 will be explained in detail. When the encoding mode m(B″) selected by the encoding controlling part 1 is an inter mode other than direct modes, the selection switch 21 of the motion-compensated prediction part 5 outputs each of the partitions $P_i^n$ into which the block to be encoded B″ is divided by the block dividing part 2 to the motion vector searching part 22. In contrast, when the encoding mode m(B″) is an inter mode which is a direct mode, the selection switch outputs each of the partitions $P_i^n$ into which the block to be encoded B″ is divided by the block dividing part 2 to the direct vector generating part 23. In this case, because the direct vector generating part 23 does not use each of the partitions $P_i^n$ of the block to be encoded B″ for the generation of a direct vector, the direct vector generating part does not have to output each of the partitions $P_i^n$ of the block to be encoded B″ to the direct vector generating part 23 even though the encoding mode m(B″) is an inter mode which is a direct mode.

When receiving each of the partitions $P_i^n$ of the block to be encoded B″ from the selection switch 21, the motion vector searching part 22 of the motion-compensated prediction part 5 searches for an optimal motion vector in the inter mode while referring to the partition $P_i^n$ and a reference image stored in the motion-compensated prediction frame memory 12, and outputs the motion vector to the motion compensation processing part 24. Because the process of searching for an optimal motion vector in the inter mode is a known technique, a detailed explanation of the process will be omitted hereafter.

When encoding mode m(B″) is a direct mode, the direct vector generating part 23 of the motion-compensated prediction part 5 generates both a spatial direct vector in the spatial direct mode and a temporal direct vector in the temporal direct mode for each of the partitions $P_i^n$ of the block to be encoded B″, and outputs either of the spatial direct vector and the temporal direct vector to the motion compensation processing part 24 as a motion vector. Because the information showing the state of the division into the partitions $P_i^n$ belonging to the block to be encoded B″ is included in the encoding mode m(B″), as mentioned above, the direct vector generating part 23 can specify each of the partitions $P_i^n$ of the block to be encoded B″ by referring to the encoding mode m(B″).

More specifically, the spatial direct vector generating part 31 of the direct vector generating part 23 reads the motion vector of an already-encoded block located in the vicinity of each of the partitions $P_i^n$ of the block to be encoded B″ from among the motion vectors of already-encoded blocks stored in the not-shown motion vector memory or the not-shown internal memory to generate a spatial direct vector in the spatial direct mode from the motion vector. Further, the temporal direct vector generating part 32 of the direct vector generating part 23 reads the motion vector of a block located spatially at the same position as each of the partitions $P_i^n$ of the block to be encoded B″, which is the motion vector of an already-encoded picture which can be referred to by the block to be encoded B″, from among the motion vectors of already-encoded blocks to generate a temporal direct vector in the temporal direct mode from the motion vector.

Figure 11:
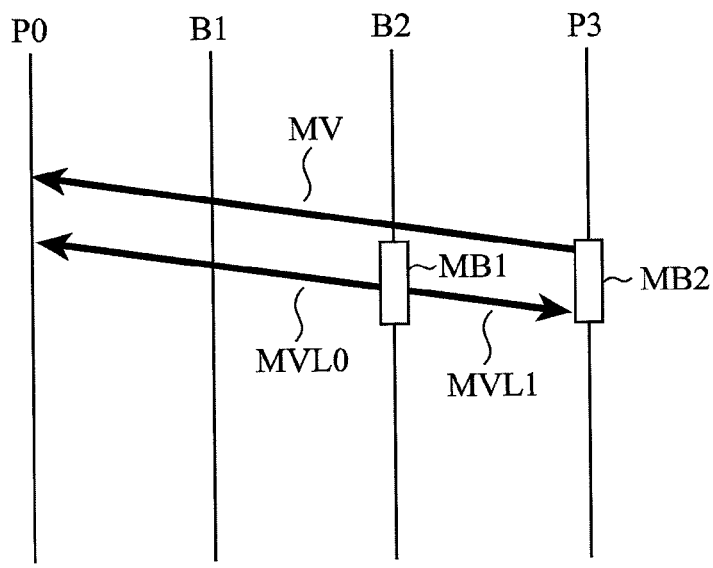
FIG. 11 is a schematic diagram showing a method of generating a motion vector in a temporal direct mode.

FIG. 11 is a schematic diagram showing a method of generating a motion vector (temporal direct vector) in the temporal direct mode. For example, a case in which a block MB1 in a picture B2 is the partition $P_i^n$ which is the target to be encoded, and the block MB1 is encoded in the temporal direct mode is taken as an example. In this example, the temporal direct vector generating part uses the motion vector MV of a block MB2 which is the motion vector of a picture P3 closest to the picture B2 among the already-encoded pictures located backward with respect to the picture B2 on the time axis, and which is spatially located at the same position as the block MB1. This motion vector MV refers to a picture P0, and motion vectors MVL0 and MVL1 which are used when encoding the block MB1 are calculated according to the following equation (3).

$$MVL0 = \frac{T2 - T0}{T3 - T0} \times MV \qquad (3)$$

$$MVL1 = \frac{T2 - T3}{T3 - T0} \times MV$$

After calculating the motion vectors MVL0 and MVL1, the temporal direct vector generating part 32 outputs the motion vectors MVL0 and MVL1 to the direct vector determining part 33 as temporal direct vectors in the temporal direct mode. Although as the method of generating a temporal direct vector which the temporal direct vector generating part 32 uses, an H.264 method as shown in FIG. 11 can be used, this embodiment is not limited to this method and another method can be alternatively used.

Figure 12:
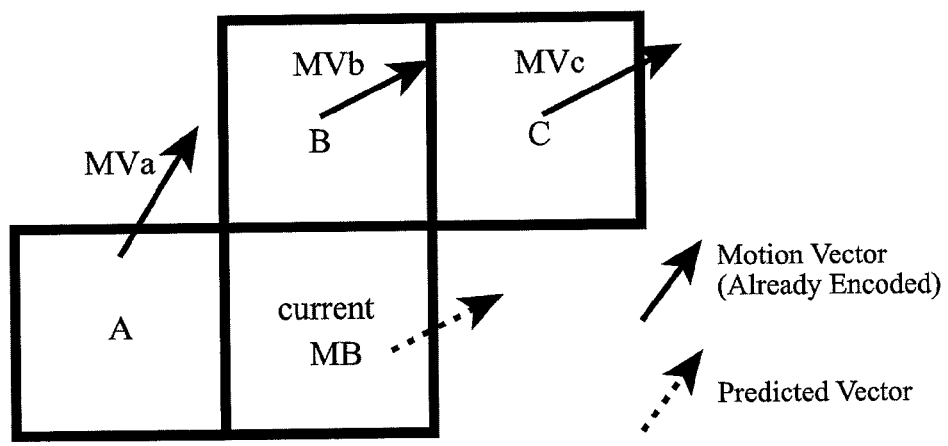
FIG. 12 is a schematic diagram showing a method of generating a motion vector in a spatial direct mode.

FIG. 12 is a schematic diagram showing the method of generating a motion vector (spatial direct vector) in the spatial direct mode. In FIG. 12, currentMB denotes the partition $P_i^n$ which is the block to be encoded. At this time, when the motion vector of an already-encoded block A on a left side of the block to be encoded is expressed as MVa, the motion vector of an already-encoded block B on an upper side of the block to be encoded is expressed as MVb, and the motion vector of an already-encoded block C on an upper right side of the block to be encoded is expressed as MVc, the spatial direct vector generating part can calculate the motion vector MV of the block to be encoded by determining the median of these motion vectors MVa, MVb, and MVc, as shown by the following equation (4).

$$MV = \text{median}(MVa, MVb, MVc) \quad (4)$$

In the spatial direct mode, the spatial direct vector generating part determines the motion vector for each of the list 0 and the list 1. In this case, the spatial direct vector generating part can determine the motion vector for both of the lists by using the above-mentioned method. After calculating the motion vector MV for both the list 0 and the list 1 in the above-mentioned way, the spatial direct vector generating part 31 outputs the motion vector MV of the list 0 and that of the list 1 to the direct vector determining part 33 as spatial direct vectors in the spatial direct mode. Although as the method of generating a spatial direct vector which the spatial direct vector generating part 31 uses, an H.264 method as shown in FIG. 12 can be used, this embodiment is not limited to this method and another method can be alternatively used.

Figure 13:
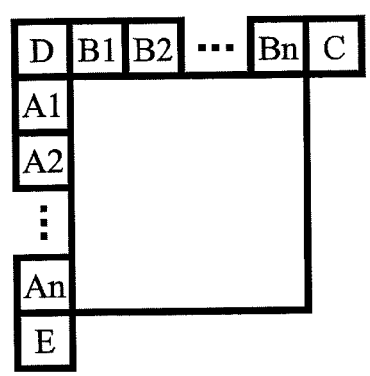
FIG. 13 is a schematic diagram showing a method of generating a spatial direct vector from candidates A1 to An, B1 to Bn, C, D, and E for median prediction.
Figure 14:
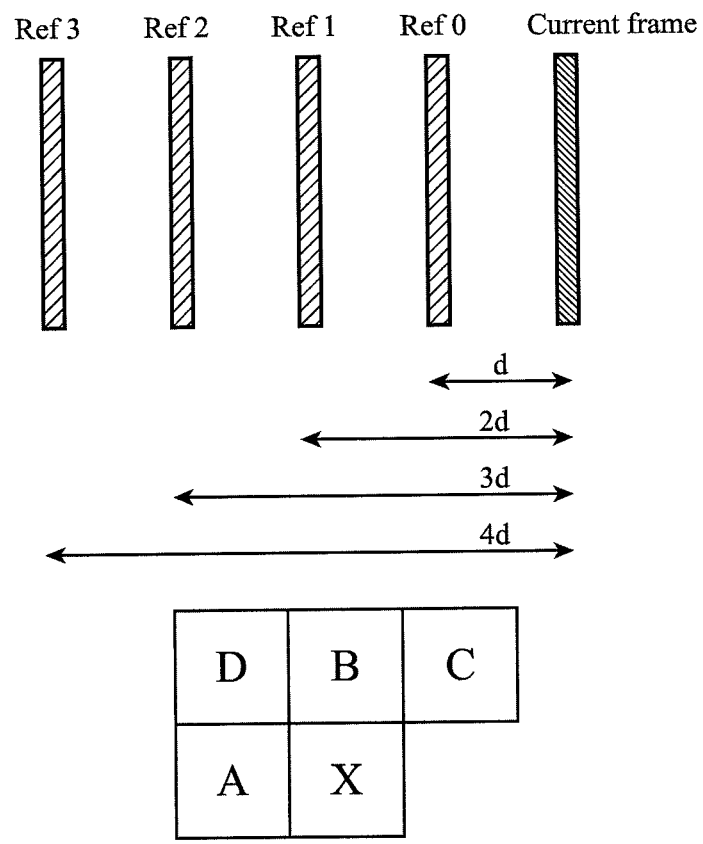
FIG. 14 is a schematic diagram showing a method of generating a spatial direct vector by carrying out scaling according to a distance in a temporal direction.

For example, as shown in FIG. 13, the spatial direct vector generating part can select three motion vectors from a group of blocks A1 to An, a group of blocks B1 to Bn, and a group of blocks C, D, and E as candidates for median prediction, respectively, to generate a spatial direct vector. Further, in a case of ref_Idx in which the candidates for MV which are used for the generation of a spatial direct vector differ from one another, the spatial direct vector generating part can carry out scaling according to the distance in the temporal direction, as shown in FIG. 14.

$$\text{scaled\_MV} = MV \frac{d(Xr)}{d(Yr)} \quad (5)$$

where scaled_MV denotes a scaled vector, MV denotes a motion vector yet to be scaled, and d(x) denotes the temporal distance to x. Further, Xr denotes the reference image shown by the block to be encoded, and Yr denotes the reference image show by each of block positions A to D which is the target for scaling.

After the spatial direct vector generating part 31 generates spatial direct vectors, the direct vector determining part 33 of the direct vector generating part 23 calculates an evaluated value in the spatial direct mode by using the spatial direct vectors. After the temporal direct vector generating part 32 generates temporal direct vectors, the direct vector determining part 33 calculates an evaluated value in the temporal direct mode by using the temporal direct vectors. The direct vector determining part 33 compares the evaluated value in the spatial direct mode with the evaluated value in the temporal direct mode, and selects a direct vector in a direct mode from the spatial direct vector and the temporal direct vector by using a determining part which will be mentioned below, and outputs the direct vector to the motion compensation processing part 24.

Figure 15:
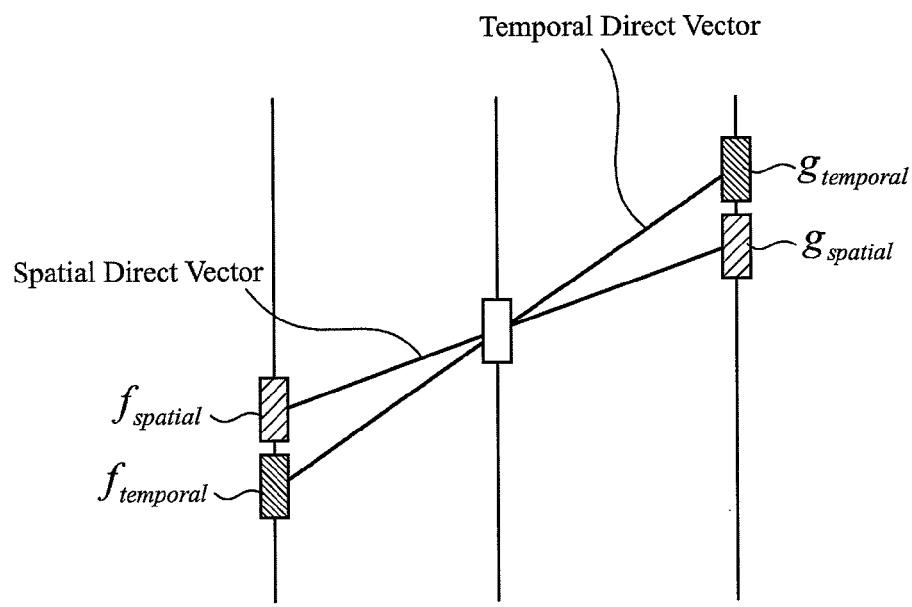
FIG. 15 is an explanatory drawing showing an example of calculation of an evaluated value based on the degree of similarity between a forward prediction image and a backward prediction image.

Hereafter, the processing carried out by the direct vector determining part 33 will be explained concretely. After the spatial direct vector generation part 31 generates the spatial direct vectors MVL0 and MVL1, the motion compensation part 41 of the direct vector determining part 33 generates a list 0 prediction image in the spatial direct mode by using the spatial direct vector MVL0, and also generates a list 1 prediction image in the spatial direct mode by using the spatial direct vector MVL1. FIG. 15 is an explanatory drawing showing an example of the calculation of an evaluated value by using the degree of similarity between a forward prediction image and a backward prediction image. In the example shown in FIG. 15, the motion compensation part generates a forward prediction image $f_{spatial}$ as the list 0 prediction image in the spatial direct mode, and also generates a backward prediction image $g_{spatial}$ as the list 1 prediction image in the spatial direct mode.

After the temporal direct vector generating part 32 generates the temporal direct vectors which are the motion vectors MV of the list 0 and the list 1, the motion compensation part 41 further generates a list 0 prediction image in the temporal direct mode by using the temporal direct vector which is a forward motion vector MV, and also generates a list 1 prediction image in the temporal direct mode by using the temporal direct vector which is a backward motion vector MV. In the example shown in FIG. 15, the motion compensation part generates a forward prediction image $f_{temporal}$ in the temporal direct mode as the list 0 prediction image in the temporal direct mode, and also generates a backward prediction image $g_{temporal}$ as the list 1 prediction image in the temporal direct mode.

Although in this example the motion compensation part generates a forward prediction image as the list 0 prediction image by using a reference image list 0 showing a reference image in a forward direction and also generates a backward prediction image as the list 1 prediction image by using a reference image list 1 showing a reference image in a backward direction, the motion compensation part can alternatively generate a backward prediction image as the list 0 prediction image by using a reference image list 0 showing a reference image in a backward direction and also generate a forward prediction image as the list 1 prediction image by using a reference image list 1 showing a reference image in a forward direction. As an alternative, the motion compensation part can generate forward prediction images as the list 0 prediction image and the list 1 prediction image by using a reference image list 0 showing a reference image in a forward direction and a reference image list 1 showing a reference image in a forward direction, respectively (this process will be mentioned below in detail).

After the motion compensation part generates the list 0 prediction image and the list 1 prediction image in the spatial direct mode, the similarity calculating part 42 of the direct vector determining part 33 calculates an evaluated value $SAD_{spatial}$ in the spatial direct mode, as shown in the following equation (6). For the sake of simplicity, the list 0 prediction image in the spatial direct mode is a forward prediction image $f_{spatial}$, and the list 1 prediction image in the spatial direct mode is a backward prediction image a $g_{spatial}$ in equation (6).

$$SAD_{spatial} = |f_{spatial} - g_{spatial}| \quad (6)$$

Further, after the motion compensation part generates the list 0 prediction image and the list 1 prediction image in the temporal direct mode, the similarity calculating part 42 calculates an evaluated value $SAD_{temporal}$ in the temporal direct mode, as shown in the following equation (7). For the sake of simplicity, the list 0 prediction image in the temporal direct mode is a forward prediction image $f_{temporal}$, and the list 1 prediction image in the spatial direct mode is a backward prediction image $g_{temporal}$ in equation (7).

$$SAD_{temporal} = |f_{temporal} - g_{temporal}| \quad (7)$$

The larger the difference between the forward prediction image and the backward prediction image is, the lower the degree of similarity between the two images is (the evaluated value SAD showing the sum of absolute differences between the two images becomes large), and the lower the temporal correlation between them is. In contrast with this, the smaller the difference between the forward prediction image and the backward prediction image is, the higher the degree of similarity between the two images is (the evaluated value SAD showing the sum of absolute differences between the two images becomes small), and the higher the temporal correlation between them is. Further, an image which is predicted from a direct vector must be an image which is similar to the block to be encoded. Therefore, when prediction images are generated by using two vectors, respectively, the images which are predicted respectively from the vectors are expected to resemble the block to be encoded, and this means that there is a high correlation between the two reference images. Therefore, by selecting a direct vector having a smaller evaluated value SAD from the spatial direct vector and the temporal direct vector, the direct vector determining part can select a mode which provides a high correlation between reference images, and hence can improve the accuracy of the direct mode.

After the similarity calculating part 42 calculates both the evaluated value $SAD_{spatial}$ in the spatial direct mode and the evaluated value $SAD_{temporal}$ in the temporal direct mode, the direct vector selecting part 43 of the direct vector determining part 33 compares the degree of similarity between the forward prediction image $f_{spatial}$ and the backward prediction image $g_{spatial}$ in the spatial direct mode with the degree of similarity between the forward prediction image $f_{temporal}$ and the backward prediction image $g_{temporal}$ in the temporal direct mode by comparing the evaluated value $SAD_{spatial}$ with the evaluated value $SAD_{temporal}$.

When the degree of similarity between the forward prediction image $f_{spatial}$ and the backward prediction image $g_{spatial}$ in the spatial direct mode is equal to or higher than the degree of similarity between the forward prediction image $f_{temporal}$ and the backward prediction image $g_{temporal}$ in the temporal direct mode ($SAD_{spatial} \leq SAD_{temporal}$), the direct vector selecting part 43 selects the spatial direct vector generated by the spatial direct vector generating part 31, and outputs the spatial direct vector to the motion compensation processing part 24 as a motion vector. In contrast, when the degree of similarity between the forward prediction image $f_{temporal}$ and the backward prediction image $g_{temporal}$ in the temporal direct mode is higher than the degree of similarity between the forward prediction image $f_{spatial}$ and the backward prediction image $g_{spatial}$ in the spatial direct mode ($SAD_{spatial} > SAD_{temporal}$), the direct vector selecting part selects the temporal direct vector generated by the temporal direct vector generating part 32, and outputs the temporal direct vector to the motion compensation processing part 24 as a motion vector.

When the encoding mode m(B") is not a direct mode, and the motion compensation processing part 24 receives the motion vector from the motion vector searching part 22, the motion compensation processing part 24 carries out a motion-compensated prediction process on the basis of the inter prediction parameters outputted thereto from the encoding controlling part 1 by using both the motion vector and one frame of reference image stored in the motion-compensated prediction frame memory 12 to generate a prediction image. In contrast, when the encoding mode m(B") is a direct mode and the motion compensation processing part 24 receives the motion vector (i.e., the direct vector selected by the direct vector selection part 43) from the direct vector generating part 23, the motion compensation processing part 24 carries out a motion-compensated prediction process on the basis of the inter prediction parameters outputted thereto from the encoding controlling part 1 by using both the motion vector and one frame of reference image stored in motion-compensated prediction frame memory 12 to generate a prediction image. Because the motion-compensated prediction process carried out by the motion compensation processing part 24 is a known technique, a detailed explanation of the motion-compensated prediction process will be omitted hereafter.

Although the example in which the similarity calculating part 42 calculates the evaluated value SAD which is the sum of absolute differences between the two images both in the temporal direct mode and in the spatial direct mode and the direct vector selecting part 43 compares the evaluated value SAD in the temporal direct mode with that in the spatial direct mode is shown, the similarity calculating part 42 can alternatively calculate the sum of the squares of differences SSE between the forward prediction image and the backward prediction image both in the temporal direct mode and in the spatial direct mode as evaluated values, and the direct vector selecting part 43 can compare the sum of the squares of differences SSE in the temporal direct mode with that in the spatial direct mode. While the use of SSE increases the amount of information to be processed, the degree of similarity can be calculated more correctly.

Next, the processing carried out by the image decoding device shown in FIG. 5 will be explained. When receiving the bitstream outputted thereto from the image encoding device of FIG. 1, the variable length decoding part 51 carries out a variable length decoding process on the bitstream to decode the frame size in units of a sequence which consists of one or more frames of pictures or in units of a picture (step ST21 of FIG. 8). The variable length decoding part 51 determines a maximum size of each of coding blocks which is a unit to be processed at a time when a motion-compensated prediction process (inter-frame prediction process) or an intra prediction process (intra-frame prediction process) is carried out according to the same procedure as that which the encoding controlling part 1 shown in FIG. 1 uses, and also determines an upper limit on the number of hierarchical layers in a hierarchy in which each of the coding blocks having the maximum size is hierarchically divided into blocks (step ST22). For example, when the maximum size of each of coding blocks is determined according to the resolution of the inputted image in the image encoding device, the variable length decoding part determines the maximum size of each of the coding blocks on the basis of the frame size which the variable length decoding part has decoded previously. When information showing both the maximum size of each of the coding blocks and the upper limit on the number of hierarchical layers is multiplexed into the bitstream, the variable length decoding part refers to the information which is acquired by decoding the bitstream.

Because the information showing the state of the division of each of the coding blocks $B^0$ having the maximum size is included in the encoding mode $m(B^0)$ of the coding block $B^0$ having the maximum size which is multiplexed into the bitstream, the variable length decoding part 51 specifies each of the coding blocks B″ into which the image is divided hierarchically by decoding the bitstream to acquire the encoding mode m(B⁰) of the coding block B⁰ having the maximum size which is multiplexed into the bitstream (step ST23). After specifying each of the coding blocks B″, the variable length decoding part 51 decodes the bitstream to acquire the encoding mode m(B″) of the coding block B″ to specify each partition $P_i''$ belonging to the coding block B″ on the basis of the information about the partition $P_i''$ belonging to the encoding mode m(B″). After specifying each partition $P_i''$ belonging to the coding block B″, the variable length decoding part 51 decodes the encoded data to acquire the compressed data, the encoding mode, the prediction difference encoding parameters, and the intra prediction parameters/inter prediction parameters for each partition $P_i''$ (step ST24).

When the encoding mode m(B″) of the partition $P_i''$ belonging to the coding block B″, which is specified by the variable length decoding part 51, is an intra encoding mode (step ST25), the selection switch 52 outputs the intra prediction parameters outputted thereto from the variable length decoding part 51 to the intra prediction part 53. In contrast, when the encoding mode m(B″) of the partition $P_i''$ is an inter encoding mode (step ST25), the selection switch outputs the inter prediction parameters outputted thereto from the variable length decoding part 51 to the motion-compensated prediction part 54. When receiving the intra prediction parameters from the selection switch 52, the intra prediction part 53 carries out an intra prediction process on the partition $P_i''$ of the coding block B″ by using the intra prediction parameters to generate an intra prediction image $P_i''$ (step ST26).

When receiving the inter prediction parameters from the selection switch 52 and the encoding mode m(B″) outputted thereto from the variable length decoding part 51 is an inter encoding mode which is a direct mode, the motion-compensated prediction part 54 generates a spatial direct vector in the spatial direct mode and a temporal direct vector in the temporal direct mode, like the motion-compensated prediction part 5 shown in FIG. 1. After generating a spatial direct vector in the spatial direct mode and a temporal direct vector in the temporal direct mode, the motion-compensated prediction part 54 selects one direct vector which provides a higher correlation between reference images from the spatial direct vector and the temporal direct vector, like the motion-compensated prediction part 5 shown in FIG. 1, and carries out a motion-compensated prediction process on the partition $P_i''$ of the coding block B″ by using the direct vector selected thereby and the inter prediction parameters to generate an inter prediction image $P_i''$ (step ST27).

In contrast, when the encoding mode m(B″) outputted thereto from the variable length decoding part 51 is an inter encoding modes other than direct modes, the motion compensation processing part 63 of the motion-compensated prediction part 54 carries out a motion-compensated prediction process on the partition $P_i''$ of the coding block B″ by using the motion vector included in the inter prediction parameters outputted thereto from the selection switch 52 to generate an inter prediction image $P_i''$ (step ST27).

The inverse quantization/inverse transformation part 55 inverse-quantizes the compressed data associated with the coding block, which are outputted thereto from the variable length decoding part 51, by using the quantization parameter included in the prediction difference encoding parameters outputted thereto from the variable length decoding part 51, and performs an inverse transformation process (e.g., an inverse DCT (inverse discrete cosine transform) or an inverse transformation process such as an inverse KL transform) on the compressed data inverse-quantized thereby in units of a block having the transformation block size included in the prediction difference encoding parameters, and outputs the compressed data on which the inverse quantization/inverse transformation part performs the inverse transformation process to the adding part 56 as a decoded prediction difference signal (signal showing a pre-compressed difference image) (step ST28).

When receiving the decoded prediction difference signal from the inverse quantization/inverse transformation part 55, the adding part 56 generates a decoded image by adding the decoded prediction difference signal and the prediction signal showing the prediction image generated by the intra prediction part 53 or the motion-compensated prediction part 54 and stores the decoded image signal showing the decoded image in the memory 57 for intra prediction, and also outputs the decoded image signal to the loop filter part 58 (step ST29).

The moving image decoding device repeatedly carries out the processes of steps ST23 to ST29 until the moving image decoding device completes the processing on all the coding blocks B″ into which the image is divided hierarchically (step ST30). When receiving the decoded image signal from the adding part 56, the loop filter part 58 compensates for an encoding distortion included in the decoded image signal, and stores the decoded image shown by the decoded image signal on which the loop filter part performs the encoding distortion compensation in the motion-compensated prediction frame memory 59 as a reference image (step ST31). The loop filter part 58 can carry out the filtering process for each coding block having the maximum size of the local decoded image signal outputted thereto from the adding part 56 or each coding block. As an alternative, after the local decoded image signal corresponding to all the macroblocks of one screen is outputted, the loop filter part can carry out the filtering process on all the macroblocks of the one screen at a time.

As can be seen from the above description, the moving image encoding device in accordance with this Embodiment 1 is constructed in such a way that the moving image encoding device includes: the encoding controlling part 1 for determining a maximum size of each of blocks to be encoded which is a unit to be processed at a time when a prediction process is carried out, and also determining a hierarchy number upper limit on the number of hierarchical layers in a hierarchy in which each of the blocks to be encoded having the maximum size is hierarchically divided into blocks, and for selecting an encoding mode suitable for each of the blocks to be encoded into which each block to be encoded having the maximum size is divided hierarchically from one or more available encoding modes; and the block dividing part 2 for dividing an inputted image into blocks to be encoded each having the maximum size determined by the encoding controlling part 1, and also dividing each of the blocks to be encoded hierarchically until its hierarchy number reaches the hierarchy number upper limit determined by the encoding controlling part 1, and, when an inter encoding mode which is a direct mode is selected by the encoding controlling part 1 as an encoding mode suitable for one of the blocks to be encoded into which the inputted image is divided by the block dividing part 2, the motion-compensated prediction part 5 generates a spatial direct vector in a spatial direct mode from the motion vector of an already-encoded block located in the vicinity of the block to be encoded and also generates a temporal direct vector in a temporal direct mode from the motion vector of an already-encoded picture which can be referred to by the block to be encoded, selects one direct vector which provides a higher correlation between reference images from the spatial direct vector and the temporal direct vector, and carries out a motion-compensated prediction process on the block to be encoded by using the direct vector to generate a prediction image. Therefore, there is provided an advantage of being able to select an optimal direct mode for each predetermined block unit, and reduce the code amount.

Further, the moving image decoding device in accordance with this Embodiment 1 is constructed in such a way that the moving image decoding device includes the variable length decoding part 51 for variable-length-decoding the encoded data to acquire the compressed data and the encoding mode associated with each of coding blocks into which an image is hierarchically divided from the encoded data multiplexed into the bitstream, and, when the encoding mode associated with a coding block variable-length-decoded by the variable length decoding part 51 is an inter encoding mode which is a direct mode, the motion-compensated prediction part 54 generates a spatial direct vector in the spatial direct mode from the motion vector of an already-decoded block located in the vicinity of the coding block and also generates a temporal direct vector in the temporal direct mode from the motion vector of an already-decoded picture which can be referred to by the coding block, selects one direct vector which provides a higher correlation between reference images from the spatial direct vector and the temporal direct vector, and carries out a motion-compensated prediction process on the coding block by using the direct vector to generate a prediction image. Therefore, there is provided an advantage of making it possible for the moving image decoding device to decode the encoded data which enable the selection of an optimal direct mode for each fixed block unit.

Embodiment 2

In above-mentioned Embodiment 1, the example in which each of the motion-compensated prediction parts 5 and 54 (concretely, the similarity calculating part 42) calculates the degree of similarity between a forward prediction image $f_{spatial}$ and a backward prediction image $g_{spatial}$ in the spatial direct mode as an evaluated value $SAD_{spatial}$ in the spatial direct mode while calculating the degree of similarity between a forward prediction image $f_{temporal}$ and a backward prediction image $g_{temporal}$ in the temporal direct mode as an evaluated value $SAD_{temporal}$ in the temporal direct mode is shown, each of the motion-compensated prediction parts can alternatively calculate a variance σ (spatial) of the motion vectors of already-encoded blocks (decoded blocks) located in the vicinity of a block to be encoded B″ as an evaluated value in the spatial direct mode while calculating a variance σ (temporal) of the motion vectors of already-encoded blocks (decoded blocks) located in the vicinity of a block located spatially at the same position as the block to be encoded B″ in an encoded picture (decoded picture) which can be referred to by the block to be encoded B″ as an evaluated value in the temporal direct mode. This embodiment can provide the same advantages as those provided by above-mentioned Embodiment 1.

Figure 16A:
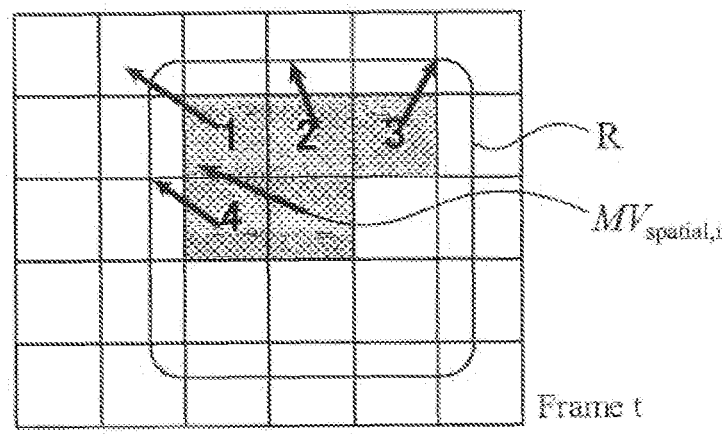
FIGS. 16a & 16b are explanatory drawings showing an evaluation equation using a variance of motion vectors.
Figure 16B:
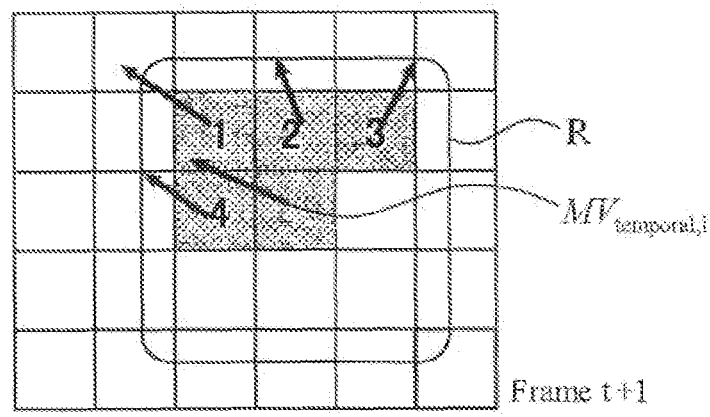

More specifically, the similarity calculating part 42 calculates a variance σ (spatial) of the motion vectors of already-encoded blocks (decoded blocks) located in the vicinity of the block to be encoded B″ as the evaluated value $SAD_{spatial}$ in the spatial direct mode (refer to the following equation (8)), as shown in FIG. 16(*a*), instead of calculating the degree of similarity between the forward prediction image $f_{spatial}$ and the backward prediction image $g_{spatial}$ in the spatial direct mode. Further, the similarity calculating part 42 calculates a variance σ (temporal) of the motion vectors of already-encoded blocks (decoded blocks) located in the vicinity of a block located spatially at the same position as the block to be encoded B″ in an encoded picture (decoded picture) which can be referred to by the block to be encoded B″ as the evaluated value $SAD_{temporal}$ in the temporal direct mode (refer to the following equation (8)), as shown in FIG. 16(*b*), instead of calculating the degree of similarity between the forward prediction image $f_{temporal}$ and the backward prediction image $g_{temporal}$ in the temporal direct mode.

$$\sigma(m) = \frac{1}{N} \sum_{i \in R} (MV_{m,i} - \overline{MV}_m)^2, \qquad (8)$$

$$N = 4$$

where $MV_{m,i}$ is the motion vector of an adjacent block, and $\overline{MV}_m$ is the average of the motion vectors of adjacent blocks.

Further, m is a symbol showing spatial or temporal.

The direct vector selecting part 43 compares the variance σ (temporal) of the motion vectors with the variance σ (spatial) of the motion vectors, and, when the variance σ (temporal) of the motion vectors is equal to or larger than the variance σ (spatial) of the motion vectors, determines that the reliability of the motion vector in the spatial direct mode (spatial direct vector) is low, and selects the motion vector in the temporal direct mode (temporal direct vector). In contrast, when the variance σ (spatial) of the motion vectors is larger than the variance σ (temporal) of the motion vectors, the direct vector selecting part determines that the reliability of the motion vector in the temporal direct mode (temporal direct vector) is low, and selects the motion vector in the spatial direct mode (spatial direct vector).

Figure 17:
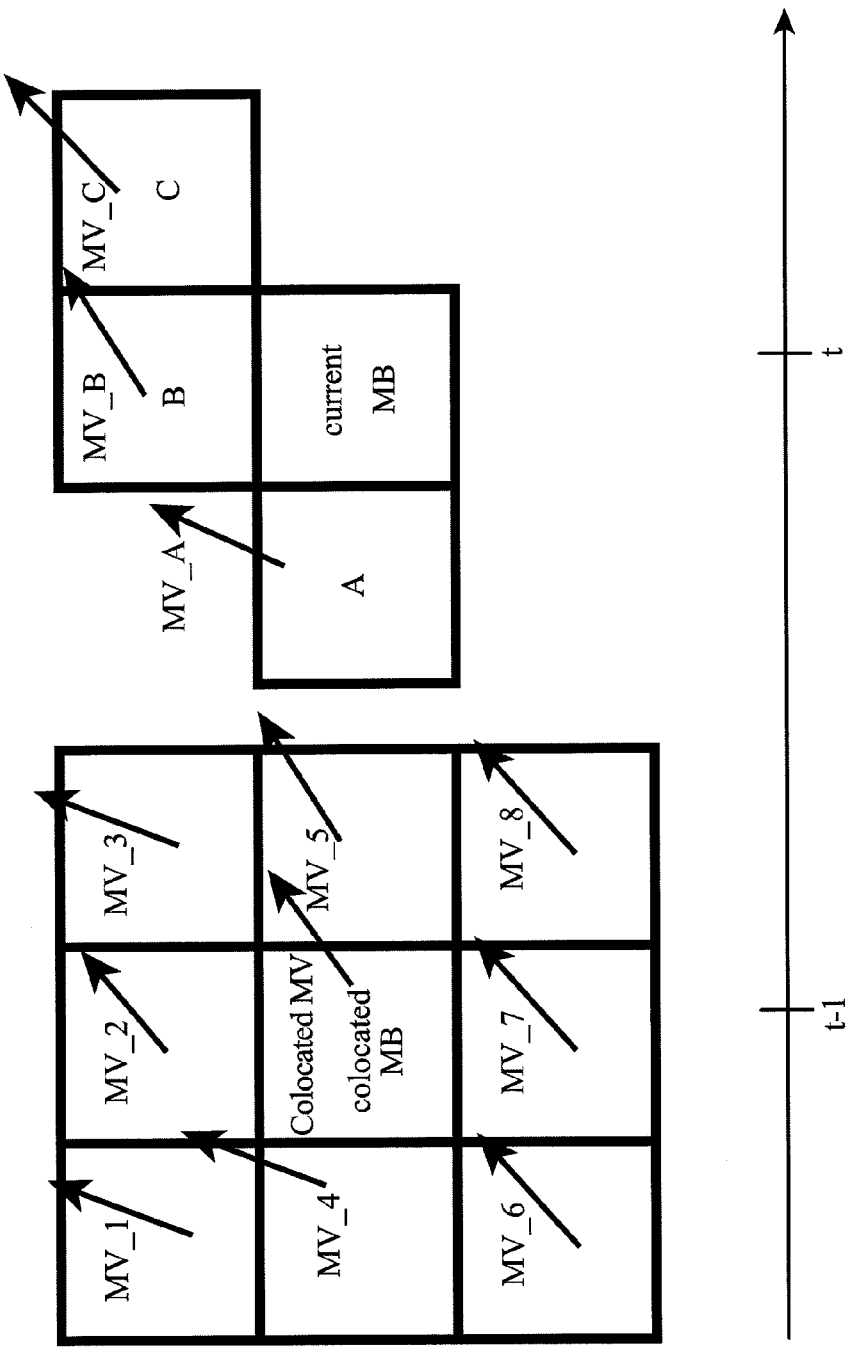
FIG. 17 is an explanatory drawing showing spatial vectors MV_A, MV_B, and MV_C, and temporal vectors MV_1 to MV_8.
Figure 18:
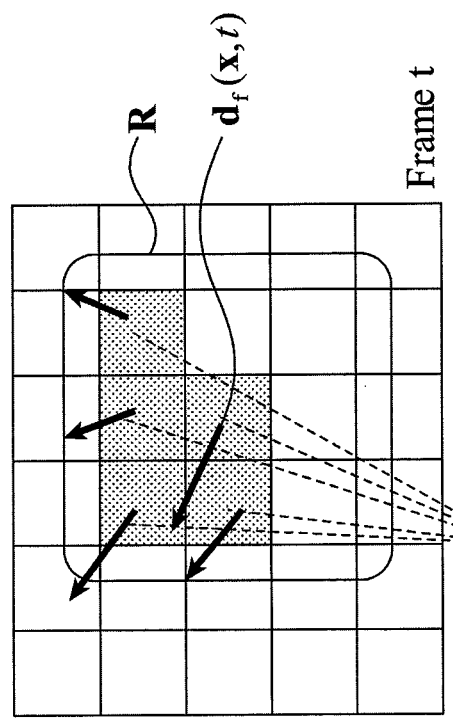
FIG. 18 is an explanatory drawing showing generation of one candidate vector from a plurality of already-encoded vectors.

Although the example in which each of the motion-compensated prediction parts generates both the temporal direct vector and the spatial direct vector and selects either of the direct vectors is shown in above-mentioned Embodiment 1, each of the motion-compensated prediction parts can add another vector, as a candidate vector, in addition to the temporal direct vector and the spatial direct vector, and select one direct vector from these candidate vectors. For example, each of the motion-compensated prediction parts can add spatial vectors MV_A, MV_B, and MV_C, and temporal vectors MV_1 to MV_8 as shown in FIG. 17 to the candidate vectors, and select one direct vector from these spatial vectors and temporal vectors. Further, as shown in FIG. 18, each of the motion-compensated prediction parts can generate one vector from a plurality of already-encoded vectors, and add the vector to the candidate vectors. While such an increase in the number of candidate vectors increases the amount of information to be processed, the precision of the direct vector can be improved and hence the encoding efficiency can be improved.

Although no mention has been made particularly in above-mentioned Embodiment 1, the candidates for the direct vector can be determined on a per slice basis. Information showing which vectors should be selected as candidates is multiplexed into each slice header. For example, there can be considered a method of, because the effect of a temporal vector is low in a video which is acquired by panning a camera, removing temporal vectors from the selection candidates for such a video, and, because the effect of a spatial vector is large in a video which is acquired by a fixed camera, adding spatial vectors to the selection candidates for such a video.

While the larger the number of candidate vectors is, the nearer to the original image a prediction image can be generated, a balance between the amount of information to be processed and the encoding efficiency can be achieved by determining the candidates in consideration of the locality of the video, such as excluding ineffective vectors from the candidates in advance, in order to prevent the amount of information to be processed from greatly increasing due to the increase in the number of candidate vectors. Switching a vector between a candidate and a non-candidate is achieved by using, for example, a method of providing an ON/OFF flag for each vector, and defining only a vector whose flag is set to ON as a candidate. A motion vector which can be a selection candidate can be switched between a candidate and a non-candidate by using each slice header or each header in an upper layer, such as each sequence header or each picture header. Further, one or more sets of motion vectors each of which can be a selection candidate can be prepared, and an index showing each of the candidate sets can be encoded.

Further, a vector can be switched between a candidate and a non-candidate for each macroblock or each block to be encoded. Switching a vector between a candidate and a non-candidate for each macroblock or each block to be encoded can provide the macroblock or block to be encoded with locality, and provides an advantage of improving the encoding efficiency. Further, the selection candidates can be determined uniquely for each partition block size. Because the spatial correlation generally becomes weak as the block size becomes small, it can be expected that the predictive accuracy of a vector determined through a median prediction gets worse. To solve this problem, by removing a motion vector determined through a median prediction from the candidates, for example, the amount of information to be processed can be reduced without lowering the encoding efficiency.

Although the explanation is made in above-mentioned Embodiment 1 by assuming the case in which both a temporal direct vector and a spatial direct vector exist, there is a case in which no motion vector exists when an intra encoding process is carried out on the block to be encoded B″. In this case, there can be considered a method of setting a zero vector as a motion vector, a method of not including any motion vector in the candidates, and so on. While the encoding efficiency can be improved because the candidates increase in number when a zero vector is set as a motion vector, the amount of information to be processed increases. When no motion vector is included in the candidates for direct vector, the amount of information to be processed can be reduced.

Although the example of generating a direct vector is shown in above-mentioned Embodiment 1, the direct vector can be used as a predicted vector which is used for encoding of a normal motion vector. While the amount of information to be processed increases when the direct vector is used as a predicted vector, the encoding efficiency can be improved because the accuracy of the prediction increases.

Figure 19:
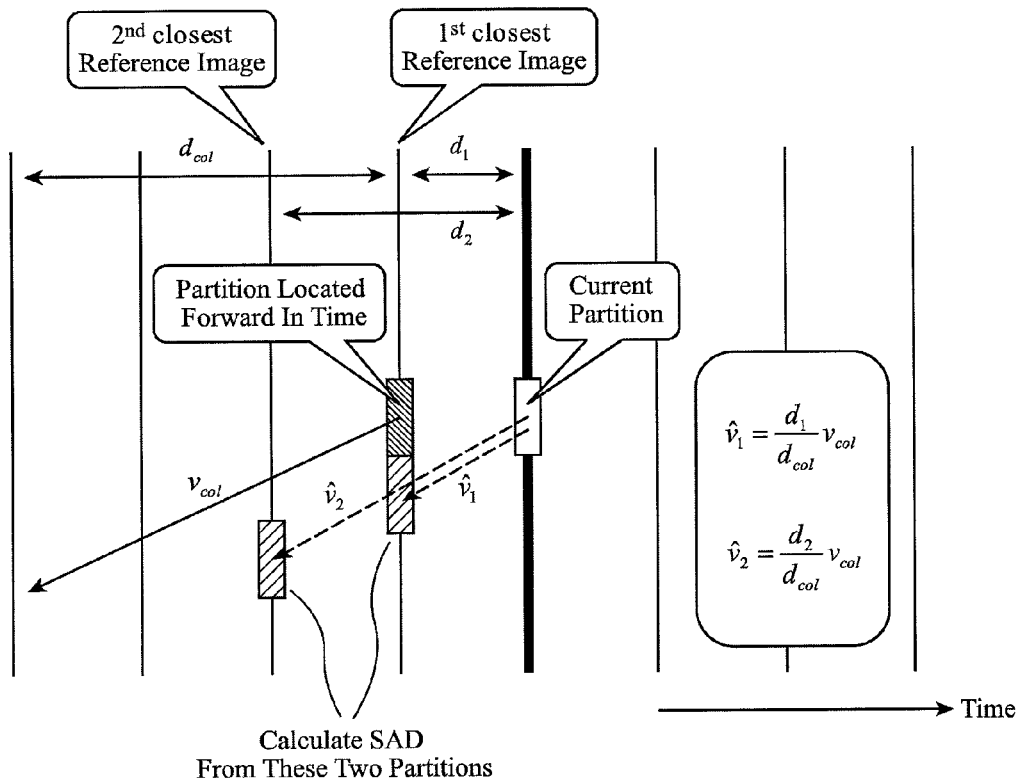
FIG. 19 is an explanatory drawing showing an example of calculating an evaluated value SAD from a combination of only images located backward in time.

Although the example of calculating an evaluated value SAD from a combination of an image located backward of the block to be encoded B″ in time and an image located forward of the block to be encoded B″ in time is shown in above-mentioned Embodiment 1 (refer to FIG. 15), an evaluated value SAD can be alternatively calculated from a combination of only images located backward of the block to be encoded B″ in time, as shown in FIG. 19. As an alternative, an evaluated value SAD can be calculated from a combination of only images located forward of the block to be encoded B″ in time. In this case, temporal vectors are expressed by the following equations (9) and (10).

$$\hat{v}_0 = \frac{d_0}{d_{col}} v_{col} \qquad (9)$$

$$\hat{v}_1 = \frac{d_1}{d_{col}} v_{col} \qquad (10)$$

where $\hat{v}_0$ is the vector of list 0, and $\overline{v}_1$ is the vector of list 1.

In the above equations, d denotes a temporal distance, $d_0$ denotes the temporal distance of a list 0 reference image, and $d_1$ denotes the temporal distance of a list 0 reference image. Further, $v_{col}$ and $d_{col}$ denote the vector of a block spatially located at the same position in the reference image as the block to be encoded, and the temporal distance of the reference image shown by the vector, respectively.

Even in a case in which the two reference image lists indicate the same reference image, the same method as that shown in FIG. 19 can be applied when each of the lists has two or more reference images.

Although the case in which each of the two reference image lists has two or more reference images is assumed in above-mentioned Embodiment 1, there can be considered a case in which only one reference image is included in each of the two reference image lists. In this case, when the same reference image is set to the two reference image lists, there can be a case in which the determination can be carried out by using only a spatial vector without using any temporal vector. When different reference images are set to the two reference image lists, respectively, the determination can be handled by using the above-mentioned method.

Although a prediction process from two directions is assumed to be carried out in above-mentioned Embodiment 1, a prediction process only in a single direction can be alternatively carried out. When a prediction from a vector in one direction is carried out, information showing which vector is used is encoded and transmitted. As a result, a problem, such as occlusion, can be dealt with, and a contribution to an improvement in the predictive accuracy can be made.

Although it is assumed in a direct mode shown in above-mentioned Embodiment 1 that a prediction using two vectors is carried out, the number of vectors can be three or more. In this case, for example, there can be considered a method of generating a prediction image by using all vector candidates each of which provides an evaluated value SAD equal to or smaller than a threshold Th, among a plurality of vector candidates. Further, a number of reference image lists whose number is equal to the number of vectors can be stored. Further, instead of using all candidates each of which provides an evaluated value SAD equal to or smaller than the threshold Th, a maximum of the number of vectors which are used can be preset to each slice header or the like, and a prediction image can be generated by using the maximum number of vectors each of which provides a smaller evaluated value. It is generally known that the performance is further improved with increase in the number of reference images used for the generation of a prediction image. Therefore, while the amount of information to be processed increases, an contribution to an improvement in the encoding efficiency can be made.

Figure 20:
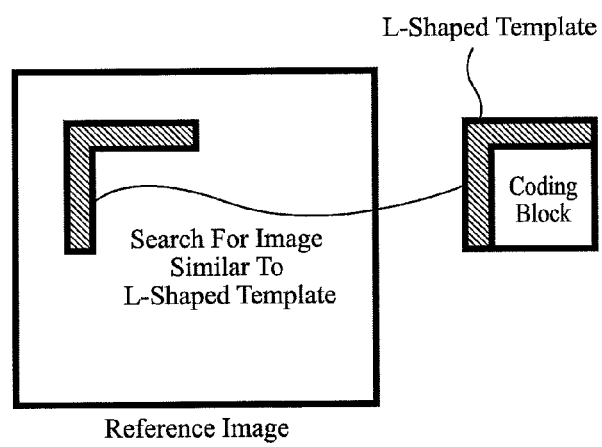
FIG. 20 is an explanatory drawing showing a search for an image similar to an L-shaped template.

A vector is determined from an evaluation between reference images in above-mentioned Embodiment 1. This evaluation can be carried out from a comparison between an already-encoded image which is spatially adjacent to the block to be encoded and a reference image. In this case, there can be considered a method of carrying out the evaluation by using such an L-shaped image as shown in FIG. 20. Further, when an already-encoded image which is spatially adjacent to the block to be encoded is used, there is a possibility that the already-encoded image is not in time for the comparison because of pipeline processing. In this case, there can be considered a method of using the prediction image instead of the already-encoded image.

Figure 21:
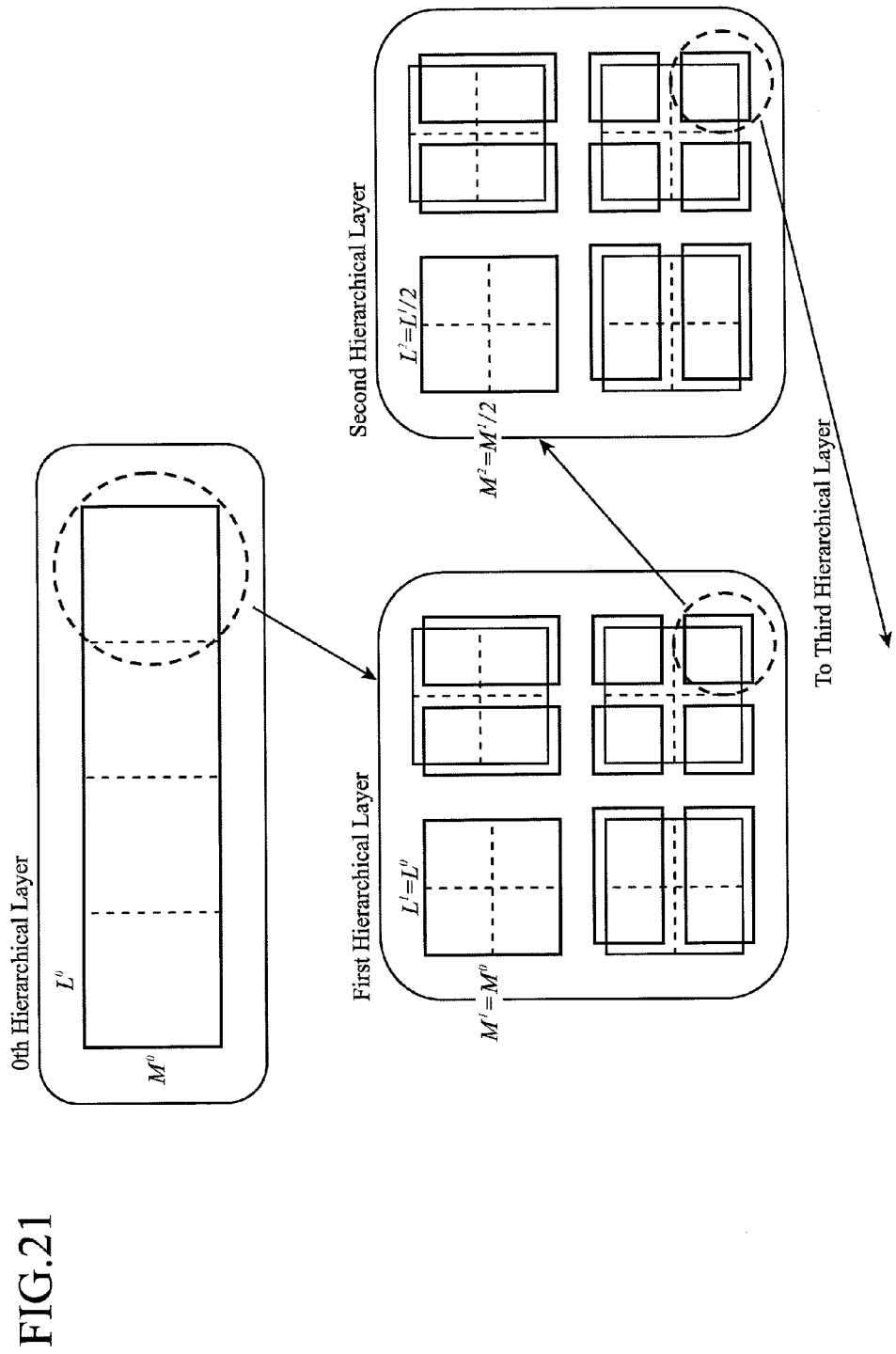
FIG. 21 is an explanatory drawing showing an example in which the size of a block to be encoded B$^n$ is L$^n$=kM$^n$.
Figure 22:
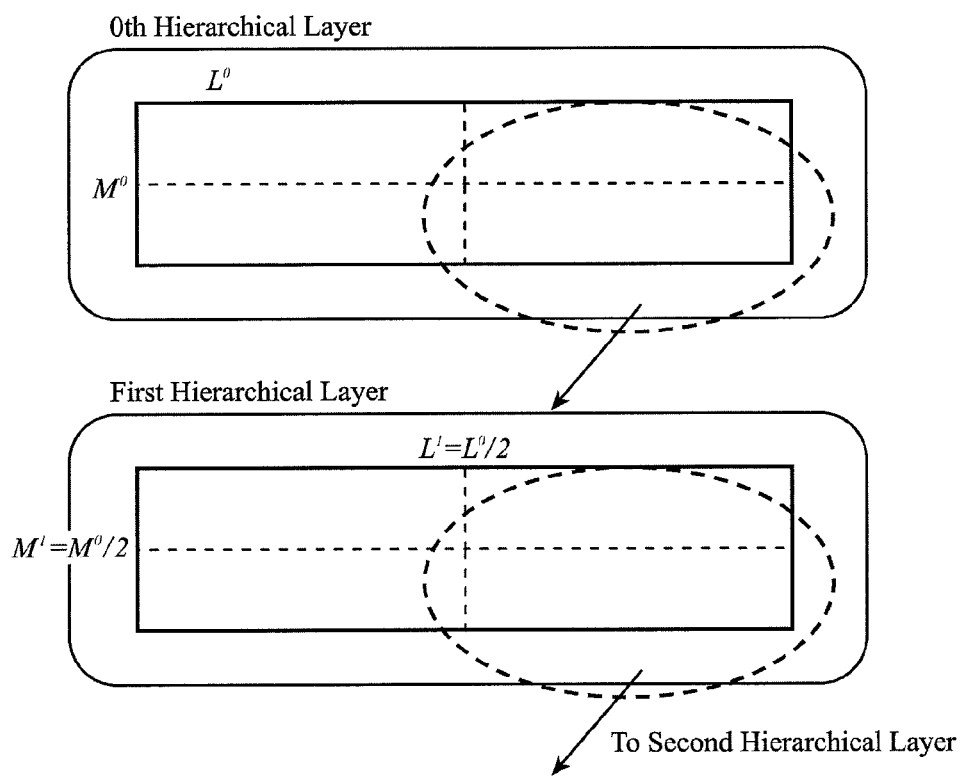
FIG. 22 is an explanatory drawing showing an example of a division satisfying (L$^{n+1}$, M$^{n+1}$)=(L$^n$/2, M$^n$/2)
Figure 23:
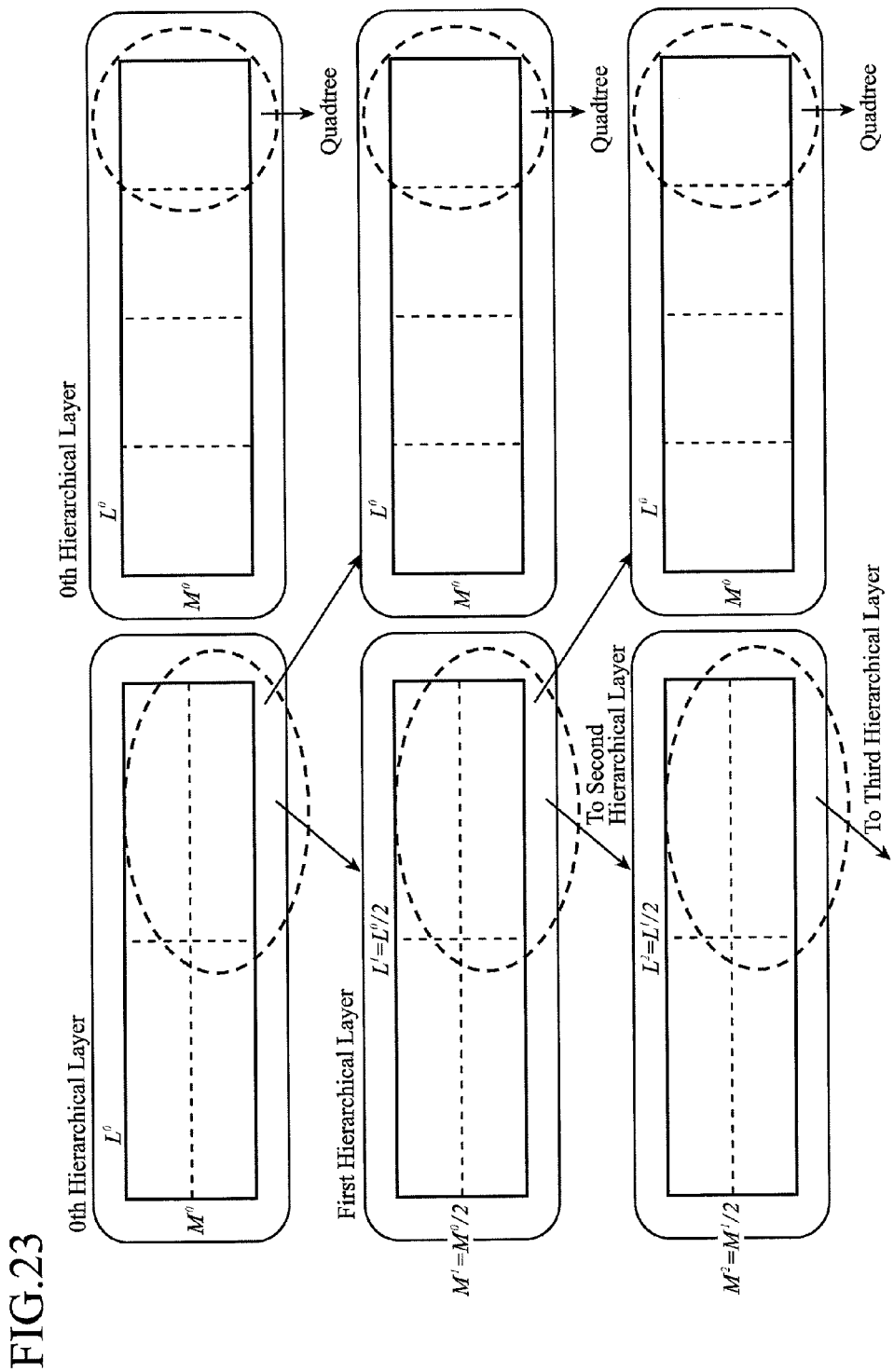
FIG. 23 is an explanatory drawing showing an example in which a division shown in either FIG. 21 or FIG. 22 can be selected.

Although the example in which the size of the block to be encoded $B^n$ is $L^n=M^n$ as shown in FIG. 9 is shown in above-mentioned Embodiment 1, the size of the block to be encoded $B^n$ can be $L^n \neq M^n$. For example, there can be considered a case in which the size of the block to be encoded $B^n$ is $L^n=kM^n$ as shown in FIG. 21. In this case, $(L^{n+1}, M^{n+1})$ becomes equal to $(L^n, M^n)$ in the next division, and subsequent divisions can be carried out in the same way as those shown in FIG. 9 or in such a way that $(L^{n+1}, M^{n+1})$ becomes equal to $(L^n/2, M^n/2)$ (refer to FIG. 22). As an alternative, one of a dividing process shown in FIG. 21 and that shown in FIG. 22 can be selected as shown in FIG. 23. In the case in which one of the dividing process shown in FIG. 21 and that shown in FIG. 22 can be selected, a flag showing which division process is selected is encoded. Because this case can be implemented by using a method of connecting blocks each consists of 16×16 elements to each other in a horizontal direction, such as H.264 disclosed by nonpatent reference 1, the compatibility with the existing method can be maintained. Although the case in which the size of the block to be encoded $B^n$ is $L^n=kM^n$ is shown in the above-mentioned explanation, it needless to say that divisions can be carried out on the same principle even if blocks are connected to each other in a vertical direction, like in a case of $kL^n=M^n$.

Figure 24:
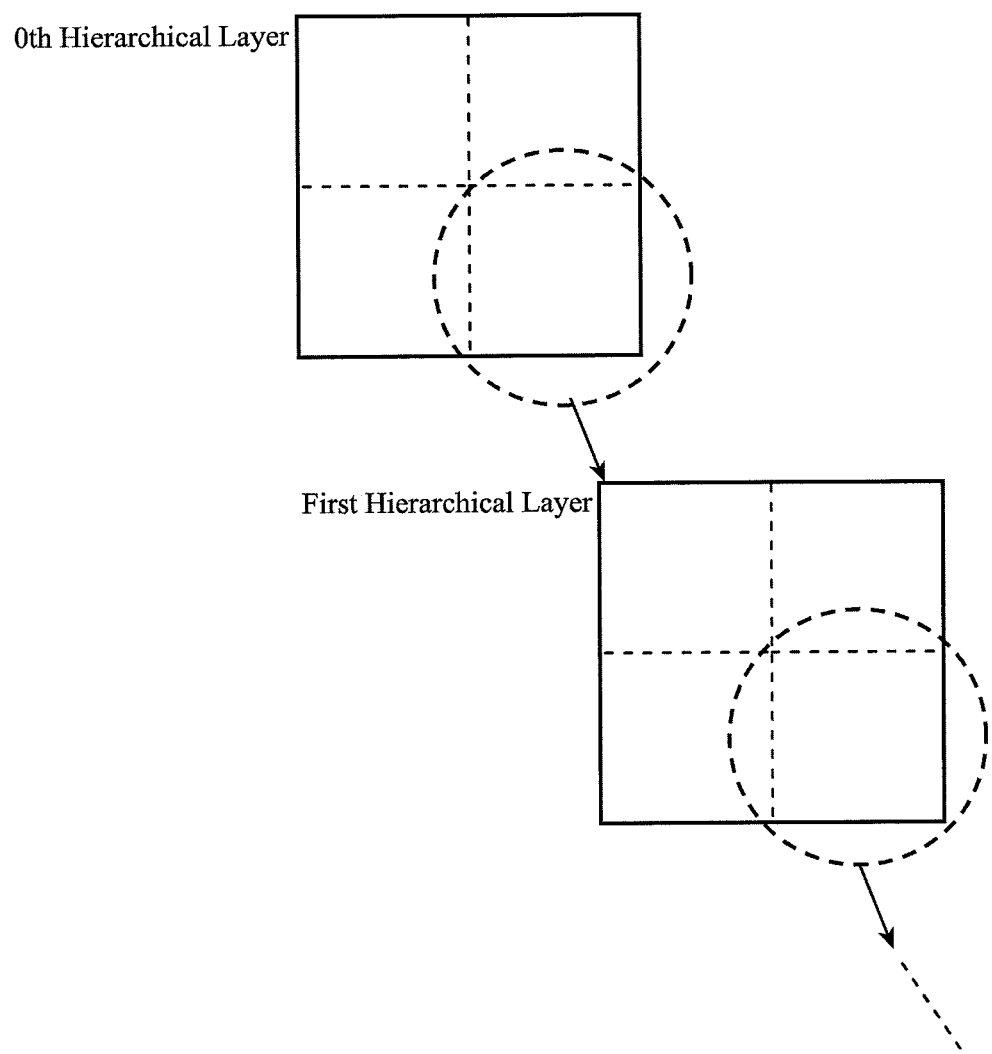
FIG. 24 is an explanatory drawing showing an example in which a transformation block size unit has a hierarchical structure.

Although the transformation/quantization part 7 and the inverse quantization/inverse transformation parts 8 and 55 carry out transformation processes (inverse transformation processes) in units of a block having the transformation block size included in the prediction difference encoding parameters in above-mentioned Embodiment 1, each transformation block size unit can be determined uniquely by a transformation process part, or can be formed to have a hierarchical structure as shown in FIG. 24. In this case, a flag showing whether or not a division is carried out for each hierarchical layer is encoded. The above-mentioned division can be carried out for each partition or each block to be encoded. Although the above-mentioned transformation is assumed to be carried out in units of a square block, the transformation can be alternatively carried out in units of a quadrangular block such as a rectangular block.

Embodiment 3

Although the example in which each of the direct vector generating parts 23 and 62 of the motion-compensated prediction parts 5 and 54 generates both a spatial direct vector and a temporal direct vector is shown in above-mentioned Embodiment 1, each of the direct vector generating parts can alternatively determine an initial search point when generating both a spatial direct vector and a temporal direct vector, and search through the vicinity of the initial search point to determine a direct vector.

Figure 25:
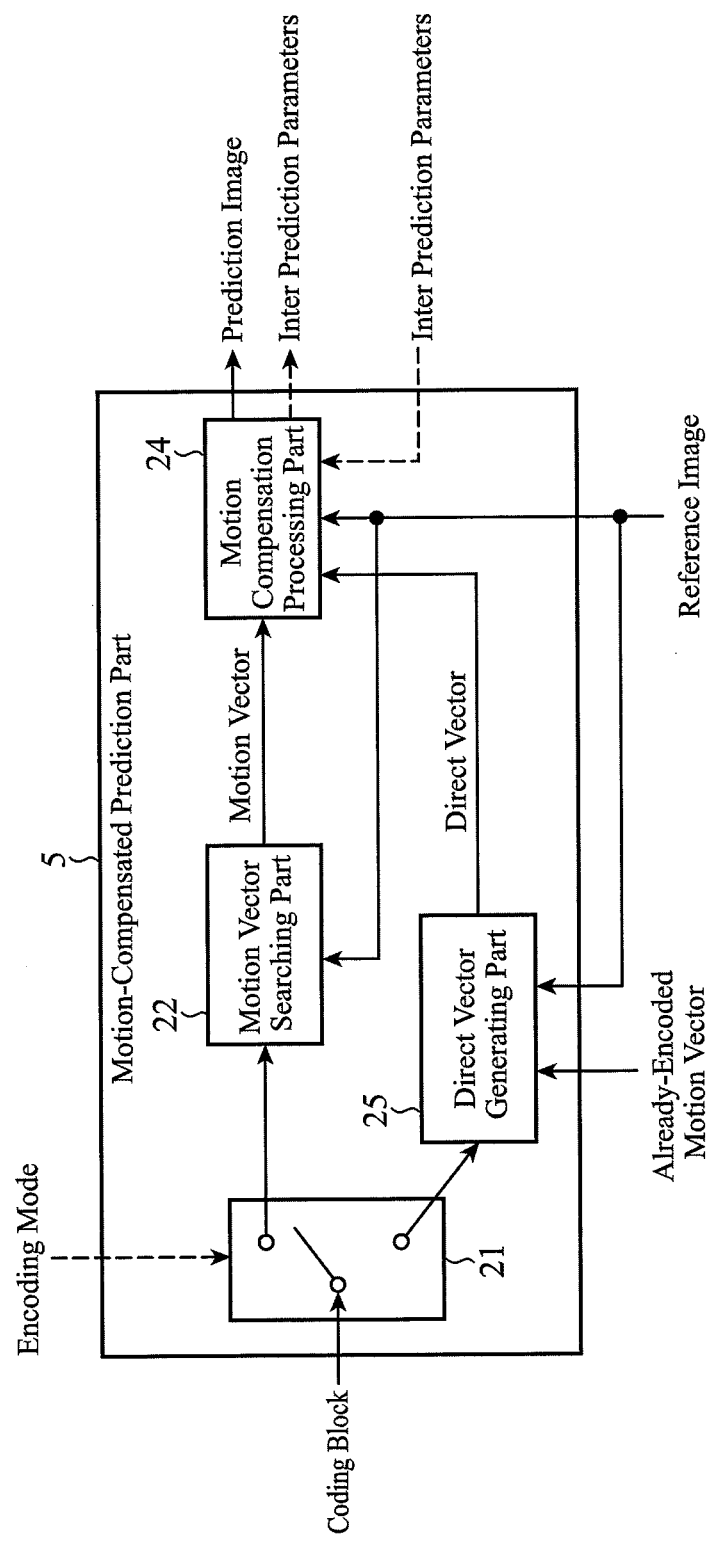
FIG. 25 is a block diagram showing a motion-compensated prediction part 5 of a moving image encoding device in accordance with Embodiment 3 of the present invention.

FIG. 25 is a block diagram showing a motion-compensated prediction part 5 of a moving image encoding device in accordance with Embodiment 3 of the present invention. In the figure, because the same reference numerals as those shown in FIG. 2 denote the same components or like components, the explanation of the components will be omitted hereafter. A direct vector generating part 25 carries out a process of generating both a spatial direct vector and a temporal direct vector.

Figure 26:
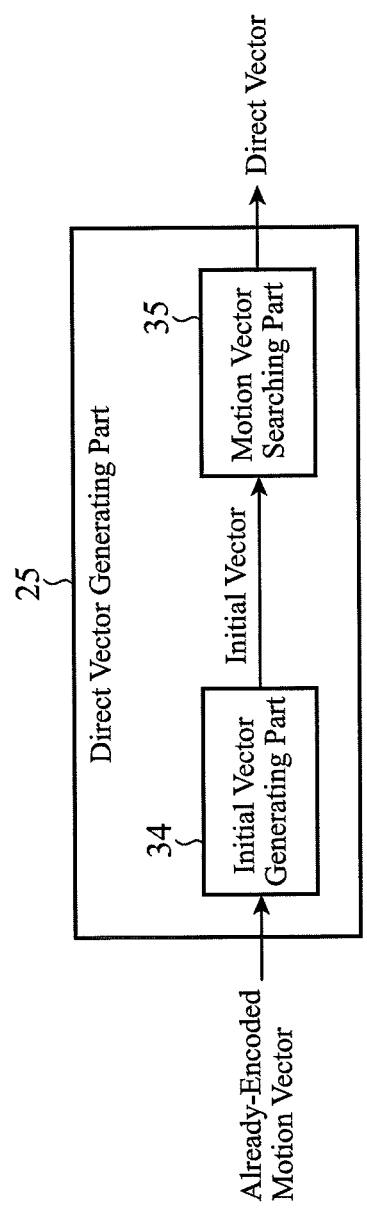
FIG. 26 is a block diagram showing a direct vector generation part 25 which constructs the motion-compensated prediction part 5.

FIG. 26 is a block diagram showing the direct vector generation part 25 which constructs the motion-compensated prediction part 5. Referring to FIG. 26, an initial vector generating part 34 carries out a process of generating an initial vector from the motion vector of an already-encoded block. A motion vector searching part 35 carries out a process of searching through the vicinity of an initial search point shown by the initial vector generated by the initial vector generating part 34 to determine a direct vector.

Figure 27:
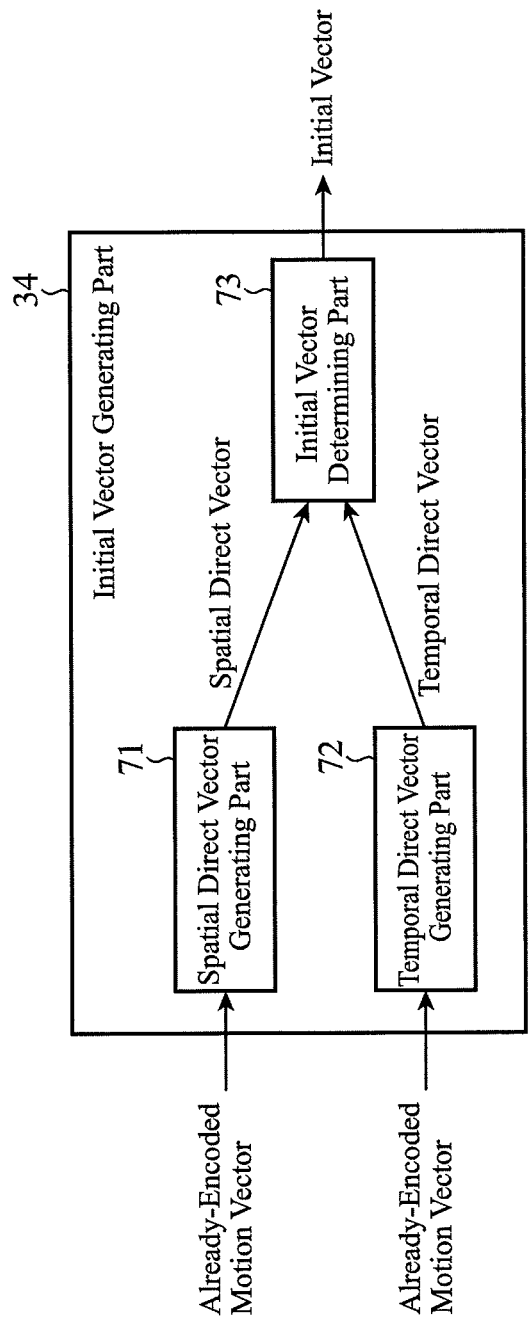
FIG. 27 is a block diagram showing an initial vector generating part 34 which constructs the direct vector generation part 25.

FIG. 27 is a block diagram showing the initial vector generating part 34 which constructs the direct vector generating part 25. Referring to FIG. 27, a spatial vector generating part 71 carries out a process of generating a spatial vector from the motion vector of an already-encoded block by using, for example, the same method as that which the spatial direct vector generating part 31 shown in FIG. 3 uses. A temporal vector generating part 72 carries out a process of generating a temporal vector from the motion vector of an already-encoded block by using, for example, the same method as that which the temporal direct vector generating part 32 shown in FIG. 3 uses. An initial vector determining part 73 carries out a process of selecting either of the spatial vector generated by the spatial vector generating part 71 and the temporal vector generated by the temporal vector generating part 72 as an initial vector.

Figure 28:
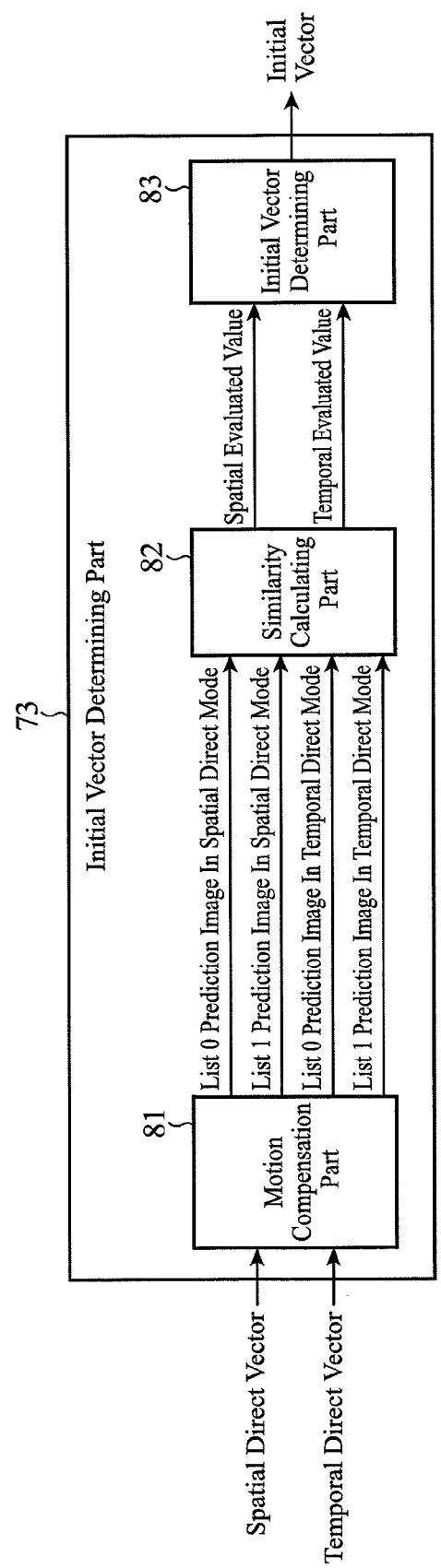
FIG. 28 is a block diagram showing an initial vector determining part 73 which constructs the initial vector generating part 34.

FIG. 28 is a block diagram showing the initial vector determining part 73 which constructs the initial vector generating part 34. Referring to FIG. 28, a motion compensation part 81 carries out a process of generating a list 0 prediction image in a spatial direct mode, a list 1 prediction image in the spatial direct mode, a list 0 prediction image in a temporal direct mode, and a list 1 prediction image in the temporal direct mode by using the same method as that which the motion compensation part 41 shown in FIG. 4 uses.

A similarity calculating part 82 carries out a process of calculating the degree of similarity between the list 0 prediction image and the list 1 prediction image in the spatial direct mode as a spatial evaluated value and also calculating the degree of similarity between the list 0 prediction image and the list 1 prediction image in the temporal direct mode as a temporal evaluated value by using the same method as that which the similarity calculating part 42 shown in FIG. 4. An initial vector determining part 83 carries out a process of making a comparison between the spatial evaluated value and the temporal evaluated value which are calculated by the similarity calculating part 82 to select the spatial vector or the temporal vector according to the comparison result.

Figure 29:
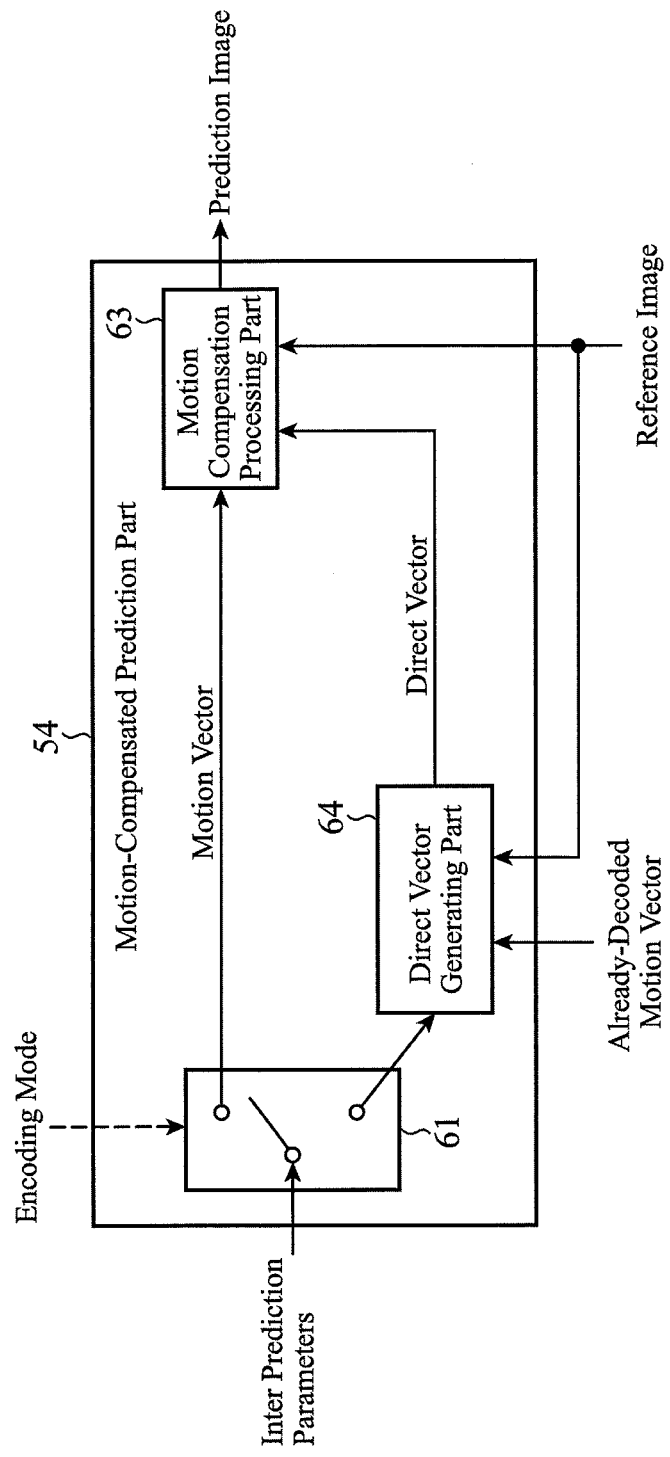
FIG. 29 is a block diagram showing a motion-compensated prediction part 54 of a moving image decoding device in accordance with Embodiment 3 of the present invention.

FIG. 29 is a block diagram showing a motion-compensated prediction part 54 of a moving image decoding device in accordance with Embodiment 3 of the present invention. In the figure, because the same reference numerals as those shown in FIG. 6 denote the same components or like components, the explanation of the components will be omitted hereafter. A direct vector generating part 64 carries out a process of generating both a spatial direct vector and a temporal direct vector. The internal structure of the direct vector generating part 64 is the same as the direct vector generating part 25 shown in FIG. 25.

Next, the operation of the moving image encoding device and the operation of the moving image decoding device will be explained. Because the moving image encoding device and the moving image decoding device according to this embodiment have the same structures as those according to above-mentioned Embodiment 1, with the exception that the direct vector generating parts 23 and 62 of the motion-compensated prediction parts 5 and 54 according to above-mentioned Embodiment 1 are replaced by the direct vector generating parts 25 and 64, as compared with above-mentioned Embodiment 1, only processes carried out by each of the direct vector generating parts 25 and 64 will be explained hereafter. Because the process carried out by the direct vector generating part 25 is the same as that carried out by the direct vector generating part 64, the process carried out by the direct vector generating part 25 will be explained hereafter.

The initial vector generating part 34 of the direct vector generating part 25 generates an initial vector MV_first from the motion vector of an already-encoded block. More specifically, the spatial vector generating part 71 of the initial vector generating part 34 generates a spatial vector from the motion vector of an already-encoded block by using, for example, the same method as that which the spatial direct vector generating part 31 shown in FIG. 3 uses. As an alternative, the spatial vector generating part can generate a spatial vector by using another method. The temporal vector generating part 72 of the initial vector generating part 34 generates a temporal vector from the motion vector of an already-encoded block by using, for example, the same method as that which the temporal direct vector generating part 32 shown in FIG. 3 uses. As an alternative, the temporal vector generating part can generate a temporal vector by using another method.

After the spatial vector generating part 71 generates a spatial vector and the temporal vector generating part 72 generates a temporal vector, the initial vector determining part 73 of the initial vector generating part 34 selects one vector as an initial vector MV_first from the spatial vector and the temporal vector. More specifically, the motion compensation part 81 of the initial vector determining part 73 generates a list 0 prediction image in the spatial direct mode, a list 1 prediction image in the spatial direct mode, a list 0 prediction image in the temporal direct mode, and a list 1 prediction image in the temporal direct mode by using the same method as that which the motion compensation part 41 shown in FIG. 4 uses.

The similarity calculating part 82 of the initial vector determining part 73 calculates the degree of similarity between the list 0 prediction image and the list 1 prediction image in the spatial direct mode as a spatial evaluated value, and also calculates the degree of similarity between the list 0 prediction image and the list 1 prediction image in the temporal direct mode as a temporal evaluated value by using the same method as that which the similarity calculating part 42 shown in FIG. 4 uses. The initial vector determining part 83 of the initial vector determining part 73 refers to the result of the comparison between the spatial evaluated value and the temporal evaluated value which are calculated by the similarity calculating part 82, and selects one vector which provides a higher degree of similarity between prediction images from the spatial vector and the temporal vector.

Figure 30:
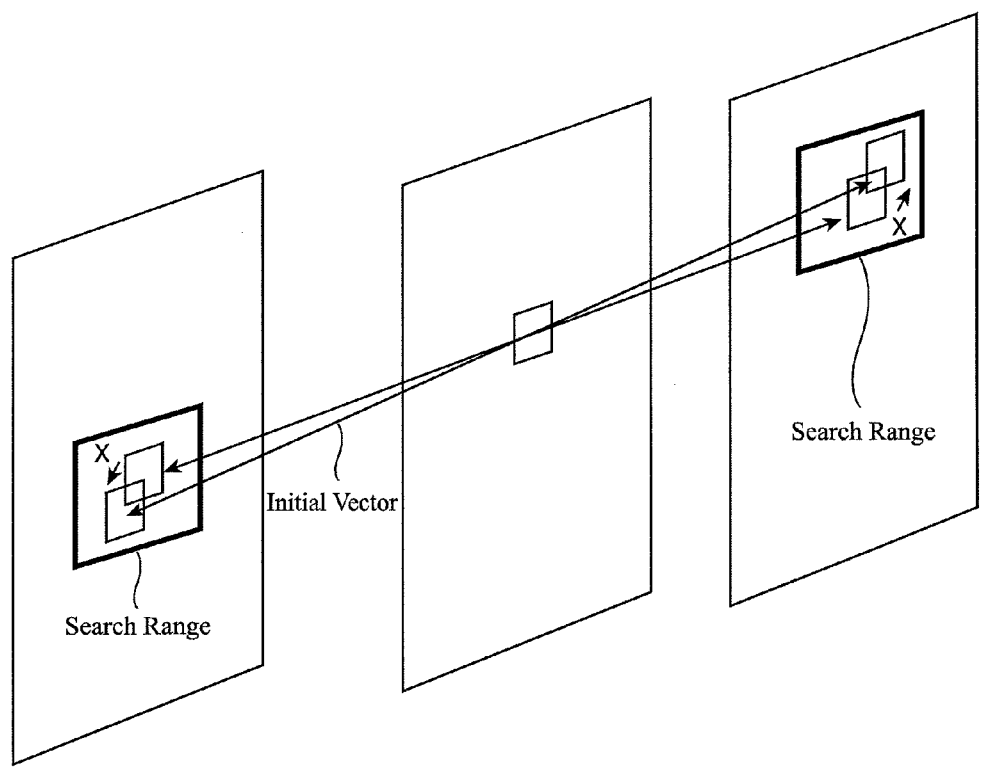
FIG. 30 is an explanatory drawing showing a process of searching for a motion vector.

After the initial vector generating part 34 generates the initial vector MV_first, the motion vector searching part 35 of the direct vector generation part 25 searches through a range of ±n centered at an initial search point (block) shown by the initial vector MV_first, as shown in FIG. 30, to determine a direct vector. The motion vector searching part can carry out an evaluation at the time of the search by carrying out, for example, the same process as that performed by the similarity calculating part 82 shown in FIG. 28. In this case, when the position shown by the initial vector is expressed as v, the motion vector searching part calculates an evaluated value SAD at the time of the search, as shown in the following equation (11).

$$SAD = |f(v_1-x) - g(v_2+x)| \qquad (11)$$

In this case, the search range of n can be fixed or can be determined for each header in an upper layer such as each slice header. Further, although the range (search range) of the search point is assumed to be a square, the range can be alternatively a rectangle or a quadrangle such as a lozenge.

After calculating the evaluated value SAD at the time of the search, the motion vector searching part 35 outputs a motion vector in the search range which provides the smallest evaluated value SAD to the motion compensation processing part 24 as a direct vector.

Although the example in which each of the motion-compensated prediction parts generates both a temporal direct vector and a spatial direct vector and selects either of the direct vectors is shown in above-mentioned Embodiment 3, each of the motion-compensated prediction parts can add another vector, as a candidate vector, in addition to the temporal direct vector and the spatial direct vector, and select a direct vector from these candidate vectors. For example, each of the motion-compensated prediction parts can add spatial vectors MV_A, MV_B, and MV_C, and temporal vectors MV_1 to MV_8 as shown in FIG. 17 to the candidate vectors, and select a direct vector from these spatial vectors and temporal vectors. Further, each of the motion-compensated prediction parts can generate one vector from a plurality of encoded vectors, and add the vector to the candidate vectors, as shown in FIG. 18. While such an increase in the number of candidate vectors increases the amount of information to be processed, the precision of the direct vector can be improved and hence the encoding efficiency can be improved.

In this Embodiment 3, the candidates for the direct vector can be determined on a per slice basis. Information showing which vectors should be selected as candidates is multiplexed into each slice header. For example, there can be considered a method of, because the effect of a temporal vector is low in a video which is acquired by panning a camera, removing temporal vectors from the selection candidates for such a video, and, because the effect of a spatial vector is large in a video which is acquired by a fixed camera, adding spatial vectors to the selection candidates for such a video.

While the larger the number of candidate vectors is, the nearer to the original image a prediction image can be generated, a balance between the amount of information to be processed and the encoding efficiency can be achieved by determining the candidates in consideration of the locality of the video, such as excluding ineffective vectors from the candidates in advance, in order to prevent the amount of information to be processed from greatly increasing due to the increase in the number of candidate vectors. Switching a vector between a candidate and a non-candidate is achieved by using, for example, a method of providing an ON/OFF flag for each vector, and defining only a vector whose flag is set to ON as a candidate. A motion vector which can be a selection candidate can be switched between a candidate and a non-candidate by using each slice header or each header in an upper layer, such as each sequence header or each picture header. Further, one or more sets of motion vectors each of which can be a selection candidate can be prepared, and an index showing each of the candidate sets can be encoded.

Further, a vector can be switched between a candidate and a non-candidate for each macroblock or each block to be encoded. Switching a vector between a candidate and a non-candidate for each macroblock or each block to be encoded can provide the macroblock or block to be encoded with locality, and provides an advantage of improving the encoding efficiency. Further, the selection candidates can be determined uniquely for each partition block size. Because the spatial correlation generally becomes weak as the block size becomes small, it can be expected that the predictive accuracy of a vector determined through a median prediction gets worse. To solve this problem, by removing a motion vector determined through a median prediction from the candidates, for example, the amount of information to be processed can be reduced without lowering the encoding efficiency.

Although the explanation is made in this Embodiment 3 by assuming the case in which both a temporal direct vector and a spatial direct vector exist, there is a case in which no motion vector exists when an intra encoding process is carried out on the block to be encoded B″. In this case, there can be considered a method of setting a zero vector as a motion vector, a method of not including any motion vector in the candidates, and so on. While the encoding efficiency can be improved because the candidates increase in number when a zero vector is set as a motion vector, the amount of information to be processed increases. When no motion vector is included in the candidates for direct vector, the amount of information to be processed can be reduced.

Although the example of generating a direct vector is shown in this Embodiment 3, the direct vector can be used as a predicted vector which is used for encoding of a normal motion vector. While the amount of information to be processed increases when the direct vector is used as a predicted vector, the encoding efficiency can be improved because the accuracy of the prediction increases.

Although the example of calculating an evaluated value SAD from a combination of an image located backward of the block to be encoded B″ in time and an image located forward of the block to be encoded B″ in time is shown in this Embodiment 3 (refer to FIG. 15), an evaluated value SAD can be alternatively calculated from a combination of only images located backward of the block to be encoded B″ in time, as shown in FIG. 19. As an alternative, an evaluated value SAD can be calculated from a combination of only images located forward of the block to be encoded B″ in time. In this case, temporal vectors are expressed by the following equations (12) and (13).

$$\hat{v}_0 = \frac{d_0}{d_{col}} v_{col} \quad (12)$$

$$\hat{v}_1 = \frac{d_1}{d_{col}} v_{col} \quad (13)$$

where $\hat{v}_0$ is the vector of list 0, and $\hat{v}_1$ is the vector of list 1.
In the above equations, d denotes a temporal distance, do denotes the temporal distance of a list 0 reference image, and $d_1$ denotes the temporal distance of a list 0 reference image. Further, $v_{col}$ and $d_{col}$ denote the vector of a block spatially located at the same position in the reference image as the block to be encoded, and the temporal distance of the reference image shown by the vector, respectively.

Even in a case in which the two reference image lists indicate the same reference image, the same method as that shown in FIG. 19 can be applied.

Although the case in which each of the two reference image lists has two or more reference images is assumed in this Embodiment 3, there can be considered a case in which only one reference image is included in each of the two reference image lists. In this case, when the same reference image is set to the two reference image lists, there can be a case in which the determination can be carried out by using only a spatial vector without using any temporal vector. When different reference images are set to the two reference image lists, respectively, the determination can be handled by using the above-mentioned method.

Although a prediction process from two directions is assumed to be carried out in this Embodiment 3, a prediction process only in a single direction can be alternatively carried out. When a prediction from a vector in one direction is carried out, information showing which vector is used is encoded and transmitted. As a result, a problem, such as occlusion, can be dealt with, and a contribution to an improvement in the predictive accuracy can be made.

Although it is assumed in this Embodiment 3 that a prediction using two vectors is carried out, the number of vectors can be three or more. In this case, for example, there can be considered a method of generating a prediction image by using all vector candidates each of which provides an evaluated value SAD equal to or smaller than a threshold Th, among a plurality of vector candidates. Further, instead of using all candidates each of which provides an evaluated value SAD equal to or smaller than the threshold Th, a maximum of the number of vectors which are used can be preset to each slice header or the like, and a prediction image can be generated by using the maximum number of vectors each of which provides a smaller evaluated value.

A vector is determined from an evaluation between reference images in this Embodiment 3. This evaluation can be carried out from a comparison between an already-encoded image which is spatially adjacent to the block to be encoded and a reference image. In this case, there can be considered a method of carrying out the evaluation by using such an L-shaped image as shown in FIG. 20. Further, when an already-encoded image which is spatially adjacent to the block to be encoded is used, there is a possibility that the already-encoded image is not in time for the comparison because of pipeline processing. In this case, there can be considered a method of using the prediction image instead of the already-encoded image.

Although the example of searching for a motion vector after determining an initial vector is shown in this Embodiment 3, whether or not to search for a motion vector by using a flag can be determined on a per slice basis. In this case, while the encoding efficiency is reduced, there is provided an advantage of being able to greatly reduce the amount of information to be processed. The flag can be provided on a per slice basis or can be determined for each sequence, each picture or the like in an upper layer. When the flag is in an OFF state and no motion search is carried out, the same operation as that according to above-mentioned Embodiment 1 is performed.

Although it is assumed in this Embodiment 3 that each of the direct vector generating parts 25 and 64 carries out the vector generating process regardless of the block size, this process can be limited to a case in which the block size is equal to or smaller than a predetermined block size. A flag showing whether or not to limit the process to the case in which the block size is equal to or smaller than the predetermined block size, and information showing the predetermined block size can be multiplexed into each header in an upper layer such as each slice header. The flag and the information can be changed according to a maximum CU size. There is a tendency for the correlation between reference images to become low and for errors to become large as the block size becomes small. Therefore, there are many cases in which whichever vector is selected, the performance is hardly affected, and there is provided an advantage of reducing the amount of information to be processed without reducing the encoding performance by turning off processes using large block sizes.

Embodiment 4

In above-mentioned Embodiment 1, the example in which each of the motion-compensated prediction parts 5 and 54 generates a spatial direct vector in the spatial direct mode from the motion vector of an already-encoded block (already-decoded block) located in the vicinity of the block to be encoded and also generates a temporal direct vector in the temporal direct mode from the motion vector of an already-encoded picture (already-decoded block) which can be referred to by the block to be encoded, and selects one direct vector which provides a higher correlation between reference images from the spatial direct vector and the temporal direct vector is shown. The motion-compensated prediction part 5 of the moving image encoding device can alternatively select a motion vector suitable for the generation of a prediction image and carry out a motion-compensated prediction process on the block to be encoded to generate a prediction image by using the motion vector, and can also output index information showing the motion vector to the variable length encoding part 13. On the other hand, the motion-compensated prediction part 54 of the moving image decoding device can alternatively carry out a motion-compensated prediction process on the coding block to generate a prediction image by using the motion vector shown by the index information which is multiplexed into the bitstream.

Figure 31:
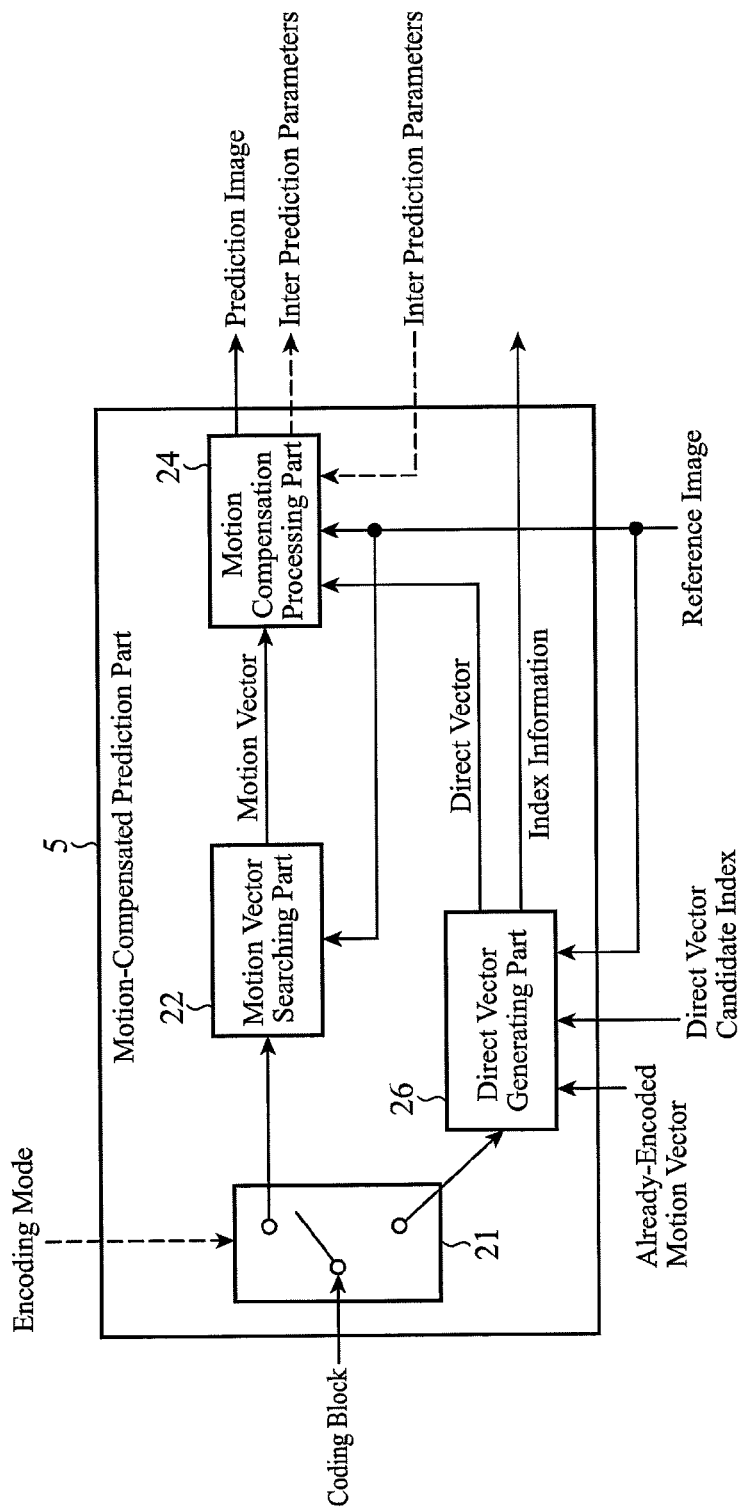
FIG. 31 is a block diagram showing a motion-compensated prediction part 5 of a moving image encoding device in accordance with Embodiment 4 of the present invention.

FIG. 31 is a block diagram showing a motion-compensated prediction part 5 of a moving image encoding device in accordance with Embodiment 4 of the present invention. In the figure, because the same reference numerals as those shown in FIG. 2 denote the same components or like components, the explanation of the components will be omitted hereafter. A direct vector generating part 26 carries out a process of referring to a direct vector candidate index in which a selectable motion vector and index information indicating the motion vector are described to select a motion vector suitable for the generation of a prediction image from one or more selectable motion vectors, and outputting the motion vector selected thereby to a motion compensation processing part 24 as a direct vector and also outputting the index information showing the motion vector to a variable length encoding part 13. When variable-length-encoding compressed data, an encoding mode, etc., the variable length encoding part 13 includes the index information in inter prediction parameters and then variable-length-encodes these inter prediction parameters.

Figure 32:
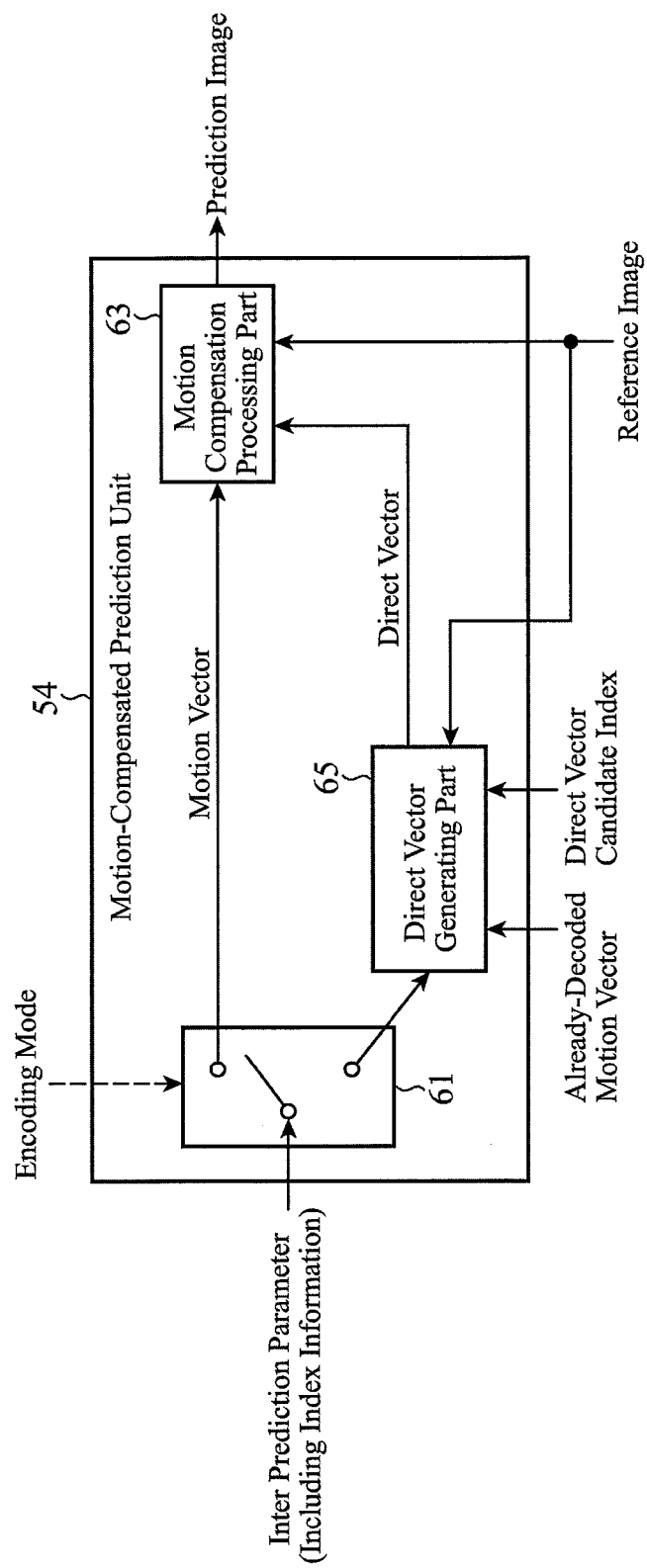
FIG. 32 is a block diagram showing a motion-compensated prediction part 54 of a moving image decoding device in accordance with Embodiment 4 of the present invention.

FIG. 32 is a block diagram showing a motion-compensated prediction part 54 of a moving image decoding device in accordance with Embodiment 4 of the present invention. In the figure, because the same reference numerals as those shown in FIG. 6 denote the same components or like components, the explanation of the components will be omitted hereafter. A direct vector generating part 65 carries out a process of receiving a direct vector candidate index in which a selectable motion vector and index information showing the selectable motion vector are described, reading the motion vector shown by the index information included in the inter prediction parameters from the direct vector candidate index, and outputting the motion vector to a motion compensation processing part 63 as a direct vector.

Next, the operation of the moving image encoding device and the operation of the moving image decoding device will be explained. Because the moving image encoding device and the moving image encoding device according to this embodiment have the same structures as those according to above-mentioned Embodiment 1, with the exception that the direct vector generating parts 23 and 62 of the motion-compensated prediction parts 5 and 54 according to above-mentioned Embodiment 1 are replaced by the direct vector generating parts 26 and 65, as compared with above-mentioned Embodiment 1, only processing carried out by each of the direct vector generating parts 26 and 65 will be explained hereafter.

Figure 33:
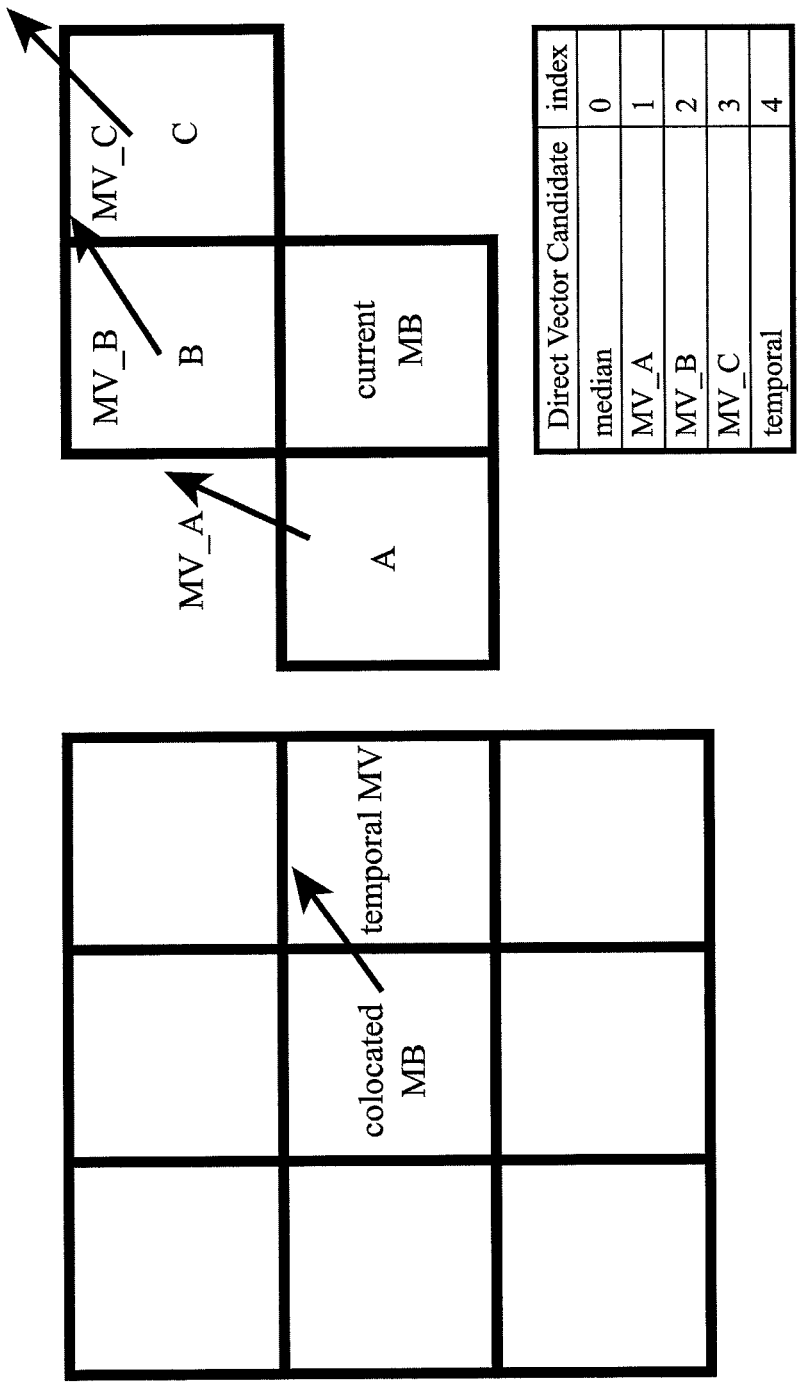
FIG. 33 is an explanatory drawing showing a direct vector candidate index in which a selectable motion vector and index information showing the motion vector are described.

The direct vector generating part 26 of the motion-compensated prediction part 5 generates a direct vector for each partition $P_i^n$ of a block to be encoded $B^n$ when the encoding mode $m(B^n)$ of the block is a direct mode. More specifically, the direct vector generating part 26 selects a motion vector suitable for the generation of a prediction image from one or more selectable motion vectors by referring to the direct vector candidate index as shown in FIG. 33. Although five motion vectors are listed as the one or more selectable motion vectors in the example shown in FIG. 33, an index of 0 is assigned to "median" in a space prediction because "median" is selected most frequently in the space prediction.

When selecting a motion vector suitable for the generation of a prediction image, the direct vector generating part 26 calculates a cost R from the prediction image, which is acquired from each of the selectable motion vectors, the distortion of the original image, and the index code amount of each of the selectable motion vectors, as shown in the following equation (14), and selects the motion vector whose cost R is the smallest from among the plurality of motion vectors.

$$R=\min\{D+\lambda\overline{\zeta}(i)\}_{i=1\ldots n} \quad (14)$$

where D is the residual signal between the prediction image and the original image, i is the index, λ is a Lagrange multiplier, and ζ( ) is the code amount of the term within the parentheses.

After selecting the motion vector whose cost R is the smallest from among the plurality of motion vectors, the direct vector generating part 26 outputs the motion vector to the motion compensation processing part 24 as a direct vector, and also outputs the index information indicating the motion vector to the variable length encoding part 13. For example, when selecting "median" as the motion vector whose cost R is the smallest, the direct vector generating part outputs the index of 0 to the variable length encoding part 13, whereas when selecting "MV_A" as the motion vector whose cost R is the smallest, the direct vector generating part outputs an index of 1 to the variable length encoding part 13. When receiving the index information from the direct vector generating part 26, the variable length encoding part 13 includes the index information in the inter prediction parameters and then variable-length-encodes these inter prediction parameters when variable-length-encoding the compressed data, the encoding mode, etc.

When the encoding mode $m(B^n)$ of the coding block $B^n$ is a direct mode, the direct vector generating part 65 of the motion-compensated prediction part 54 generates a direct vector for each partition $P_i^n$ of the coding block $B^n$. More specifically, the direct vector generating part 65 receives the same direct vector candidate index (e.g., the direct vector candidate index shown in FIG. 33) as that which the direct vector generating part 26 shown in FIG. 31 receives. When receiving the inter prediction parameters including the index information from a selection switch 61, the direct vector generating part 65 reads the motion vector shown by the index information from the direct vector candidate index, and outputs this motion vector to the motion compensation processing part 63 as a direct vector. For example, when the index information is the index of 0, the direct vector generating part outputs "median" as a direct vector, whereas when the index information is the index of 1, the direct vector generating part outputs "MV_A" as a direct vector.

As can be seen from the above description, because the moving image encoding device in accordance with this Embodiment 4 is constructed in such a way as to select a motion vector suitable for the generation of a prediction image from one or more selectable motion vectors and carry out a motion-compensated prediction process on a block to be encoded to generate a prediction image by using the motion vector, and also output index information showing the motion vector to the variable length encoding part 13, there is provided an advantage of being able to select an optimal direct mode for each predetermined block unit, thereby being able to reduce the code amount, like in the case of above-mentioned Embodiment 1.

Although the explanation is made in this Embodiment 4 by assuming the case in which a motion vector exists at a selectable position, there is a case in which no motion vector exists when an intra coding process is carried out on the block to be encoded $B^n$. In this case, there can be considered a method of setting a zero vector as a motion vector, a method of not including any motion vector in the candidates, and so on. While the encoding efficiency can be improved because the candidates increase in number when a zero vector is set as a motion vector, the amount of information to be processed increases. When no motion vector is included in the candidates for direct vector, the amount of information to be processed can be reduced.

Although the example of generating a direct vector is shown in this Embodiment 4, the vector can be used as a predicted vector which is used for encoding of a normal motion vector. While the amount of information to be processed increases when the direct vector is used as a predicted vector, the encoding efficiency can be improved because the accuracy of the prediction increases.

Although the candidates for selectable motion vectors are fixed in this Embodiment 4, the candidates for selectable motion vectors can be alternatively determined on a per slice basis. Information showing which vectors should be selected as the candidates is multiplexed into each slice header. For example, there is a method of, because the effect of a temporal vector is low in a video which is acquired by panning a camera, removing temporal vectors from the selection candidates for such a video, and, because the effect of a spatial vector is large in a video which is acquired by a fixed camera, adding spatial vectors to the selection candidates for such a video.

While the larger the number of candidate vectors is, the nearer to the original image a prediction image can be generated, a balance between the amount of information to be processed and the encoding efficiency can be achieved by determining the candidates in consideration of the locality of the video, such as excluding ineffective vectors from the candidates in advance, in order to prevent the amount of information to be processed from greatly increasing due to the increase in the number of candidate vectors. Switching a vector between a candidate and a non-candidate is achieved by using, for example, a method of providing an ON/OFF flag for each vector, and defining only a vector whose flag is set to ON as a candidate. A motion vector which can be a selection candidate can be switched between a candidate and a non-candidate by using each slice header or each header in an upper layer, such as each sequence header or each picture header. Further, one or more sets of motion vectors each of which can be a selection candidate can be prepared, and an index showing each of the candidate sets can be encoded. Further, a vector can be switched between a candidate and a non-candidate for each macroblock or each block to be encoded. Switching a vector between a candidate and a non-candidate for each macroblock or each block to be encoded can provide the macroblock or block to be encoded with locality, and provides an advantage of improving the encoding efficiency.

Although the order of the indexes is fixed in this Embodiment 4, the order of the indexes can be alternatively changed on a per-slice basis. When the selection of a vector which is carried out on a per-basis slice has a bias, an index table is changed in such a way that a shorter code is assigned to a vector having a higher selection frequency, thereby providing an improvement in the encoding efficiency. Encoding of information showing the change can be carried out by encoding the order of each vector or by preparing a plurality of index sets and encoding information showing which index set is used. Further, there can be considered a method of predetermining only a default setting, preparing a flag showing whether or not to use a setting different from the default setting, and updating the index set and switching to the setting only when the flag is set.

Although the example of changing the order of the indexes on a per slice basis is shown above, it needless to say that the order of the indexes can be alternatively determined for each sequence, each picture or the like in an upper layer. As an alternative, the order of the indexes can be changed on a per partition block basis or on a per block to be encoded basis. Changing the order of the indexes on a per macroblock basis or on a per block to be encoded basis can provide each macroblock or block to be encoded with locality, and can provide an improvement in the encoding efficiency.

Further, the selection candidates can be determined uniquely for each partition block size. Because the spatial correlation generally becomes weak as the block size becomes small, it is considered that the predictive accuracy of a vector determined through a median prediction gets worse. To solve this problem, by changing the order of the indexes which is determined through a median prediction, an improvement can be provided in the encoding efficiency.

Although the direct vector candidate indexes respectively indicating five selectable motion vectors prepared in advance are shown in this Embodiment 4, six or more motion vectors or four or less motion vectors can be prepared as the candidate vectors. For example, such vectors close to a temporal vector as shown in FIG. 17 and such a vector resulting from a weighted sum of vectors in the vicinity of the block to be encoded as shown in FIG. 18 can be added as candidate vectors.

Although a prediction process from two directions is assumed to be carried out in this Embodiment 4, a prediction process only in a single direction can be alternatively carried out. When a prediction from a vector in one direction is carried out, information showing which vector is used is encoded and transmitted. As a result, a problem, such as occlusion, can be dealt with, and a contribution to an improvement in the predictive accuracy can be made.

Figure 34:
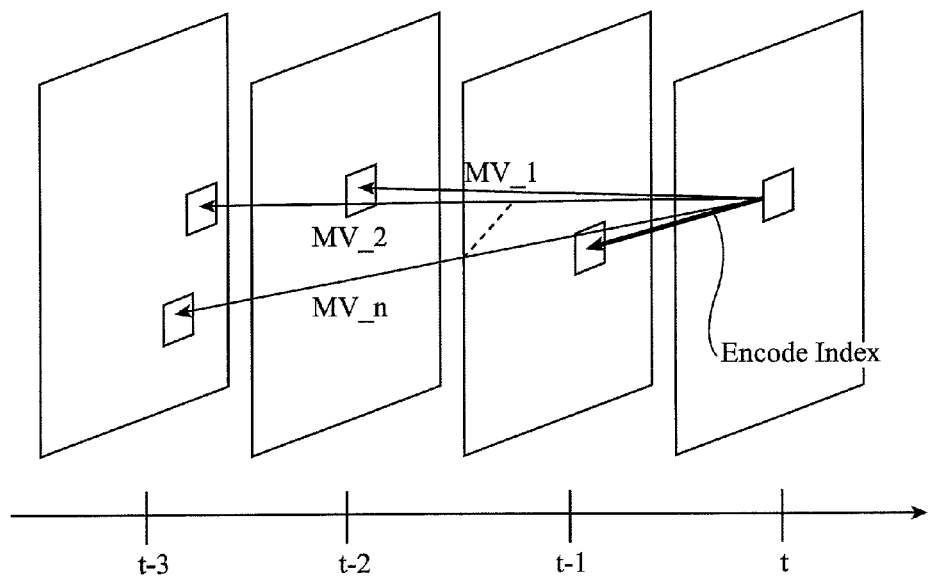
FIG. 34 is an explanatory drawing showing an example of encoding only index information showing one vector.

Although it is assumed in this Embodiment 4 that a bidirectional prediction using two vectors is carried out, the number of vectors can be three or more. In this case, for example, index information showing all the selected vectors can be encoded. In contrast with this, index information showing vectors which are not selected can be encoded. As an alternative, there can be considered a method of encoding only index information showing a single vector, and using an image close to the reference image shown by the vector, as shown in FIG. 34.

Although the example of selecting a motion vector whose cost R is the smallest from among a plurality of motion vectors is shown in this Embodiment 4, an evaluated value $SAD_k$ can be calculated according to the following equation (15) and a motion vector whose evaluated value $SAD_k$ is equal to or smaller than a threshold Th can be selected.

$$SAD_k = |f_{index} - g_k|, 0 \leq k \leq n \quad (15)$$

where $f_{index}$ denotes the reference image shown by the vector whose index information is encoded, and $g_k$ denotes the reference image shown by a vector MV_k.

Although the example of using the evaluated value $SAD_k$ is shown above, it is needless to say that the evaluation is carried out by using another method such as SSE.

Information showing the number of vectors used can be multiplexed into each header in an upper layer, such as each slice header. While the encoding efficiency is improved with increase in the number of vectors, there is a trade-off relationship between the encoding efficiency and the amount of information to be processed because the amount of information to be processed increases with increase in the number of vectors. As an alternative, the information showing the number of vectors used can be multiplexed not into each slice, but into each smaller unit such as each block to be encoded or each partition. In this case, a balance can be achieved between the amount of information to be processed and the encoding efficiency according to the locality of the image.

Figure 35:
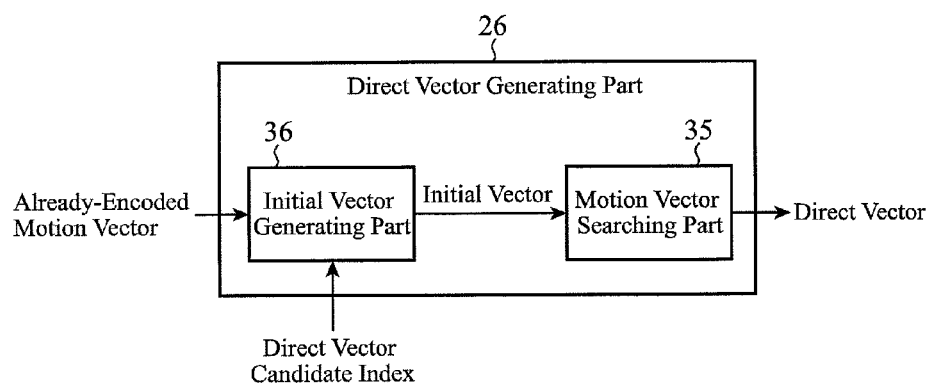
FIG. 35 is a block diagram showing a direct vector generation part 26 which constructs the motion-compensated prediction part 5.

Although the example of selecting a motion vector suitable for the generation of a prediction image from among a plurality of selectable motion vectors is shown in this Embodiment 4, a motion vector which is used as an initial vector can be selected from among a plurality of selectable motion vectors, and, after that, a final motion vector can be determined by searching through the vicinity of the initial vector, like in the case of above-mentioned Embodiment 3. In this case, the direct vector generating part 26 has a structure as shown in FIG. 35. An initial vector generating part 36 shown in FIG. 35 corresponds to the initial vector generating part 34 shown in FIG. 26.

Embodiment 5

Each of motion-compensated prediction parts 5 and 54 in accordance with this Embodiment 5 has the functions according to above-mentioned Embodiment 1 (or Embodiment 2 or 3), and the functions according to above-mentioned Embodiment 4, can switch between the functions according to above-mentioned Embodiment 1 (or Embodiment 2 or 3) and the functions according to above-mentioned Embodiment 4 on a per slice basis, and can use either of the functions according to above-mentioned Embodiment 1 (or Embodiment 2 or 3) and the functions according to above-mentioned Embodiment 4 to generate a prediction image.

Figure 36:
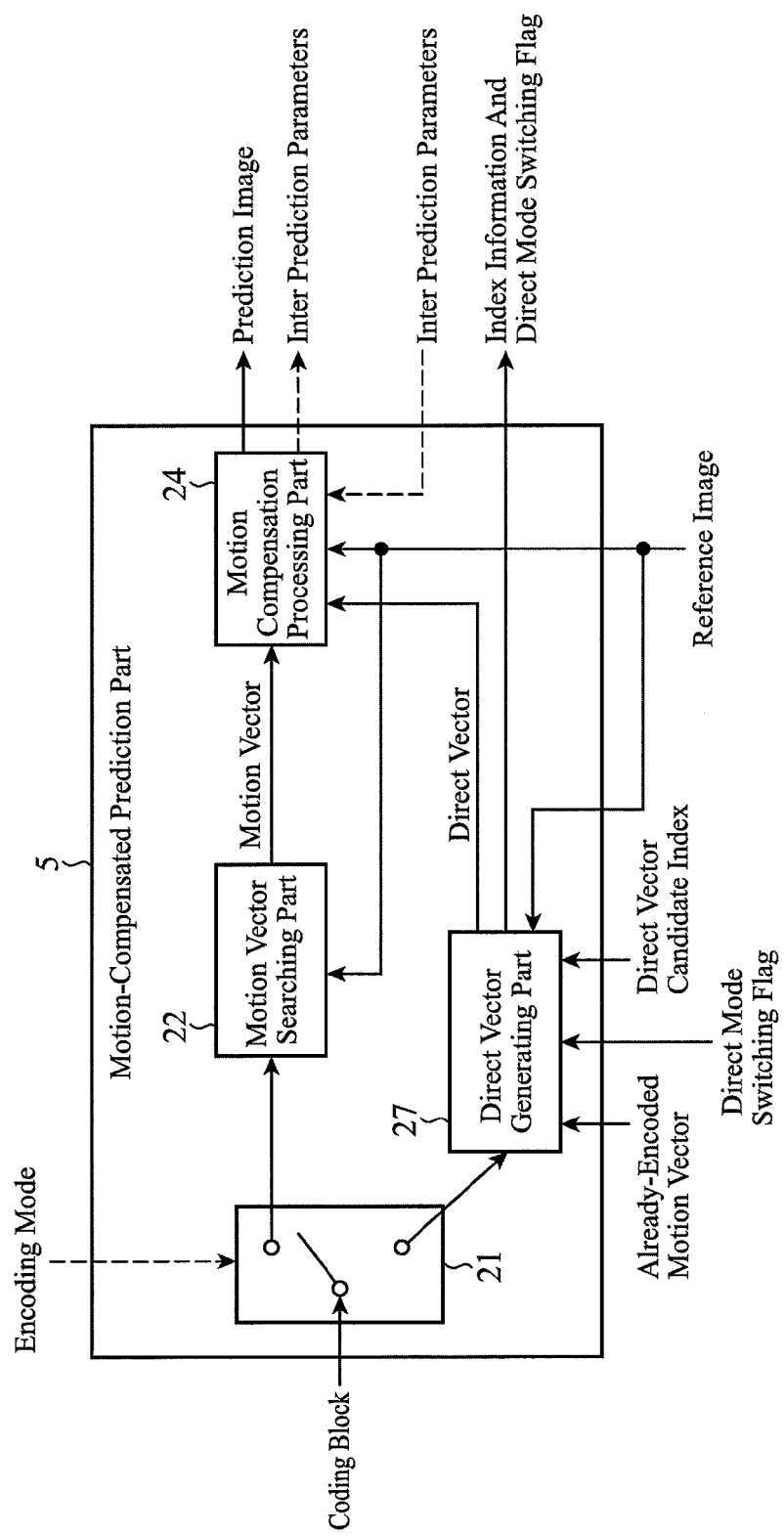
FIG. 36 is a block diagram showing a motion-compensated prediction part 5 of a moving image encoding device in accordance with Embodiment 5 of the present invention.

FIG. 36 is a block diagram showing a motion-compensated prediction part 5 of a moving image encoding device in accordance with Embodiment 5 of the present invention. In the figure, because the same reference numerals as those shown in FIG. 31 denote the same components or like components, the explanation of the components will be omitted hereafter. A direct vector generating part 27 carries out a process of, when a direct mode switching flag shows that index information is not transmitted, generating a direct vector by using the same method as that which the direct vector generating part 23 shown in FIG. 2 (or the direct vector generating part 25 shown in FIG. 25) uses, and, when the direct mode switching flag shows that index information is transmitted, generating a direct vector and also outputting index information showing the direct vector to a variable length encoding part 13 by using the same method as that which the direct vector generating part 26 shown in FIG. 31 uses. The direct vector generating part 27 also carries out a process of outputting the direct mode switching flag to the variable length encoding part 13.

Figure 37:
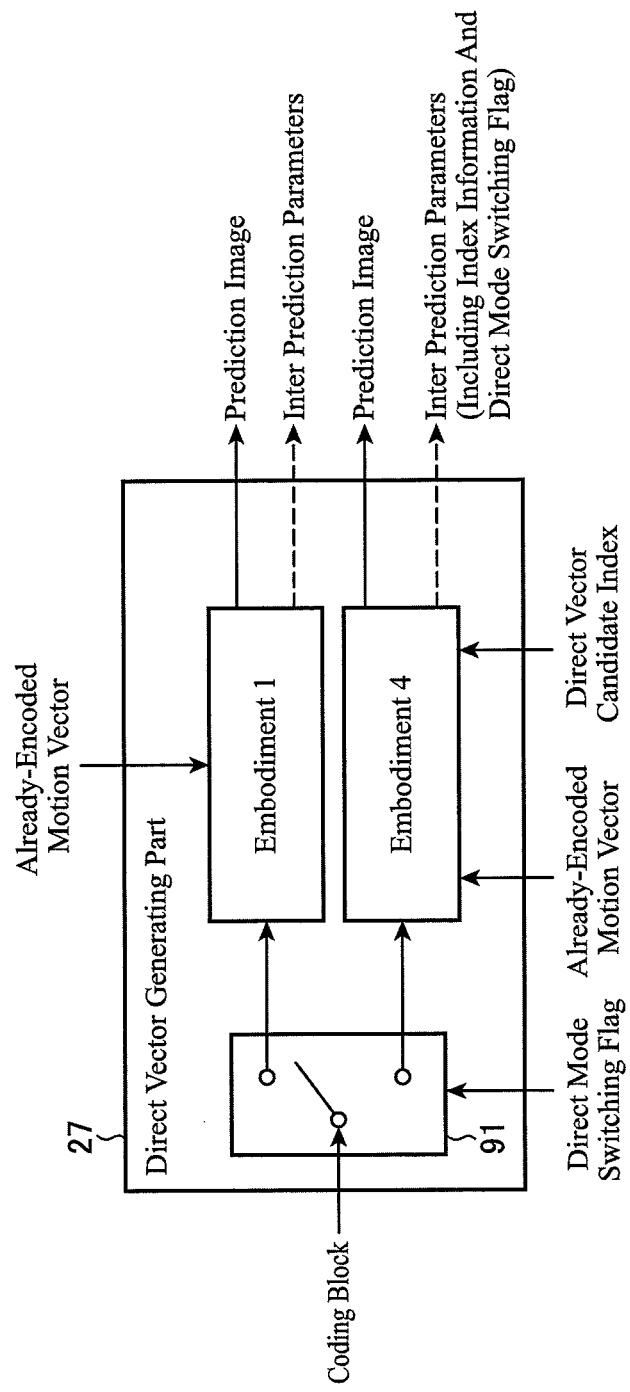
FIG. 37 is a block diagram showing a direct vector generation part 27 which constructs the motion-compensated prediction part 5.

FIG. 37 is a block diagram showing the direct vector generating part 27 which constructs the motion-compensated prediction part 5. Referring to FIG. 37, a selection switch 91 carries out a process of, when the direct mode switching flag shows that the index information is not transmitted, outputting each partition $P_i^n$ of a block to be encoded $B^n$ to a part corresponding to the direct vector generating part 23 shown in FIG. 2 (or the direct vector generating part 25 shown in FIG. 25), and, when the direct mode switching flag shows that the index information is transmitted, outputting each partition $P_i^n$ of the block to be encoded $B^n$ to a part corresponding to the direct vector generating part 26 shown in FIG. 31.

Figure 38:
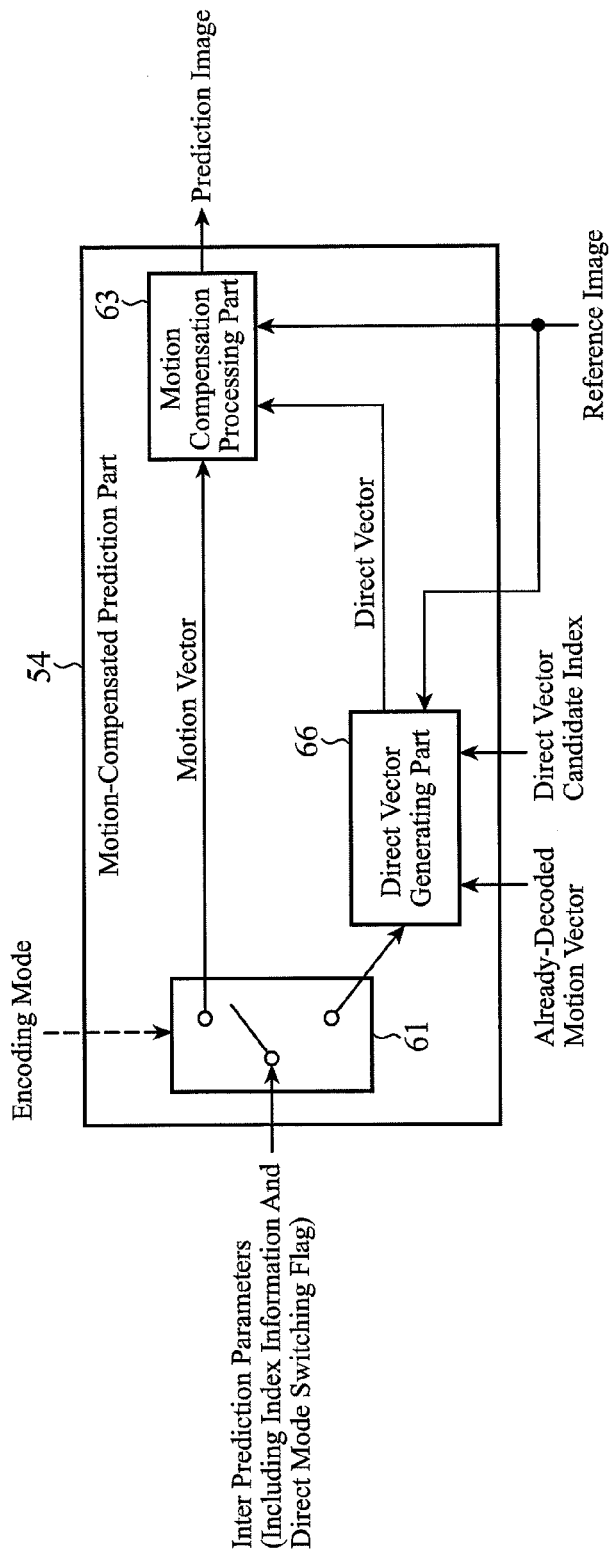
FIG. 38 is a block diagram showing a motion-compensated prediction part 54 of a moving image decoding device in accordance with Embodiment 5 of the present invention.

FIG. 38 is a block diagram showing a motion-compensated prediction part 54 of a moving image decoding device in accordance with Embodiment 5 of the present invention. In the figure, because the same reference numerals as those shown in FIG. 32 denote the same components or like components, the explanation of the components will be omitted hereafter. A direct vector generating part 66 carries out a process of, when the direct mode switching flag included in inter prediction parameters shows that the index information is not transmitted, generating a direct vector by using the same method as that which the direct vector generating part 62 shown in FIG. 6 (or the direct vector generating part 64 shown in FIG. 29) uses, and, when the direct mode switching flag shows that the index information is transmitted, generating a direct vector by using the same method as that which the direct vector generating part 65 shown in FIG. 32 uses.

Next, the operation of the moving image encoding device and the operation of the moving image decoding device will be explained. The direct vector generating part 27 of the motion-compensated prediction part 5 has the functions of the direct vector generating part 23 shown in FIG. 2 (or the direct vector generating part 25 shown in FIG. 25), and the functions of the direct vector generating part 26 shown in FIG. 31, and, when the direct mode switching flag inputted thereto from outside the direct vector generating part shows that the index information is not transmitted, generates a direct vector by using the same method as that which the direct vector generating part 23 shown in FIG. 2 (or the direct vector generating part 25 shown in FIG. 25) uses, and outputs the direct vector to a motion compensation processing part 24. The direct vector generating part 27 also outputs the direct mode switching flag to the variable length encoding part 13.

When the direct mode switching flag shows that the index information is transmitted, the direct vector generating part 27 generates a direct vector by using the same method as that which the direct vector generating part 65 shown in FIG. 32 uses, and outputs the direct vector to the motion compensation processing part 24. The direct vector generating part 27 also outputs the direct mode switching flag and the index information to the variable length encoding part 13.

When receiving the direct mode switching flag from the direct vector generating part 27, the variable length encoding part 13 includes the direct mode switching flag in the inter prediction parameters and variable-length-encodes these inter prediction parameters when variable-length-encoding compressed data, an encoding mode, etc. When receiving the direct mode switching flag and the index information from the direct vector generating part 27, the variable length encoding part 13 includes the direct mode switching flag and the index information in the inter prediction parameters and variable-length-encodes these inter prediction parameters when variable-length-encoding the compressed data, the encoding mode, etc.

When receiving the inter prediction parameters decoded by a variable length decoding part 51, the direct vector generating part 66 of the motion-compensated prediction part 54 generates a direct vector by using the same method as that which the direct vector generating part 62 shown in FIG. 6 (or the direct vector generating part 64 shown in FIG. 29) uses when the direct mode switching flag included in the inter prediction parameters shows that the index information is not transmitted. In contrast, when the direct mode switching flag shows that the index information is transmitted, the direct vector generating part generates a direct vector by using the same method as that which the direct vector generating part 65 shown in FIG. 32 uses.

In general, additional information increases in a mode in which the index information is transmitted as compared with a mode in which the index information is not transmitted. Therefore, when the percentage of the additional information in the total code amount is large, such as when the transmission rate is low, the performance in a mode in which the index information is not transmitted is higher than that in a mode in which the index information is transmitted. In contrast, when the percentage of the additional information in the total code amount is small, such as when the transmission rate is high, it is expected that the encoding efficiency is further improved by adding the index information and using an optimal direct vector.

Although the example in which the direct mode switching flag is included in the inter prediction parameters is shown in this Embodiment 5, the direct mode switching flag can be multiplexed into each slice header, each picture, or each sequence header.

Further, there can be considered a method of determining the switching according to the partition size. In general, the percentage of the additional information, such as a motion vector, becomes small relatively with increase in the partition size. Therefore, there can be considered a structure of selecting a mode in which the index information is transmitted when the partition size is equal to or larger than a certain size, and, when the partition size is smaller than the certain size, selecting a mode in which the index information is not transmitted. When using the method of determining the switching according to the partition size, as mentioned above, a flag showing which mode is used for each encoding block size can be multiplexed into each header in an upper layer, such as each slice header.

Although the example of switching between the functions according to above-mentioned Embodiment 1 and the functions according to above-mentioned Embodiment 4 according to the direct mode switching flag is shown in this Embodiment 4, switching between the functions according to above-mentioned Embodiment 2 and the functions according to above-mentioned Embodiment 4 or switching between the functions according to above-mentioned Embodiment 3 and the functions according to above-mentioned Embodiment 4 can be alternatively carried out. As an alternative, switching between the functions according to above-mentioned Embodiment 1 and the functions according to above-mentioned Embodiment 2, switching between the functions according to above-mentioned Embodiment 1 and the functions according to above-mentioned Embodiment 3, or switching between the functions according to above-mentioned Embodiment 2 and the functions according to above-mentioned Embodiment 3 can be carried out. As an alternative, arbitrary functions can be selected from among the functions according to above-mentioned Embodiment 1 to 4.

Although the example of switching between the functions according to above-mentioned Embodiment 1 and the functions according to above-mentioned Embodiment 4 according to the direct mode switching flag is shown in this Embodiment 5, an ON/OFF flag can be provided instead of switching between the functions according to above-mentioned Embodiment 1 and the functions according to above-mentioned Embodiment 4 according to the direct mode switching flag. For example, there can be considered a method of providing an ON/OFF flag showing whether or not to use Embodiment 1, and, when the flag is set, carrying out both Embodiment 1 and Embodiment 4 to select one mode which provides a higher degree of encoding efficiency from the modes and encode the information. This method provides an advantage of being able to switch between direct modes according to the locality of the image and make a contribution to an improvement in the encoding efficiency.

Although the flag for turning on or off Embodiment 1 is provided in the above-mentioned example, a flag for turning on or off Embodiment 4 can be alternatively provided. As an alternative, Embodiments 2 and 4 or Embodiments 3 and 4 can be combined.

Figure 39:
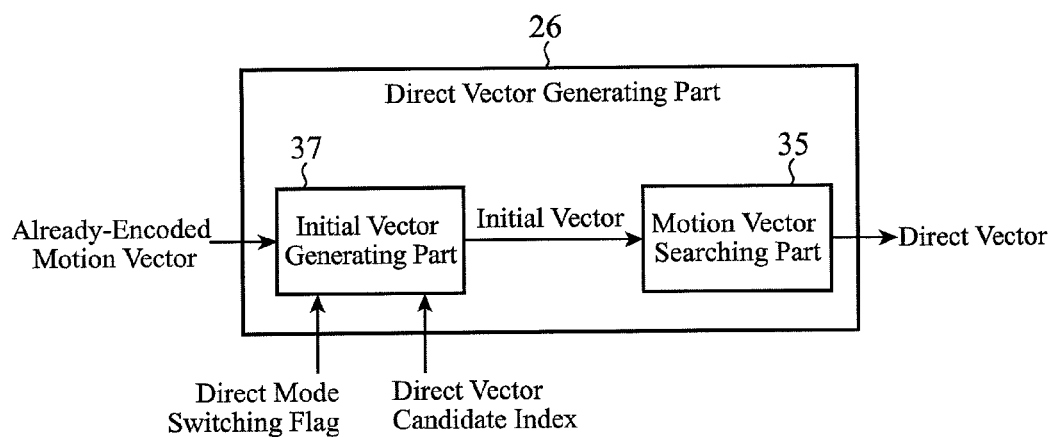
FIG. 39 is a block diagram showing a direct vector generation part 26 which constructs the motion-compensated prediction part 5.

Although the example of selecting a motion vector suitable for the generation of a prediction image from a plurality of selectable motion vectors is shown in this Embodiment 5, a motion vector which is used as an initial vector can be selected from among a plurality of selectable motion vectors, and, after that, a final motion vector can be determined by searching through the vicinity of the initial vector, like in the case of above-mentioned Embodiment 3. In this case, the direct vector generating part 27 has a structure as shown in FIG. 39. An initial vector generating part 37 shown in FIG. 39 corresponds to the initial vector generating part 34 shown in FIG. 26.

While the invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

Although it is described above that, for example, a maximum size is determined and a hierarchy number upper limit on the number of hierarchical layers in a hierarchy in which each of blocks to be encoded having the maximum size is hierarchically divided into blocks is also determined, and an encoding mode which is suitable for each of the blocks to be encoded into which each block to be encoded having the maximum size is divided hierarchically is selected from one or more available encoding modes, either or all of the maximum size, the hierarchy number upper limit, and the encoding mode can be alternatively determined in advance.

Embodiment 6

Although the example in which the direct vector generating part 26 of the motion-compensated prediction part 5 in the moving image encoding device grasps one or more selectable motion vectors by referring to a direct vector candidate index as shown in FIG. 33 is shown in above-mentioned Embodiment 4, the encoding controlling part 1 can alternatively generate a list of one or more selectable motion vectors according to the block size of a block to be encoded, and refer to the direct vector candidate list showing the one or more selectable motion vectors and the direct vector candidate index to determine a direct mode vector. Concretely, an encoding controlling part according to this embodiment operates in the following way.

Figure 40:
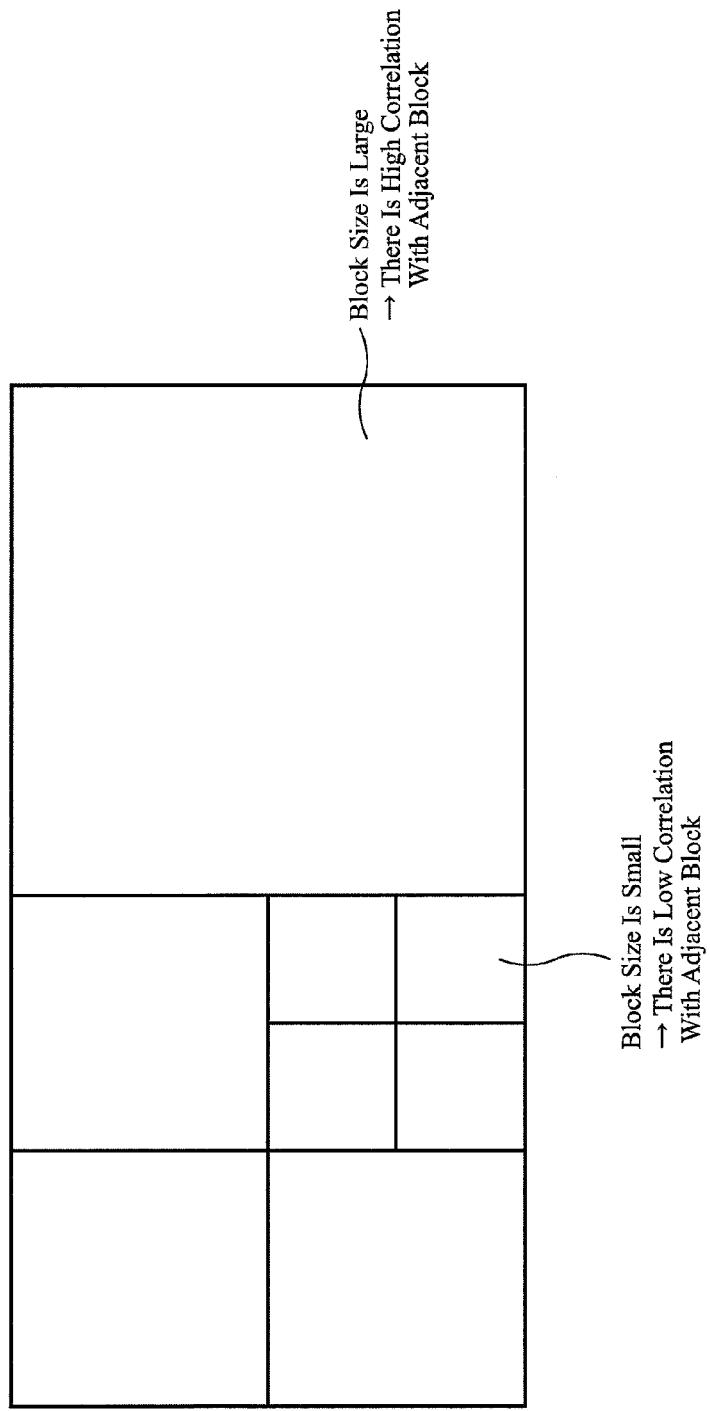
FIG. 40 is an explanatory drawing showing a correlation with an adjacent block.

As mentioned above, while one or more selectable motion vectors can be determined uniquely for each of block sizes for partition, for example, there is a high correlation between the partition which is the block to be encoded and an adjacent block when the partition has a large block size, whereas there is a low correlation between the partition which is the block to be encoded and an adjacent block when the partition has a small block size, as shown in FIG. 40. Therefore, the number of candidates for the one or more selectable motion vectors can be reduced with decrease in the block size of the partition.

To this end, the encoding controlling part 1 lists one or more selectable motion vectors in advance for each of the block sizes available for the partition which is the block to be encoded, as shown in FIG. 41. As can be seen from FIG. 41, the encoding controlling part reduces the number of candidates for the one or more selectable motion vectors with decrease in the block size of the partition. For example, while the number of selectable motion vectors is "4" for a partition whose block size is "64," the number of selectable motion vectors is "2" for a partition whose block size is "8." "median", "MV_A", "MV_B", "MV_C", and "temporal" shown in FIG. 42 correspond to "median", "MV_A", "MV_B", "MV_C", and "temporal" shown in FIG. 33, respectively.

When determining one or more selectable motion vectors, the encoding controlling part 1 refers to, for example, the list shown in FIG. 41, specifies the one or more motion vectors corresponding to the block size of the partition which is the target to be encoded, and outputs the direct vector candidate list showing the one or more motion vectors to a motion-compensated prediction part 5. For example, when the block size of the partition is "64," the encoding controlling part determines "MV_A", "MV_B", "MV_C", and "temporal" as the one or more selectable motion vectors. Further, when the block size of the partition is "8", the encoding controlling part determines "median" and "temporal" as the one or more selectable motion vectors.

When receiving the direct vector candidate list from the encoding controlling part 1, a direct vector generating part 26 of the motion-compensated prediction part 5 selects a motion vector suitable for the generation of a prediction image from the one or more motion vectors shown by the direct vector candidate list, like that according to above-mentioned Embodiment 4. In this case, because the number of candidates for one or more selectable motion vectors is small when the block size of the partition is small, the number of calculations of an evaluated value $SAD_k$ as shown in the above-mentioned equation (15), and so on is reduced and the processing load on the motion-compensated prediction part 5 is reduced, for example.

In the case in which the encoding controlling part 1 of the moving image encoding device determines one or more selectable motion vectors in this way, a moving image decoding device also needs to have a list of one or more selectable direct vector candidates which are the completely same as those in the moving image encoding device. When the encoding mode m(B″) is a direct mode, for each partition $P_i^n$ of the coding block B″, a variable length decoding part 51 of the moving image decoding device outputs the block size of the partition to a motion-compensated prediction part 54, and also outputs the index information which the variable length decoding part acquires by variable-length-decoding the bitstream (i.e., the information showing the motion vector which is used by the motion-compensated prediction part 5 of the moving image encoding device) to the motion-compensated prediction part 54.

When receiving the block size of the partition from the variable length decoding part 51, the direct vector generating part 65 of the motion-compensated prediction part 54 receives the direct vector index and outputs the motion vector which is used for a direct mode from the list of one or more motion vector candidates which is predetermined according to the block size, like that according to above-mentioned Embodiment 4. More specifically, the direct vector generating part 65 lists one or more selectable motion vectors for each of the block sizes available for the partition in advance (refer to FIG. 41), and, when determining one or more selectable motion vectors, refers to the list shown in FIG. 41 and the direct vector index, and outputs the one or more motion vectors corresponding to the block size of the partition which is to be decoded this time.

For example, in a case in which the block size of the partition is "8", the direct vector generating part outputs "median" as a direct vector when the index information is an index of 0, and outputs "temporal" as a direct vector when the index information is an index of 1.

As can be seen from the above description, because the encoding controlling part in accordance with this Embodiment 6 is constructed in such a way as to determine one or more selectable motion vectors according to the block size of the partition which is the block to be encoded, a motion vector other than motion vectors suitable for the generation of a prediction image can be removed from the candidates for a partition having a low correlation between the partition and adjacent blocks. Therefore, there is provided an advantage of being able to reduce the amount of information to be processed.

Further, because the encoding controlling part in accordance with this Embodiment 6 is constructed in such a way as to, when determining one or more selectable motion vectors, reduce the number of candidates for one or more selectable motion vectors with decrease in the block size of the partition, a motion vector other than motion vectors suitable for the generation of a prediction image can be removed from the candidates. Therefore, there is provided an advantage of being able to reduce the amount of information to be processed.

Although the example in which the block size of the partition which is the block to be encoded has a maximum of "64" is shown in this Embodiment 6, the block size can alternatively have a maximum greater than 64 or less than 64. FIG. 42 shows an example of a list whose maximum block size is "128." Although the maximum block size of each of the lists held by the encoding controlling part 1 and the motion-compensated prediction part 54 is "128" in the example of FIG. 42, a portion in which the block sizes are equal to or less than "32" in the above-mentioned list has only to be referred to when the maximum of the block size of the actual partition is "32."

Further, although the example of determining one or more selectable motion vectors according to the block size of the partition which is the block to be encoded is shown in this Embodiment 6, one or more selectable motion vectors can be alternatively determined according to the pattern of division of the block to be encoded, and the same advantages can be provided. FIG. 43 is an explanatory drawing of a list showing one or more selectable motion vectors which are determined for each of patterns of division available for the block to be encoded. For example, while "MV_A", "MV_B", "MV_C", and "temporal" are determined as one or more selectable motion vectors when the partition which is the block to be encoded is 2partH1, there is a high possibility that when the partition which is the block to be encoded is 2partH2, its movement differs from that of 2partH1 which is the block located to the left of 2partH2. Therefore, "MV_A" which is the motion vector of the block located to the left of 2partH2 is removed from the one or more motion vectors selectable for 2partH2, and "MV_B", "MV_C", and "temporal" are determined as the one or more motion vectors selectable for 2partH2.

Further, although a vector in a temporal direction is used in this Embodiment 6, the data size of the vector when stored in a memory can be compressed in order to reduce the memory amount used for storing the vector. For example, when the minimum block size is 4×4, although a vector in a temporal direction is typically stored for each block having a size of 4×4, there is considered a method of storing a vector in a temporal direction for each block having a larger size.

A problem with the above-mentioned method of storing a vector in a temporal direction while compressing the data size of the vector is that when carrying out the processing in units of a block having a block size smaller than the unit for storing the compressed vector data, the position to be referred to does not indicate a correct position. To solve this problem, a process of not using any vector in a temporal direction at a time when the block has a size smaller than the unit for storing the compressed vector data can be carried out. By removing a vector having a small degree of accuracy from the candidates, there is provided an advantage of reducing the amount of information to be processed and the index code amount.

Further, although the direct mode vector is described in this Embodiment 6, the same method can be used for the determination of a predicted vector which is uses for normal motion vector encoding. By using this method, there is provided an advantage of providing both a reduction in the amount of information to be processed and an improvement in the encoding efficiency.

Further, this Embodiment 6 is constructed in such a way that when ref_Idx of a direct vector or a vector which is desired to be predicted differs from ref_Idx of any of a plurality of candidate vectors which are used for the generation of the direct vector or the determination of the predicted vector (the picture which is the reference destination of the direct vector or the vector to be predicted differs from that of any candidate vector), a scaling process according to the distance in a temporal direction is carried out on each of the candidate vectors, as shown in FIG. 14. When ref_Idx of the direct vector or the vector which is desired to be predicted is the same as ref_Idx of one of the plurality of candidate vectors, the scaling process according to the distance in the temporal direction is not carried out.

$$\text{scaled\_MV} = MV \frac{d(Xr)}{d(Yr)} \quad (16)$$

where scaled_MV denotes a scaled vector, MV denotes a motion vector yet to be scaled, and d(x) denotes a temporal distance to x. Further, Xr denotes the reference image shown by the block to be encoded, and Yr denotes the reference image shown by each of the block positions A to D which are the targets for scaling.

Figure 49:
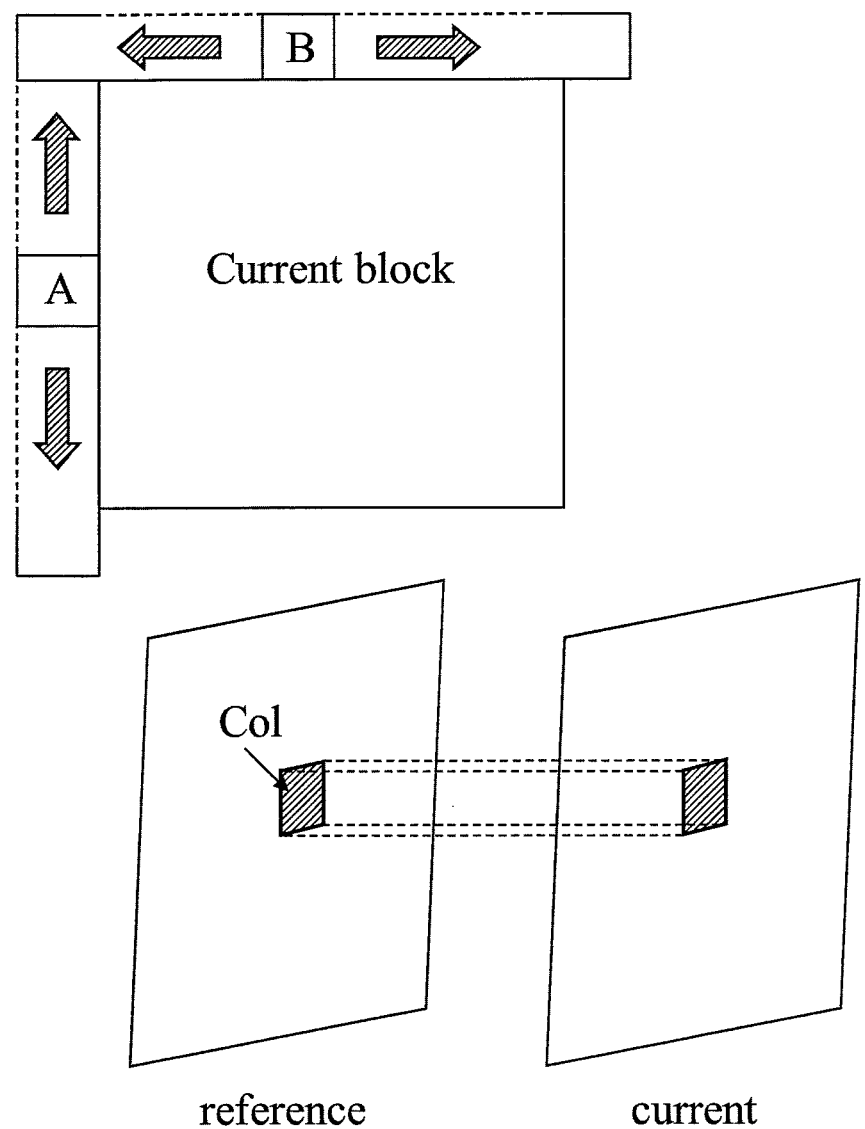
FIG. 49 is an explanatory drawing showing an example of searching for a block which is inter-encoded from a target block, and setting all vectors included in the block as spatial vector candidates.

Further, this embodiment is constructed in such a way that a block which is inter-encoded is searched for from the target blocks, and all the vectors included in the block are used as spatial vector candidates, as shown in FIG. 49. There can be a case in which the reference picture which is to be indicated by the direct vector or the vector which is desired to be predicted is the same as that indicated by one of these candidate vectors, and a case in which the reference picture which is to be indicated by the direct vector or the vector which is desired to be predicted differs from that indicated by any of these candidate vectors, as mentioned above. In the former case, this embodiment can be constructed in such a way that only candidate vectors indicating the same reference picture are used as candidates. In the latter case, this embodiment can be constructed in such a way that a correction process of performing a scaling process to make one of the candidate vectors indicate the same reference picture is carried out. The former case provides an advantage of removing a vector having a low degree of accuracy from the candidates without increasing the amount of information to be processed. The latter case provides an advantage of reducing the code amount because the amount of information to be processed increases due to the search, but the number of selection candidates can be increased.

Further, in a case of carrying out scaling as shown in the equation (16), a candidate vector whose ref_Idx differs from ref_Idx of the direct vector or the vector which is desired to be predicted can be scaled at a time of finding out a block which is inter-encoded (a candidate vector whose ref_Idx is the same as ref_Idx of the direct vector or the vector which is desired to be predicted is not scaled), or the scaling can be carried out only when there is no candidate vector whose ref_Idx is the same as ref_Idx of the direct vector or the vector which is desired to be predicted after all the blocks are searched through. Because a vector having an improved degree of accuracy can be added to the candidates while the amount of information to be processed increases, there is provided an advantage of reducing the code amount.

Embodiment 7

Although the example in which the encoding controlling part 1 of the moving image encoding device holds a list showing selectable motion vectors and the motion-compensated prediction part 54 of the moving image decoding device also holds a list showing selectable motion vectors is shown in above-mentioned Embodiment 6, the variable length encoding part 13 of the moving image encoding device can variable-length-encode list information showing the list and multiplex encoded data about the list information into, for example, each slice header, and transmit the encoded data to the moving image decoding device. In this case, the variable length decoding part 51 of the moving image decoding device variable-length-decodes the encoded data which are multiplexed into each slice header to acquire the list information, and outputs the list shown by the list information to the direct vector generating part 65 of the motion-compensated prediction part 54.

Figure 44:
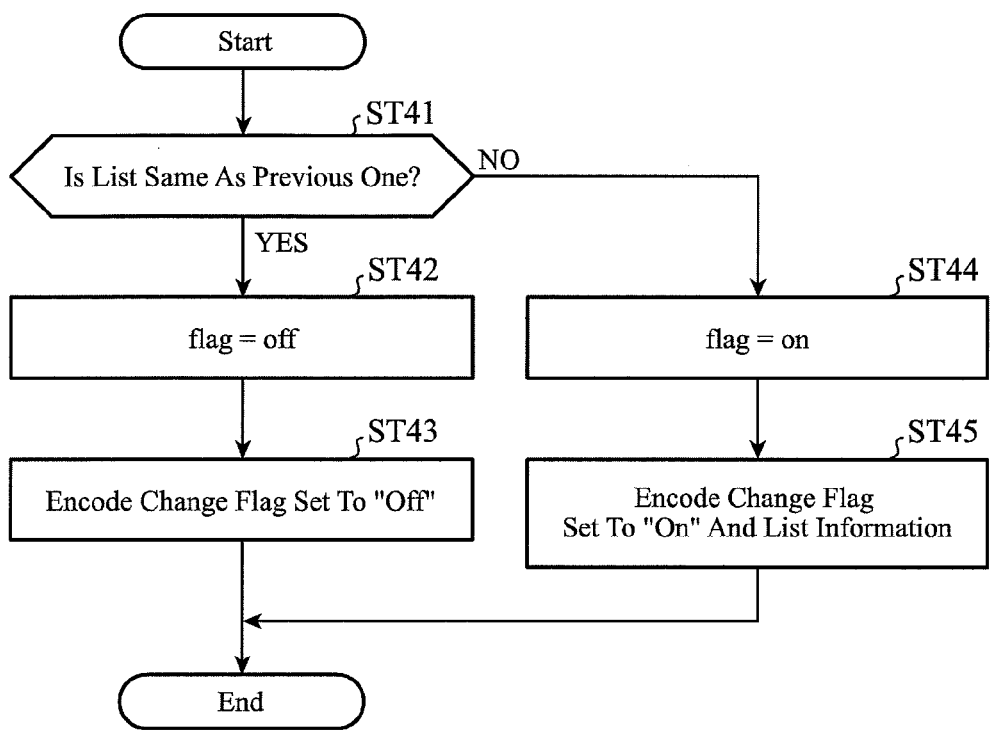
FIG. 44 is a flow chart showing a process of transmitting list information in a moving image encoding device.
Figure 45:
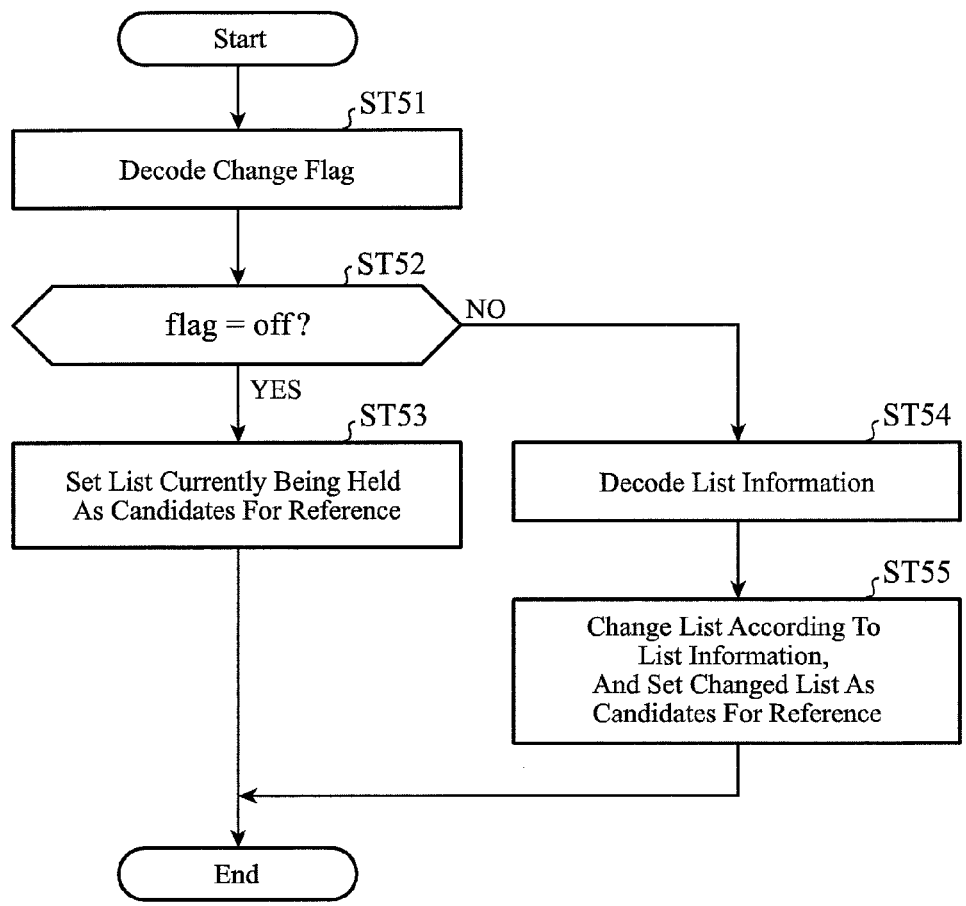
FIG. 45 is a flow chart showing a process of receiving list information in a moving image decoding device.

The moving image encoding device can transmit the list information showing the list to the moving image decoding device on a per slice basis (or on a per sequence basis, on a per picture basis, or the like) in this way. As an alternative, only when the list currently being held by the encoding controlling part 1 is changed, the moving image encoding device can transmit the list information showing the changed list to the moving image decoding device. Hereafter, processes will be explained concretely. FIG. 44 is a flow chart showing a transmitting process of transmitting list information which is carried out by a moving image encoding device according to this embodiment, and FIG. 45 is a flow chart showing a receiving process of receiving the list information which is carried out by a moving image decoding device according to this embodiment.

While an encoding controlling part 1 of the moving image encoding device, determines one or more selectable motion vectors according to the block size of a partition which is a block to be encoded, like that according to above-mentioned Embodiment 6, the encoding controlling part 1 checks to see whether the list to which the encoding controlling part refers when determining one or more motion vectors is changed, and, when the list is the same as the previous list (step ST41 of FIG. 44), sets a change flag to "OFF" in order to notify the moving image decoding device that the list is the same as the previous list (step ST42). When the encoding controlling part 1 sets the change flag to "OFF", a variable length encoding part 13 encodes the change flag set to "OFF" and transmits encoded data of the change flag to the moving image decoding device (step ST43).

Figure 46:
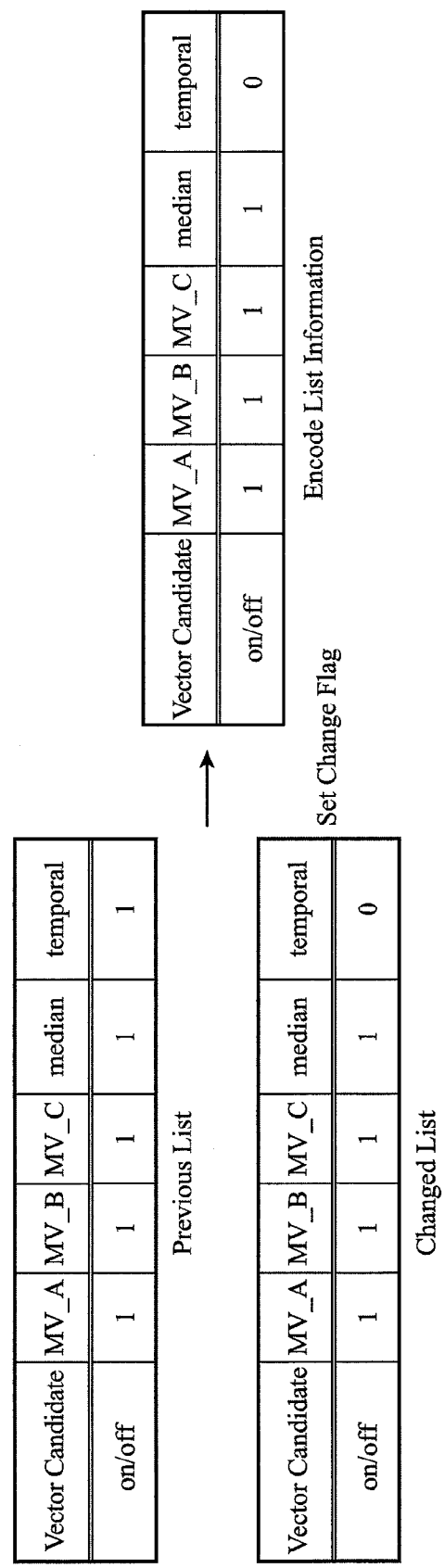
FIG. 46 is an explanatory drawing showing an example of encoding a change flag set to "ON" and list information showing a changed list because "temporal" in a list is changed from selectable to unselectable.

In contrast, when the list differs from the previous list (step ST41), the encoding controlling part 1 sets the change flag to "ON" in order to notify the moving image decoding device that the list differs from the previous list (step ST44). When the encoding controlling part 1 sets the change flag to "ON", the variable length encoding part 13 encodes the change flag set to "ON" and the list information showing the changed list, and transmits encoded data of the change flag and the list information to the moving image decoding device (step ST45). FIG. 46 shows an example in which the change flag set to "ON" and the list information showing the changed list are encoded because "temporal" in the list is changed from selectable to unselectable.

A variable length decoding part 51 of the moving image decoding device decodes the encoded data to acquire the change flag (step ST51 of FIG. 45), and, when the change flag is set to "OFF" (step ST52), outputs the change flag set to "OFF" to a motion-compensated prediction part 54. When receiving the change flag set to "OFF" from the variable length decoding part 51, the motion-compensated prediction part 54 recognizes that the list is the same as the previous list and sets the list currently being held thereby as candidates for reference (step ST53). Therefore, the motion-compensated prediction part 54 determines one or more motion vectors corresponding to the block size of the partition which is to be decoded this time by referring to the list currently being held thereby.

Figure 47:
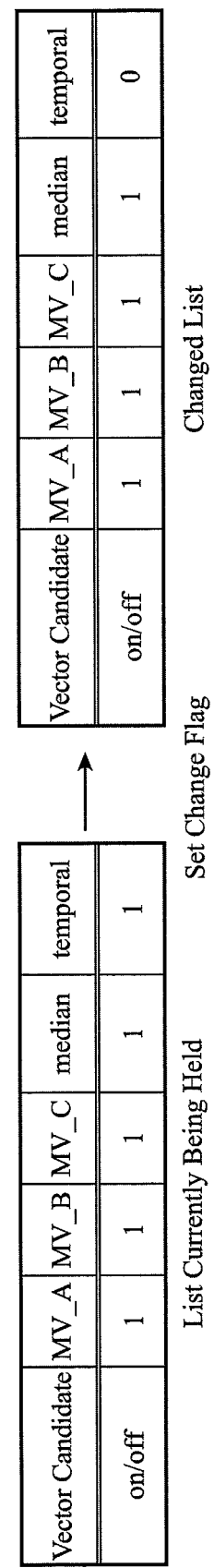
FIG. 47 is an explanatory drawing showing an example of changing a list currently being held because a change flag is set to "ON"

In contrast, when the change flag is set to "ON" (step ST52), the variable length decoding part 51 of the moving image decoding device decodes the encoded data to acquire the list information and outputs the change flag set to "ON" and the list information to the motion-compensated prediction part 54 (step ST54). When receiving the change flag set to "ON" and the list information from the variable length decoding part 51, the motion-compensated prediction part 54 recognizes that the list differs from the previous list, changes the list currently being held thereby according to the list information, and sets the list changed thereby as candidates for reference (step ST55). Therefore, the motion-compensated prediction part 54 determines one or more motion vectors corresponding to the block size of the partition which is to be decoded this time by referring to the list changed thereby. FIG. 47 shows an example in which the list currently being held thereby is changed because the change flag is set to "ON."

As can be seen from the above description, because the moving image encoding device in accordance with this embodiment 7 is constructed in such a way as to, only when a list showing one or more selectable motion vectors is changed, encode the list information showing the changed list to generate encoded data, there is provided an advantage of being able to install a function of accepting a change of the list without causing a large increase in the code amount.

Figure 48:
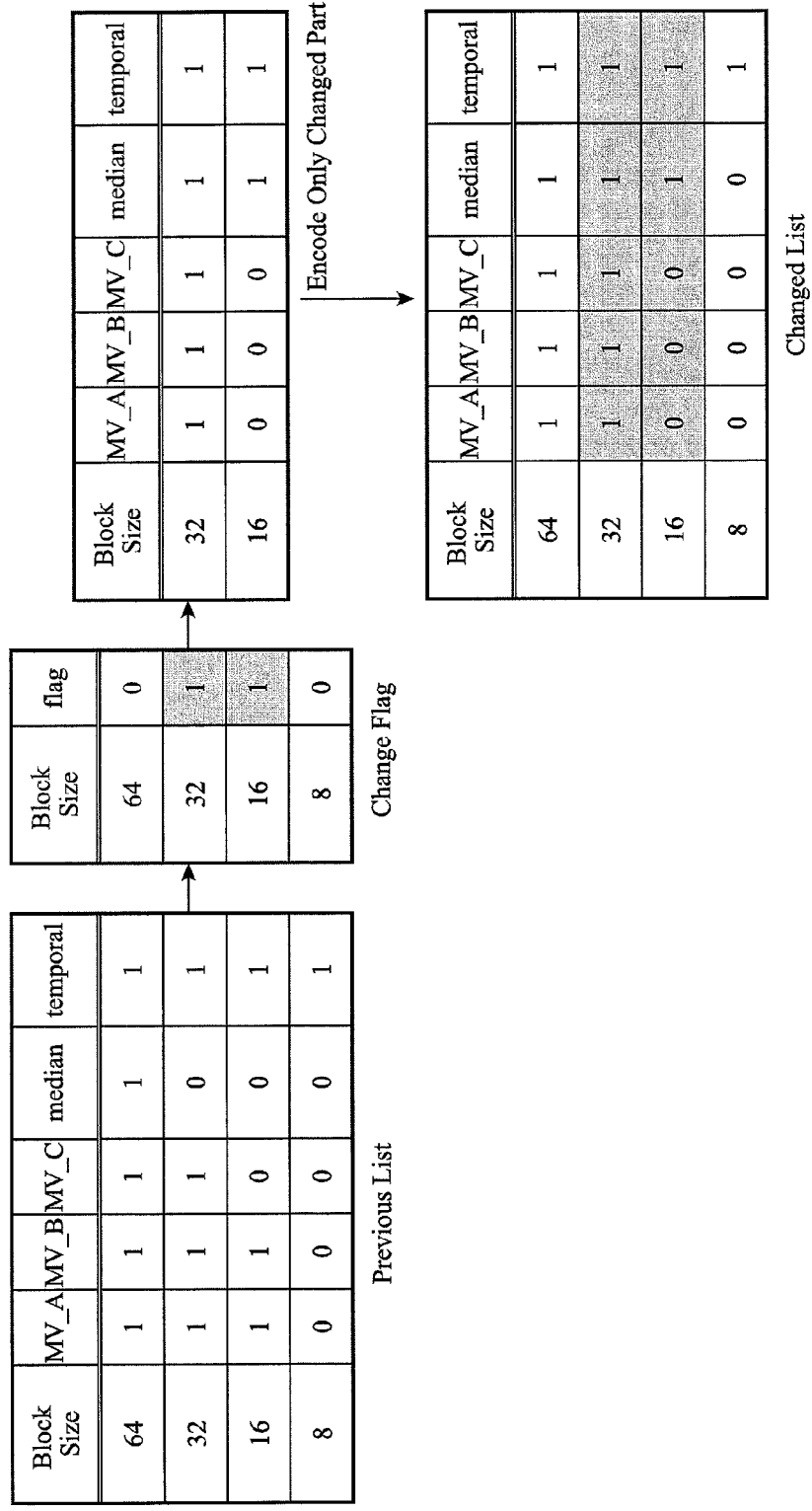
FIG. 48 is an explanatory drawing showing an example of preparing a change flag for each block size, and encoding only list information associated with a block size for which selectable motion vectors are changed.

Although the example of, even when a part of the one or more selectable motion vectors shown by the list is changed, encoding the list information showing the whole of the list changed is shown in this Embodiment 7, a change flag can be prepared for each block size, the change flag prepared for a block size for which one or more selectable motion vectors are changed can be set to "ON", and only the list information associated with the block size can be encoded, as shown in FIG. 48. Because the motion vectors in a case of a block size of "64" and the motion vectors in a case of a block size of "8" are not changed in the example shown in FIG. 48, their change flags are set to "OFF" and the list information associated with each of the block sizes is not encoded. In contrast, because the motion vectors in a case of a block size of "32" and the motion vectors in a case of a block size of "16" are changed in the example, their change flags are set to "ON" and the list information associated with each of the block sizes is encoded. As long as the change flag of one of the block sizes is set to "ON," the change flag prepared for each block size can be encoded, and, when the change flag of any block size is set to "OFF", only the change flag of the list (change flag set to "OFF") can be encoded. As an alternative, instead of using the change flag for each list, only the change flag prepared for each block size can be encoded.

Although the example of being able to change the selectable motion vectors for each block size is shown, the selectable motion vectors can be changed for each pattern of division of the block to be encoded.

INDUSTRIAL APPLICABILITY

Because the moving image encoding device, the moving image decoding device, the moving image encoding method, and the moving image decoding method in accordance with the present invention make it possible to select an optimal direct mode for each predetermined block unit and reduce the code amount, they are suitable for use as a moving image encoding device, a moving image decoding device, a moving image encoding method, and a moving image decoding method which are used for an image compression encoding technology, an compressed image data transmission technology, etc., respectively.

EXPLANATIONS OF REFERENCE NUMERALS

1 encoding controlling part (encoding controlling unit), 2 block dividing part (block dividing unit), 3 selection switch (intra prediction unit and motion-compensated prediction unit), 4 intra prediction part (intra prediction unit), 5 motion-compensated prediction part (motion-compensated prediction unit), 6 subtracting part (difference image generating unit), 7 transformation/quantization part (image compression unit), 8 inverse quantization/inverse transformation part, 9 adding part, 10 memory for intra prediction, 11 loop filtering part, 12 motion-compensated prediction frame memory, 13 variable length encoding part (variable length encoding unit), 21 selection switch, 22 motion vector searching part, 23 direct vector generating part, 24 motion compensation processing part, 25, 26, and 27 direct vector generating part, 31 spatial direct vector generating part, 32 temporal direct vector generating part, 33 direct vector determining part, 34, 36, and 37 initial vector generating part, 35 motion vector searching part, 35 motion compensation part, 42 similarity calculating part, 43 direct vector selecting part, 31 variable length decoding part (variable length decoding unit), 52 selection switch (intra prediction unit and motion-compensated prediction unit), 53 intra prediction part (intra prediction unit), 54 motion-compensated prediction part (motion-compensated prediction unit), 55 inverse quantization/inverse transformation part (difference image generating unit), 56 adding part (decoded image generating unit), 57 memory for intra prediction, 11 loop filtering part, 12 motion-compensated prediction frame memory, 61 selection switch, 62 direct vector generating part, 63 motion compensation processing part, 64, 65, and 66 direct vector generating part, 71 spatial vector generating part, 72 temporal vector generating part, 73 initial vector determining part, 35 motion compensation part, 82 similarity calculating part, 83 initial vector determining part, 91 selection switch.

The invention claimed is:

1. A video image decoding device comprising:
a variable length decoder that performs a variable-length decoding process on coded data multiplexed into a bitstream to obtain coding mode which indicates a prediction process performed to generate a prediction image, index information which specifies a motion vector for a coding block and control information for varying the number of motion vector candidates for each slice; and
a motion compensator that performs a motion compensation prediction process on said coding block to generate a prediction image when said coding mode indicates inter prediction using a motion vector selected from one or more selectable motion vector candidates, said motion compensator selecting said motion vector from said motion vector candidates according to said index information;
wherein
said motion compensator prepares a list of said motion vector candidates including one or more spatial motion vectors which is obtained from a decoded block located around said coding block and/or a temporal motion vector which is obtained from a different picture which can be referred to by said coding block, said motion vector candidates being listed in accordance with a predetermined order, and said index information specifying a position in which one of said motion vector candidates exists within said list.

2. A video image decoding method comprising:
performing a variable-length decoding process on coded data multiplexed into a bitstream to obtain coding mode which indicates a prediction process performed to generate a prediction image, index information which specifies a motion vector for a coding block and control information for varying the number of motion vector candidates for each slice; and
performing a motion compensation prediction process on said coding block to generate a prediction image using a motion vector selected from one or more selectable motion vector candidates when said coding mode indicates inter prediction, said motion vector being selected from said motion vector candidates according to said index information;
wherein said motion vector candidates include one or more spatial motion vectors which is obtained from a decoded block located around said coding block and/or a temporal motion vector which is obtained from a decoded picture which can be referred to by said coding block, said motion vector candidates being listed in accordance with a predetermined order, and said index information specifying a position in which one of said motion vector candidates exists within said list.

3. A video image encoding device comprising:
a motion compensator that performs a motion compensation prediction process on a coding block to generate a prediction image using a motion vector selected from one or more selectable motion vector candidates, said motion compensator selecting said motion vector from said motion vector candidates;
a variable encoder that performs a variable-coding process to generate coding mode which indicates a prediction process performed to generate said prediction image, index information which specifies selected one of said motion vector candidates and control information for varying the number of said motion vector candidates for each slice;
wherein said motion compensator prepares a list of said motion vector candidates including one or more spatial motion vectors which is obtained from a coded block located around said coding block and/or a temporal motion vector which is obtained from a different picture which can be referred to by said coding block, said motion vector candidates being listed in accordance with a predetermined order, and said index information specifying a position in which one of said motion vector candidates exists within said list.

4. A video image encoding method comprising:
performing a motion compensation prediction process on a coding block to generate a prediction image using a motion vector selected from one or more selectable motion vector candidates, said motion compensator selecting said motion vector from said motion vector candidates;
performing a variable-coding process to generate coding mode which indicates a prediction process performed to generate said prediction image, index information which specifies selected one of said motion vector candidates and control information for varying the number of said motion vector candidates for each slice;
wherein said motion compensator prepares a list of said motion vector candidates including one or more spatial motion vectors which is obtained from a coded block located around said coding block and/or a temporal motion vector which is obtained from a different picture which can be referred to by said coding block, said motion vector candidates being listed in accordance with a predetermined order, and said index information specifies a position in which one of said motion vector candidates exists within said list.

5. A non-transitory computer-readable storage medium storing a bit stream comprising:
coding mode which indicates a prediction process performed to generate a prediction image;
a compressed data generated by performing compression process on a difference between an image and said prediction image;
index information which specifies a motion vector used to perform a motion compensation prediction process to generate said prediction image; and
control information for varying the number of motion vector candidates for each slice;
wherein when said motion vector is selected from one or more motion vector candidates including one or more spatial motion vectors which is obtained from a coded block located around said coding block and/or a temporal motion vector which is obtained from a different picture which can be referred to by said coding block, said index information specifies selected one of said motion vector candidates, and wherein said motion vector candidate being listed in accordance with a predetermined order, and said index information specifying a position in which one of said motion vector candidates exists within said list.

6. A video image decoding device comprising:
a variable length decoder that performs a variable-length decoding process on coded data multiplexed into a bitstream to obtain compressed data, coding mode which indicates a prediction process performed to generate a prediction image, and index information which specifies a motion vector for a coding block, each associated with said coding block, and to obtain control information for varying the number of motion vector candidates for each slice, said coding block being obtained by hierarchically dividing an input image according to a maximum block size and an upper limit number of hierarchical layers;
an intra predictor that performs an intra prediction process on said coding block to generate a prediction image when said coding mode indicates intra prediction;
a motion compensator that performs a motion compensation prediction process on said coding block based on said coding mode to generate a prediction image when said coding mode indicates inter prediction, said motion compensator generating said prediction image using a motion vector selected from one or more selectable motion vector candidates according to said index information, said motion compensator selecting said motion vector indicated by said index information from said motion vector candidates;
a decoded image generator that generates decoded image data by adding a difference image which is obtained by decoding said compressed data and said prediction image generated by said motion compensator; and
a loop filter that performs filtering process on said decoded image data;
wherein
said motion compensator prepares a list of said motion vector candidates including one or more spatial motion vectors which is obtained from a decoded block located around said coding block and/or a temporal motion vector which is obtained from a decoded different picture which can be referred to by said coding block, said motion vector candidates being listed in accordance with a predetermined order, and said index information specifying a position in which one of said motion vector candidates exists within said list, and said motion compensator selects said spatial motion vector or said temporal motion vector according to said index information.

7. A video image decoding method comprising:
performing a variable-length decoding process on coded data multiplexed into a bitstream to obtain compressed data, coding mode which indicates a prediction process performed to generate a prediction image, index information which specifies a motion vector for a coding block, each associated with said coding block, and to obtain control information for varying the number of motion vector candidates for each slice, said coding block being obtained by hierarchically dividing an input image according to a maximum block size and an upper limit number of hierarchical layers;
performing an intra prediction process on said coding block to generate a prediction image when said coding mode indicates intra prediction;
performing a motion compensation prediction process on said coding block based on said coding mode to generate a prediction image when said coding mode indicates inter prediction, a motion compensator generating said prediction image using a motion vector selected from one or more selectable motion vector candidates, said motion vector being selected from said motion vector candidates according to said index information;
generating decoded image data by adding a difference image which is obtained by decoding said compressed data and said prediction image;
performing filtering process on said decoded image data;
wherein
said motion vector candidates include one or more spatial motion vectors which is obtained from a decoded block located around said coding block and/or a temporal motion vector which is obtained from a decoded picture which can be referred to by said coding block, said motion vector candidates being listed in accordance with a predetermined order, and said index information specifying a position in which one of said motion vector candidates exists within said list.

* * * * *